(12) United States Patent
Reinhardt et al.

(10) Patent No.: US 10,039,342 B2
(45) Date of Patent: Aug. 7, 2018

(54) CO-MOLDED 3D ELEMENTS

(71) Applicant: adidas AG, Herzogenaurach (DE)

(72) Inventors: Stuart David Reinhardt, Herzogenaurach (DE); Paul Leonard Michael Smith, Herzogenaurach (DE); James Tarrier, Herzogenaurach (DE); Robert Leimer, Portland, OR (US); Tru Huu Minh Le, Herzogenaurach (DE); Angus Wardlaw, Herzogenaurach (DE); Warren Freeman, Herzogenaurach (DE); Heiko Schlarb, Herzogenaurach (DE); Christopher Edward Holmes, Herzogenaurach (DE); John Whiteman, Portand, OR (US); Sabrina Kerling, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 14/825,690

(22) Filed: Aug. 13, 2015

(65) Prior Publication Data
US 2016/0044992 A1    Feb. 18, 2016

(30) Foreign Application Priority Data
Aug. 13, 2014    (DE) .................. 10 2014 216 115

(51) Int. Cl.
A43B 13/14    (2006.01)
A43B 3/00    (2006.01)
(Continued)

(52) U.S. Cl.
CPC .......... A43B 13/141 (2013.01); A43B 1/0072 (2013.01); A43B 1/14 (2013.01);
(Continued)

(58) Field of Classification Search
CPC ....... A43B 3/0052; A43B 3/0073; A43B 7/24; A43B 13/141; A43B 23/22
See application file for complete search history.

(56) References Cited

U.S. PATENT DOCUMENTS

| D64,898 S | 6/1924 | Gunlock |
| 2,131,756 A | 10/1938 | Roberts |

(Continued)

FOREIGN PATENT DOCUMENTS

| CN | 1034662 | 8/1989 |
| CN | 1036128 | 10/1989 |

(Continued)

OTHER PUBLICATIONS

"https://www.britannica.com/print/article/463684", Aug. 17, 2016, 15 pgs.
(Continued)

*Primary Examiner* — Ted Kavanaugh
(74) *Attorney, Agent, or Firm* — Kilpatrick Townsend & Stockton LLP

(57) ABSTRACT

Describes are support elements for a sole of a shoe, in particular a sports shoe, a sole and a shoe with such a support element, as well as a method for the manufacture of a support element. As examples, the support element includes a first partial member formed of a first material, and a second partial member formed of a second material. The first partial member is mechanically joined to the second partial member in a connection region, wherein the connection region is configured to allow the first partial member to rotate or slide relative to the second partial member. The first partial member, the second partial member, and the connection region can be co-molded and joined together in a single fabricating step.

18 Claims, 41 Drawing Sheets

(51) Int. Cl.

| | | |
|---|---|---|
| *A43B 5/00* | (2006.01) | |
| *A43D 39/00* | (2006.01) | |
| *A43B 1/00* | (2006.01) | |
| *A43B 1/14* | (2006.01) | |
| *A43B 3/24* | (2006.01) | |
| *A43B 3/26* | (2006.01) | |
| *A43B 5/14* | (2006.01) | |
| *A43B 7/08* | (2006.01) | |
| *A43B 7/14* | (2006.01) | |
| *A43B 7/22* | (2006.01) | |
| *A43B 7/24* | (2006.01) | |
| *A43B 7/38* | (2006.01) | |
| *A43B 13/16* | (2006.01) | |
| *A43B 13/18* | (2006.01) | |
| *A43B 21/26* | (2006.01) | |
| *B29C 45/00* | (2006.01) | |
| *B29K 27/18* | (2006.01) | |
| *B29K 71/00* | (2006.01) | |
| *B29K 77/00* | (2006.01) | |

(52) U.S. Cl.
CPC .......... *A43B 3/0031* (2013.01); *A43B 3/0047* (2013.01); *A43B 3/0052* (2013.01); *A43B 3/0073* (2013.01); *A43B 3/248* (2013.01); *A43B 3/26* (2013.01); *A43B 5/00* (2013.01); *A43B 5/14* (2013.01); *A43B 7/087* (2013.01); *A43B 7/142* (2013.01); *A43B 7/144* (2013.01); *A43B 7/1465* (2013.01); *A43B 7/1495* (2013.01); *A43B 7/223* (2013.01); *A43B 7/24* (2013.01); *A43B 7/38* (2013.01); *A43B 13/16* (2013.01); *A43B 13/181* (2013.01); *A43B 21/26* (2013.01); *A43D 39/00* (2013.01); *B29C 45/0017* (2013.01); *B29K 2027/18* (2013.01); *B29K 2071/02* (2013.01); *B29K 2077/00* (2013.01)

(56) References Cited

U.S. PATENT DOCUMENTS

| | | | |
|---|---|---|---|
| 2,968,106 A | 1/1961 | Joiner et al. | |
| 3,186,013 A | 6/1965 | Glassman et al. | |
| 3,586,003 A | 6/1971 | Baker | |
| D237,323 S | 10/1975 | Inohara | |
| 4,132,016 A | 1/1979 | Vaccari | |
| 4,237,627 A | 12/1980 | Turner et al. | |
| 4,364,189 A | 12/1982 | Bates | |
| 4,481,727 A | 11/1984 | Stubblefield et al. | |
| 4,523,395 A * | 6/1985 | Borsoi ................ | A43B 5/0441 36/117.5 |
| 4,524,529 A | 6/1985 | Schaefer | |
| 4,546,559 A | 10/1985 | Dassler et al. | |
| 4,624,062 A | 11/1986 | Autry | |
| 4,642,911 A | 2/1987 | Talarico et al. | |
| 4,658,515 A | 4/1987 | Oatman et al. | |
| 4,667,423 A | 5/1987 | Autry et al. | |
| D296,262 S | 6/1988 | Brown et al. | |
| 4,754,561 A | 7/1988 | Dufour | |
| 4,798,010 A | 1/1989 | Sugiyama et al. | |
| D302,898 S | 8/1989 | Greenberg | |
| RE33,066 E | 9/1989 | Stubblefield | |
| 4,864,739 A | 9/1989 | Maestri | |
| 4,922,631 A * | 5/1990 | Anderie ............... | A43B 5/06 36/102 |
| 4,970,807 A | 11/1990 | Anderie et al. | |
| 5,025,573 A | 6/1991 | Giese et al. | |
| 5,090,139 A * | 2/1992 | Germann ............ | A43B 5/0417 36/117.5 |
| D329,731 S | 9/1992 | Adcock et al. | |
| 5,150,490 A | 9/1992 | Busch et al. | |
| D333,556 S | 3/1993 | Purdom | |
| D337,650 S | 7/1993 | Thomas, III et al. | |
| D340,797 S | 11/1993 | Pallera et al. | |
| 5,283,963 A | 2/1994 | Lerner et al. | |
| 5,308,420 A | 5/1994 | Yang et al. | |
| 5,319,866 A | 6/1994 | Foley et al. | |
| D350,016 S | 8/1994 | Passke et al. | |
| D350,222 S | 9/1994 | Hase | |
| D356,438 S | 3/1995 | Opie et al. | |
| 5,528,842 A | 6/1996 | Ricci et al. | |
| 5,549,743 A | 8/1996 | Pearce et al. | |
| D375,619 S | 11/1996 | Backus et al. | |
| 5,617,650 A | 4/1997 | Grim | |
| 5,692,319 A | 12/1997 | Parker et al. | |
| 5,709,954 A | 1/1998 | Lyden et al. | |
| D389,991 S | 2/1998 | Elliott | |
| D390,349 S | 2/1998 | Murai et al. | |
| D393,340 S | 4/1998 | Doxey | |
| D395,337 S | 6/1998 | Greene | |
| D408,618 S | 4/1999 | Wilborn et al. | |
| D408,971 S | 5/1999 | Birkenstock | |
| D413,010 S | 8/1999 | Birkenstock | |
| 5,932,336 A | 8/1999 | Petrovic et al. | |
| D414,920 S | 10/1999 | Cahill | |
| D415,610 S | 10/1999 | Cahill | |
| D415,876 S | 11/1999 | Cahill | |
| 5,996,252 A | 12/1999 | Cougar | |
| 6,014,821 A | 1/2000 | Yaw | |
| 6,041,521 A | 3/2000 | Wong | |
| D422,400 S | 4/2000 | Brady et al. | |
| D423,199 S | 4/2000 | Cahill | |
| 6,108,943 A | 8/2000 | Hudson | |
| D431,346 S | 10/2000 | Birkenstock | |
| D460,852 S | 7/2002 | Daudier | |
| 6,516,540 B2 | 2/2003 | Seydel et al. | |
| 6,702,469 B1 | 3/2004 | Taniguchi et al. | |
| 6,708,426 B2 * | 3/2004 | Erickson ............... | A43B 1/0072 36/102 |
| D490,222 S | 5/2004 | Burg et al. | |
| D490,230 S | 5/2004 | Mervar | |
| D492,099 S | 6/2004 | McClaskie | |
| 6,782,640 B2 | 8/2004 | Westin et al. | |
| 6,796,056 B2 | 9/2004 | Swigart | |
| D498,901 S | 11/2004 | Hawker et al. | |
| 6,849,667 B2 | 2/2005 | Haseyama et al. | |
| 6,874,257 B2 * | 4/2005 | Erickson ............... | A43B 1/0072 36/103 |
| 6,925,734 B1 | 8/2005 | Schaeffer | |
| 6,948,263 B2 | 9/2005 | Covatch | |
| 6,957,504 B2 | 10/2005 | Morris | |
| 6,968,637 B1 | 11/2005 | Johnson et al. | |
| D517,302 S | 3/2006 | Ardissono | |
| 7,073,277 B2 | 7/2006 | Erb et al. | |
| 7,143,529 B2 * | 12/2006 | Robinson, Jr. ....... | A43B 1/0072 36/102 |
| D538,518 S | 3/2007 | Della Valle | |
| 7,202,284 B1 | 4/2007 | Limerkens et al. | |
| 7,243,445 B2 * | 7/2007 | Manz ................... | A43B 3/0036 36/103 |
| D554,848 S | 11/2007 | Marston | |
| D560,883 S | 2/2008 | McClaskie | |
| D561,433 S | 2/2008 | McClaskie | |
| D561,438 S | 2/2008 | Belley | |
| D561,986 S | 2/2008 | Horne et al. | |
| D570,581 S | 6/2008 | Polegato Moretti | |
| D571,085 S | 6/2008 | Mcclaskie | |
| D572,462 S | 7/2008 | Hatfield et al. | |
| 7,421,805 B2 * | 9/2008 | Geer ..................... | A43B 3/0036 36/102 |
| D586,090 S | 2/2009 | Turner et al. | |
| D589,690 S | 4/2009 | Truelsen | |
| D594,187 S | 6/2009 | Hickman | |
| D596,384 S | 7/2009 | Andersen et al. | |
| D601,333 S | 10/2009 | McClaskie | |
| D606,733 S | 12/2009 | McClaskie | |
| D607,190 S | 1/2010 | McClaskie | |
| D611,233 S | 3/2010 | Della Valle et al. | |
| 7,673,397 B2 | 3/2010 | Jarvis | |
| D616,183 S | 5/2010 | Skaja | |
| D617,540 S | 6/2010 | McClaskie | |

(56) References Cited

U.S. PATENT DOCUMENTS

| | | |
|---|---|---|
| D618,891 S | 7/2010 | McClaskie |
| D631,646 S | 2/2011 | Müller |
| D633,286 S | 3/2011 | Skaja |
| D633,287 S | 3/2011 | Skaja |
| D634,918 S | 3/2011 | Katz et al. |
| D636,156 S | 4/2011 | Della Valle et al. |
| D636,569 S | 4/2011 | McMillan |
| D636,571 S | 4/2011 | Avar |
| 7,941,941 B2 | 5/2011 | Hazenberg et al. |
| D641,142 S | 7/2011 | Lindseth et al. |
| D644,827 S | 9/2011 | Lee |
| D645,649 S | 9/2011 | McClaskie |
| D648,105 S | 11/2011 | Schlageter et al. |
| D650,159 S | 12/2011 | Avar |
| 8,082,684 B2 | 12/2011 | Munns |
| D655,488 S | 3/2012 | Blakeslee |
| D659,364 S | 5/2012 | Jolicoeur |
| 8,186,081 B2 * | 5/2012 | Wilson, III .......... A43B 3/0052 36/107 |
| D680,725 S | 4/2013 | Avar et al. |
| D680,726 S | 4/2013 | Propét |
| D683,116 S | 5/2013 | Petrie |
| 8,479,412 B2 | 7/2013 | Peyton et al. |
| 8,490,297 B2 | 7/2013 | Guerra |
| D693,553 S | 11/2013 | McClaskie |
| D695,501 S | 12/2013 | Yehudah |
| D698,137 S | 1/2014 | Carr |
| D707,934 S | 7/2014 | Petrie |
| D709,680 S | 7/2014 | Herath |
| 8,834,770 B2 | 9/2014 | Nakano et al. |
| D721,478 S | 1/2015 | Avent et al. |
| 9,010,157 B1 | 4/2015 | Podhajny et al. |
| D739,129 S | 9/2015 | Del Biondi |
| D739,131 S | 9/2015 | Del Biondi |
| D740,003 S | 10/2015 | Herath |
| D740,004 S | 10/2015 | Hoellmueller et al. |
| 9,167,868 B1 | 10/2015 | Koo et al. |
| 9,167,869 B2 | 10/2015 | Koo et al. |
| 9,212,270 B2 | 12/2015 | Künkel et al. |
| D758,056 S | 6/2016 | Herath et al. |
| D776,410 S | 1/2017 | Herath et al. |
| D783,264 S | 4/2017 | Hoellmueller et al. |
| 9,610,746 B2 | 4/2017 | Wardlaw et al. |
| 9,781,970 B2 | 10/2017 | Wardlaw et al. |
| 9,781,974 B2 | 10/2017 | Reinhardt |
| 9,788,598 B2 | 10/2017 | Reinhardt |
| 9,788,606 B2 | 10/2017 | Reinhardt |
| 9,820,528 B2 | 11/2017 | Reinhardt et al. |
| 9,849,645 B2 | 12/2017 | Wardlaw et al. |
| 2002/0162247 A1 | 11/2002 | Hokkirigawa et al. |
| 2003/0131501 A1 | 7/2003 | Erickson et al. |
| 2003/0158275 A1 | 8/2003 | McClelland et al. |
| 2003/0172548 A1 | 9/2003 | Fuerst |
| 2003/0208925 A1 | 11/2003 | Pan |
| 2004/0032042 A1 | 2/2004 | Chi |
| 2004/0138318 A1 | 7/2004 | McClelland et al. |
| 2004/0211088 A1 | 10/2004 | Volkart |
| 2005/0065270 A1 | 3/2005 | Knoerr et al. |
| 2005/0108898 A1 | 5/2005 | Jeppesen et al. |
| 2005/0150132 A1 | 7/2005 | Iannacone |
| 2005/0241181 A1 | 11/2005 | Cheng |
| 2006/0010717 A1 | 1/2006 | Finkelstein et al. |
| 2006/0026863 A1 | 2/2006 | Liu |
| 2006/0083912 A1 | 4/2006 | Park et al. |
| 2006/0125134 A1 | 6/2006 | Lin et al. |
| 2006/0134351 A1 | 6/2006 | Greene et al. |
| 2006/0156579 A1 | 7/2006 | Hoffer et al. |
| 2006/0235095 A1 | 10/2006 | Leberfinger et al. |
| 2006/0283046 A1 | 12/2006 | Mason |
| 2007/0193070 A1 | 8/2007 | Bertagna et al. |
| 2007/0199213 A1 | 8/2007 | Campbell et al. |
| 2007/0295451 A1 | 12/2007 | Willis |
| 2008/0052965 A1 | 3/2008 | Sato et al. |
| 2008/0060221 A1 | 3/2008 | Hottinger et al. |
| 2008/0244932 A1 | 10/2008 | Nau et al. |
| 2008/0250666 A1 | 10/2008 | Votolato |
| 2009/0013558 A1 | 1/2009 | Hazenberg et al. |
| 2009/0025260 A1 | 1/2009 | Nakano |
| 2009/0113758 A1 | 5/2009 | Nishiwaki et al. |
| 2009/0119023 A1 | 5/2009 | Zimmer et al. |
| 2009/0217550 A1 | 9/2009 | Koo et al. |
| 2009/0235557 A1 | 9/2009 | Christensen et al. |
| 2009/0277047 A1 | 11/2009 | Polegato Moretti |
| 2009/0320330 A1 | 12/2009 | Borel et al. |
| 2010/0063778 A1 | 3/2010 | Schrock et al. |
| 2010/0122472 A1 | 5/2010 | Wilson, III et al. |
| 2010/0154257 A1 | 6/2010 | Bosomworth et al. |
| 2010/0218397 A1 | 9/2010 | Nishiwaki et al. |
| 2010/0222442 A1 | 9/2010 | Prissok et al. |
| 2010/0242309 A1 | 9/2010 | McCann |
| 2010/0287788 A1 | 11/2010 | Spanks et al. |
| 2010/0287795 A1 | 11/2010 | Van Niekerk |
| 2010/0293811 A1 | 11/2010 | Truelsen |
| 2011/0047720 A1 | 3/2011 | Maranan et al. |
| 2011/0067272 A1 | 3/2011 | Lin |
| 2011/0232135 A1 | 9/2011 | Dean et al. |
| 2011/0252668 A1 | 10/2011 | Chen |
| 2011/0283560 A1 | 11/2011 | Portzline et al. |
| 2011/0302805 A1 | 12/2011 | Vito |
| 2012/0005920 A1 | 1/2012 | Alvear et al. |
| 2012/0047770 A1 | 3/2012 | Dean et al. |
| 2012/0059075 A1 | 3/2012 | Prissok et al. |
| 2012/0177777 A1 | 7/2012 | Brown et al. |
| 2012/0233877 A1 | 9/2012 | Swigart |
| 2012/0233883 A1 | 9/2012 | Spencer et al. |
| 2012/0235322 A1 | 9/2012 | Greene et al. |
| 2012/0266490 A1 | 10/2012 | Atwal et al. |
| 2012/0304491 A1 | 12/2012 | Kimura et al. |
| 2013/0150468 A1 | 6/2013 | Füssi et al. |
| 2013/0255103 A1 | 10/2013 | Dua et al. |
| 2013/0266792 A1 | 10/2013 | Nohara et al. |
| 2013/0269215 A1 | 10/2013 | Smirman et al. |
| 2013/0291409 A1 * | 11/2013 | Reinhardt .............. A43B 13/04 36/30 R |
| 2014/0017450 A1 | 1/2014 | Baghdadi et al. |
| 2014/0033573 A1 | 2/2014 | Wills |
| 2014/0066530 A1 | 3/2014 | Shen et al. |
| 2014/0075787 A1 | 3/2014 | Cartagena |
| 2014/0197253 A1 | 7/2014 | Lofts et al. |
| 2014/0223673 A1 | 8/2014 | Wardlaw et al. |
| 2014/0223776 A1 | 8/2014 | Wardlaw et al. |
| 2014/0223777 A1 | 8/2014 | Whiteman et al. |
| 2014/0223783 A1 | 8/2014 | Wardlaw et al. |
| 2014/0227505 A1 | 8/2014 | Schiller et al. |
| 2014/0366403 A1 | 12/2014 | Reinhardt et al. |
| 2014/0366404 A1 | 12/2014 | Reinhardt et al. |
| 2014/0366405 A1 | 12/2014 | Reinhardt et al. |
| 2014/0373392 A1 | 12/2014 | Cullen |
| 2015/0082668 A1 | 3/2015 | Nakaya et al. |
| 2015/0089841 A1 | 4/2015 | Smaldone et al. |
| 2015/0166270 A1 | 6/2015 | Buscher et al. |
| 2015/0174808 A1 | 6/2015 | Rudolph et al. |
| 2015/0197617 A1 | 7/2015 | Prissok et al. |
| 2015/0237823 A1 | 8/2015 | Schmitt et al. |
| 2015/0344661 A1 | 12/2015 | Spies et al. |
| 2015/0351493 A1 | 12/2015 | Ashcroft et al. |
| 2016/0037859 A1 | 2/2016 | Smith et al. |
| 2016/0046751 A1 | 2/2016 | Spies et al. |
| 2016/0121524 A1 | 5/2016 | Däschlein et al. |
| 2016/0128426 A1 | 5/2016 | Reinhardt et al. |
| 2016/0244583 A1 | 8/2016 | Keppeler |
| 2016/0244584 A1 | 8/2016 | Keppeler |
| 2016/0244587 A1 | 8/2016 | Gutmann et al. |
| 2016/0346627 A1 | 12/2016 | Le et al. |
| 2017/0173910 A1 | 6/2017 | Wardlaw et al. |
| 2018/0000197 A1 | 1/2018 | Wardlaw et al. |
| 2018/0035755 A1 | 2/2018 | Reinhardt et al. |

FOREIGN PATENT DOCUMENTS

| | | |
|---|---|---|
| CN | 2511160 | 9/2002 |
| CN | 1451332 A | 10/2003 |
| CN | 2722676 | 9/2005 |
| CN | 2796454 | 7/2006 |

(56) References Cited

FOREIGN PATENT DOCUMENTS

| | | |
|---|---|---|
| CN | 2888936 | 4/2007 |
| CN | 101003679 | 7/2007 |
| CN | 101107113 | 1/2008 |
| CN | 101190049 | 6/2008 |
| CN | 201223028 | 4/2009 |
| CN | 101484035 | 7/2009 |
| CN | 101611950 | 12/2009 |
| CN | 202233324 | 5/2012 |
| CN | 202635746 | 1/2013 |
| CN | 202907958 | 5/2013 |
| CN | 103371564 | 10/2013 |
| CN | 203262404 | 11/2013 |
| CN | 203692653 | 7/2014 |
| CN | 203828180 | 9/2014 |
| DE | 3605662 | 6/1987 |
| DE | 4236081 | 4/1994 |
| DE | 29718491 | 2/1998 |
| DE | 19652690 | 6/1998 |
| DE | 19950121 | 11/2000 |
| DE | 10010182 | 9/2001 |
| DE | 10244433 | 12/2005 |
| DE | 10244435 | 2/2006 |
| DE | 102004063803 | 7/2006 |
| DE | 102005050411 | 4/2007 |
| DE | 202008017042 | 4/2009 |
| DE | 102008020890 | 10/2009 |
| DE | 102009004386 | 7/2010 |
| DE | 202010008893 | 1/2011 |
| DE | 202010015777 | 1/2011 |
| DE | 112009001291 | 4/2011 |
| DE | 102010052783 | 5/2012 |
| DE | 202012005735 | 8/2012 |
| DE | 102011108744 | 1/2013 |
| DE | 102012206094 | 10/2013 |
| DE | 102013208170 | 11/2014 |
| EM | 001286116-0001 | 7/2001 |
| EM | 001286116-0002 | 7/2011 |
| EM | 001286116-0003 | 7/2011 |
| EM | 001286116-0004 | 7/2011 |
| EM | 001286116-0005 | 7/2011 |
| EM | 001286116-0006 | 7/2011 |
| EP | 0165353 | 12/1985 |
| EP | 752216 | 1/1997 |
| EP | 873061 | 10/1998 |
| EP | 1197159 | 4/2002 |
| EP | 1424105 | 6/2004 |
| EP | 1854620 | 11/2007 |
| EP | 1872924 | 1/2008 |
| EP | 2110037 A1 | 10/2009 |
| EP | 2233021 | 9/2010 |
| EP | 2250917 | 11/2010 |
| EP | 2316293 | 5/2011 |
| EP | 2342986 | 7/2011 |
| EP | 2446768 | 5/2012 |
| EP | 2649896 | 10/2013 |
| EP | 2540184 B1 | 7/2014 |
| EP | 2792261 A1 | 10/2014 |
| EP | 2848144 | 3/2015 |
| EP | 2939558 | 11/2015 |
| EP | 3067100 | 9/2016 |
| ES | 1073997 | 6/2011 |
| FR | 2683432 | 5/1993 |
| GB | 2258801 | 2/1993 |
| JP | 01274705 | 11/1989 |
| JP | 10152575 A | 6/1998 |
| JP | 2913603 | 6/1999 |
| JP | 2000197503 | 7/2000 |
| JP | 2002-325602 | 11/2002 |
| JP | 2002361749 | 12/2002 |
| JP | 2005218543 | 8/2005 |
| JP | 2008073548 | 4/2008 |
| JP | 2009-142705 | 7/2009 |
| JP | 2009-535157 | 10/2009 |
| JP | 2012-249744 | 12/2012 |
| KR | 1020110049293 | 5/2011 |
| TW | 201012407 | 4/2010 |
| WO | 8906501 | 7/1989 |
| WO | 1994020568 A1 | 9/1994 |
| WO | 2002/008322 | 1/2002 |
| WO | 2005023920 | 3/2005 |
| WO | 2005026243 A1 | 3/2005 |
| WO | 2005066250 | 7/2005 |
| WO | 2006015440 | 2/2006 |
| WO | 2006027671 | 3/2006 |
| WO | 2006/034807 A1 | 4/2006 |
| WO | 2006090221 | 8/2006 |
| WO | 2007082838 | 7/2007 |
| WO | 2008047538 A1 | 4/2008 |
| WO | 2008087078 | 7/2008 |
| WO | 2009039555 | 4/2009 |
| WO | 2009095935 | 8/2009 |
| WO | 2010010010 | 1/2010 |
| WO | 2010037028 | 4/2010 |
| WO | 2010045144 | 4/2010 |
| WO | 2010136398 | 12/2010 |
| WO | 2011134996 A1 | 11/2011 |
| WO | 2012065926 | 5/2012 |
| WO | 2013013784 | 1/2013 |
| WO | 2013168256 | 11/2013 |
| WO | 2014046940 | 3/2014 |
| WO | 2015075546 A1 | 10/2014 |
| WO | 2015052265 A1 | 4/2015 |
| WO | 2015052267 A1 | 4/2015 |

OTHER PUBLICATIONS

U.S. Appl. No. 15/093,233, filed Apr. 7, 2016, Wardlaw, Angus et al.
U.S. Appl. No. 29/558,138, filed Mar. 15, 2016, Hoellmueller et al.
U.S. Appl. No. 15/078,043, filed Mar. 23, 2016, Tru, Huu Minh L.
U.S. Appl. No. 15/130,012, filed Apr. 15, 2016, Kormann, Marco et al.
"Adhesives for Delrin and Acetal", Reltek, available at http://reltekllc.com/adhesivesfordelrin.aspx, last accessed on May 22, 2017, 5 pages.
"Colour and Additive Preparations for Extruded Polyolefin Foams", Gabriel-Chemie Group, available at www.gabriel-chemie.com/downloads/folder/PE%20foams_en.pdf, last accessed on Jan. 17, 2017, 20 pages.
"http://www.dow.com/polyethylene/na/en/fab/foaming.htm", Dec. 7, 2011, 1 page.
Nauta, "Stabilisation of Low Density, Closed Cell Polyethylene Foam", University of Twente, Netherlands, 2000, 148 pages.
Office Action, Chinese Patent Application No. 201510497218.7, dated Nov. 2, 2016, 12 pages.
Third Party Submission, U.S. Appl. No. 14/981,168, dated Nov. 14, 2016, 44 pages.
U.S. Appl. No. 14/981,168, filed Dec. 28, 2015, Reinhardt et al.
U.S. Appl. No. 29/464,051, filed Aug. 12, 2013, Galway.
U.S. Appl. No. 62/137,139, filed Mar. 23, 2015, Gordon et al.
U.S. Appl. No. 29/550,418, filed Jan. 4, 2016, Galway et al.
Amesöder et al., "The right turn (part 1)—Determination of Characteristic values for assembly injection molding", Journal of Plastics Technology, Apr. 2008, pp. 1-8 (English translation of Abstract provided).
Baur et al., "Saechtling Kunststoff Taschenbuch", Hanser Verlag, 31. Ausgabe, Oct. 2013, 18 pages (9 pages for the original document and 9 pages for the English translation).
Germany Application No. 102014216115.0, Office Action dated Jun. 18, 2015, 8 pages.
European Application No. 15180159.4, Extended European Search Report dated Dec. 22, 2015, 12 pages.
Venable LLP, Letter, dated Jan. 14, 2016, 6 pages.
U.S. Appl. No. 15/703,031, Unpublished (filed Sep. 13, 2017).
U.S. Appl. No. 15/724,318, Unpublished (filed Oct. 4, 2017).
U.S. Appl. No. 15/581,112, Unpublished (filed Apr. 28, 2017).
U.S. Appl. No. 29/591,016, Unpublished (filed Jan. 16, 2017).
U.S. Appl. No. 29/592,935, Unpublished (filed Feb. 3, 2017).
U.S. Appl. No. 29/592,946, Unpublished (filed Feb. 3, 2017).

(56) References Cited

OTHER PUBLICATIONS

U.S. Appl. No. 29/594,228, Unpublished (filed Feb. 16, 2017).
U.S. Appl. No. 29/594,358, Unpublished (filed Feb. 17, 2017).
U.S. Appl. No. 29/595,852, Unpublished (filed Mar. 2, 2017).
U.S. Appl. No. 29/595,857, Unpublished (filed Mar. 2, 2017).
U.S. Appl. No. 29/595,859, Unpublished (filed Mar. 2, 2017).
U.S. Appl. No. 29/614,532, Unpublished (filed Aug. 21, 2017).
U.S. Appl. No. 29/614,545, Unpublished (filed Aug. 21, 2017).
Azo Materials, "BASF Develops Expanded Thermoplastic Polyurethane", available http://www.azom.com/news.aspxNewsID=37360, Jul. 2, 2014, 4 pages.

* cited by examiner

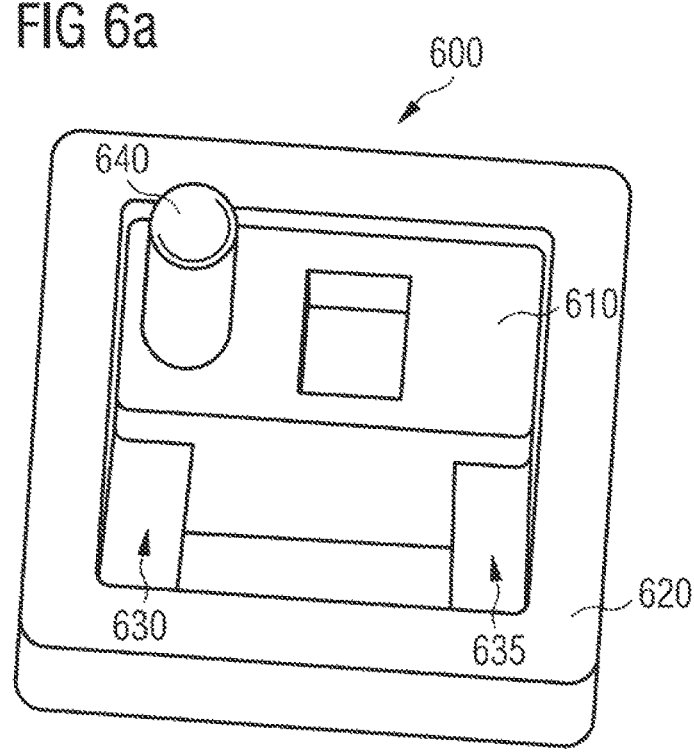
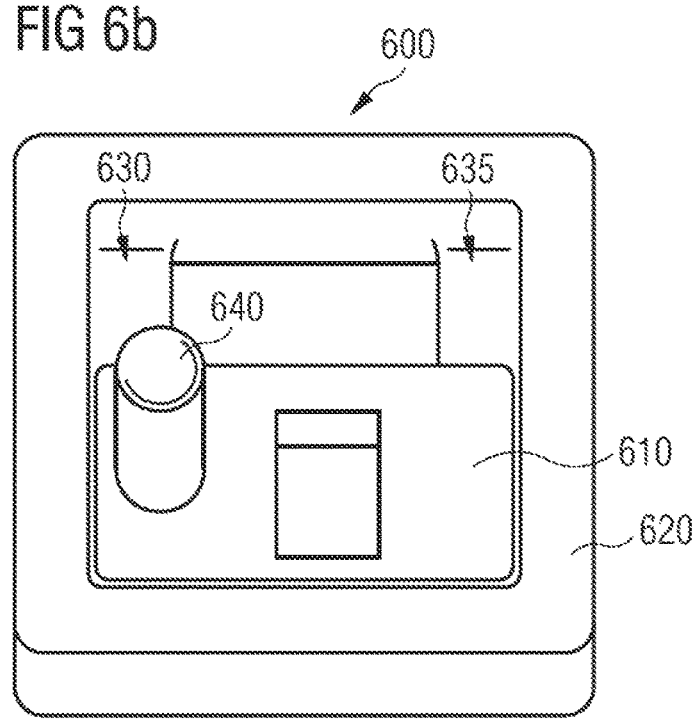

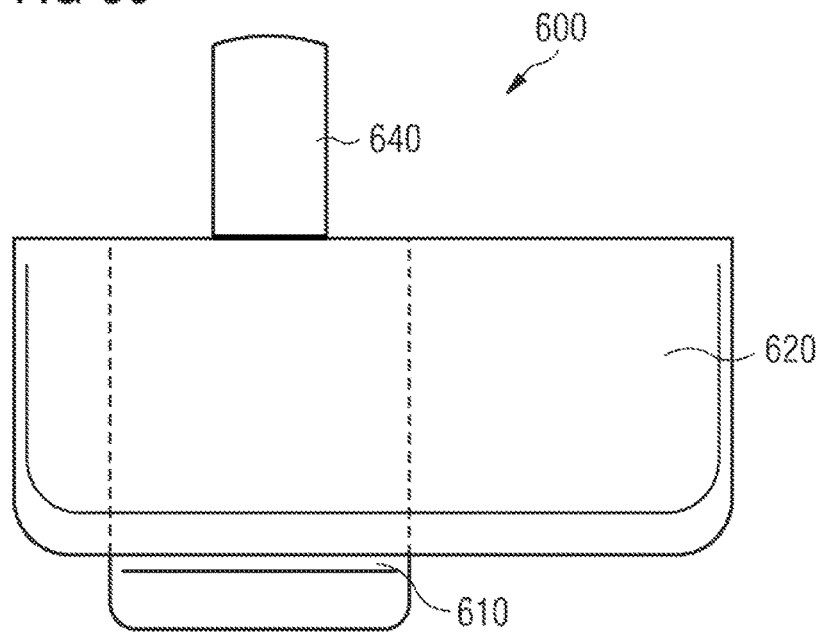
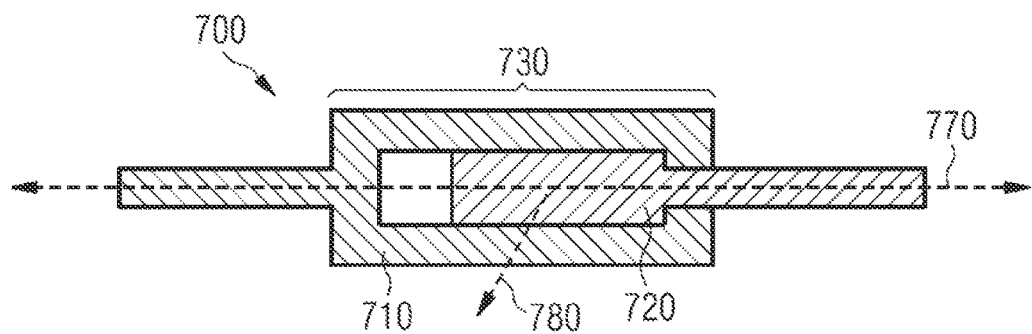

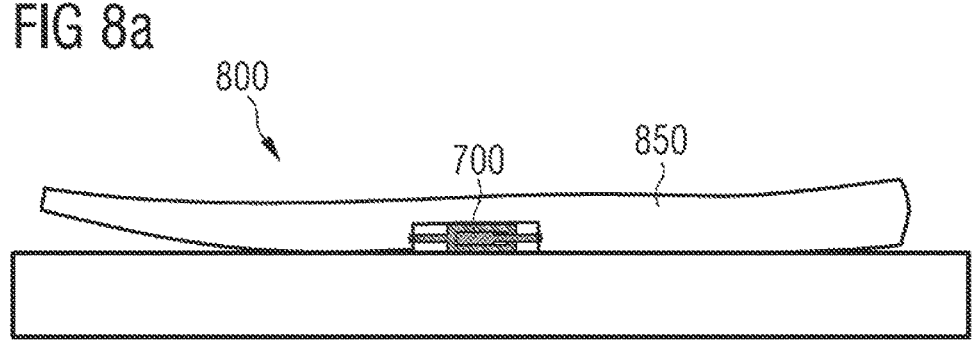
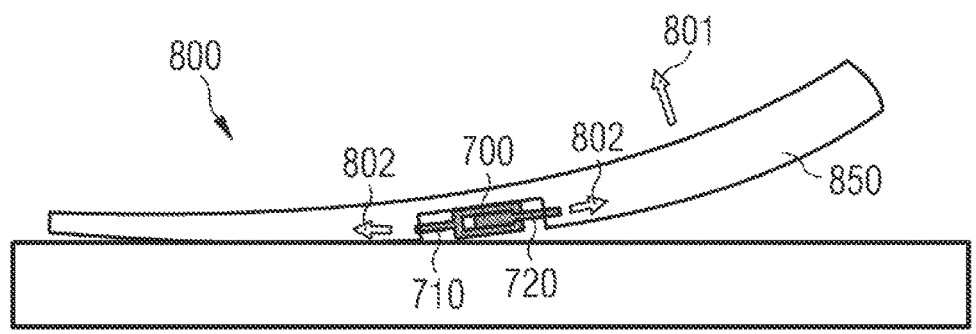

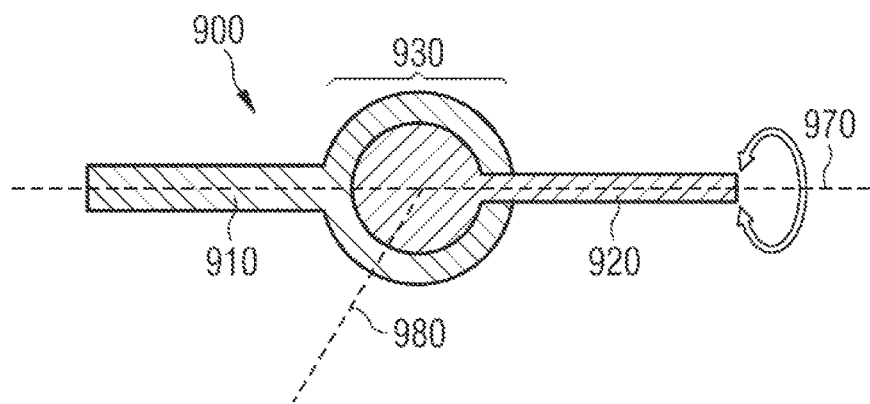
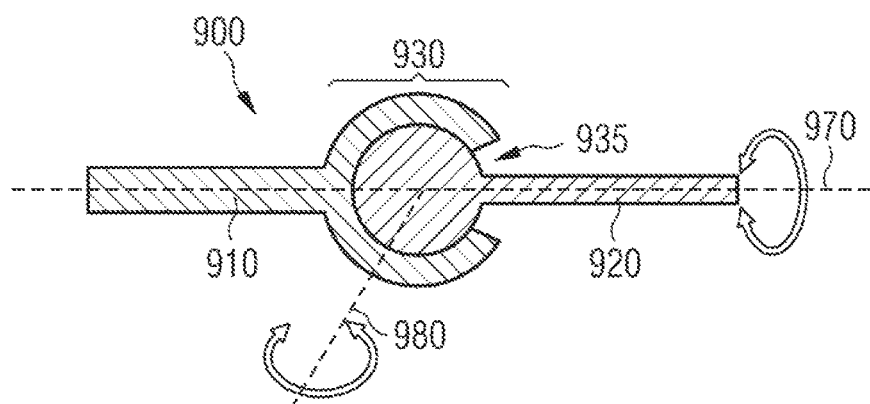
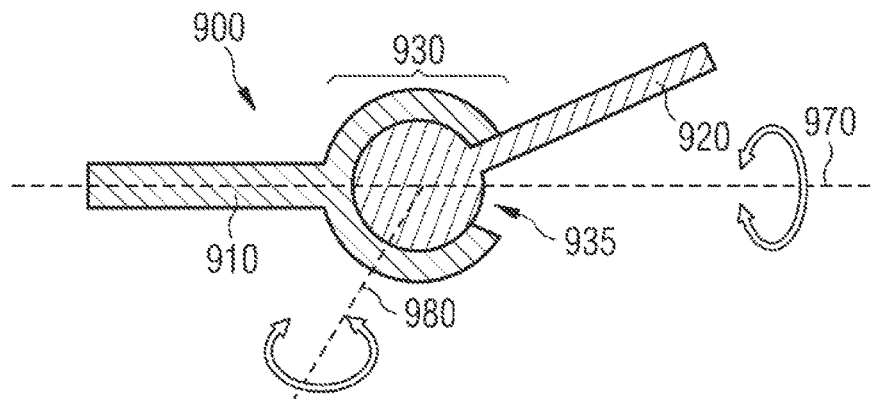

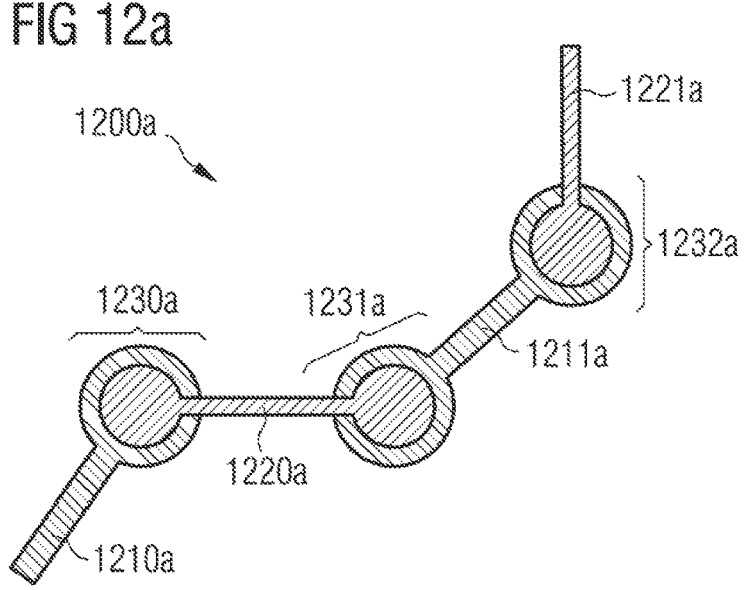
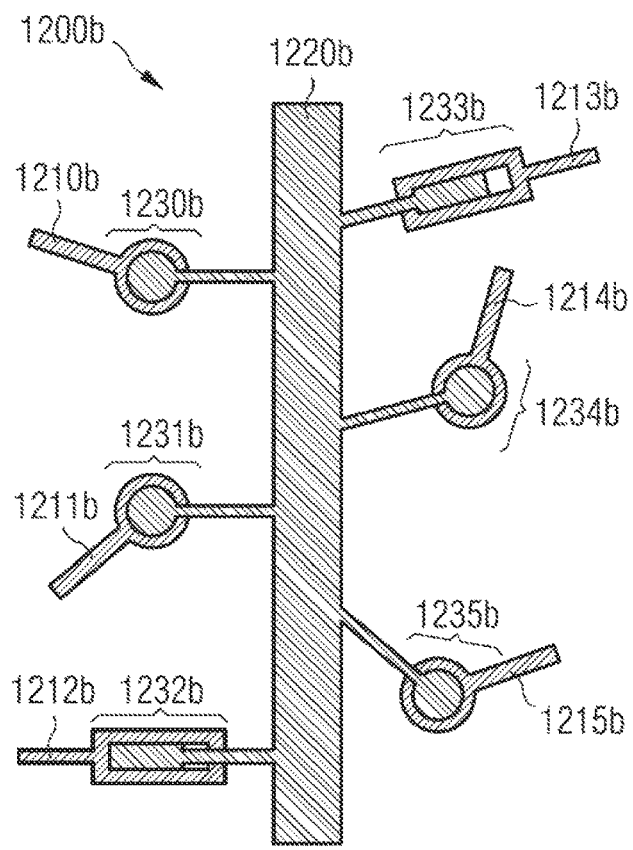

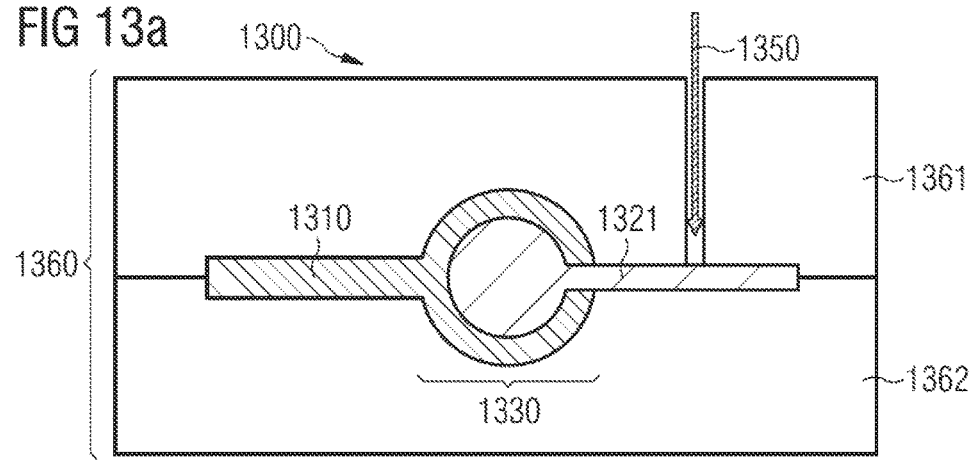
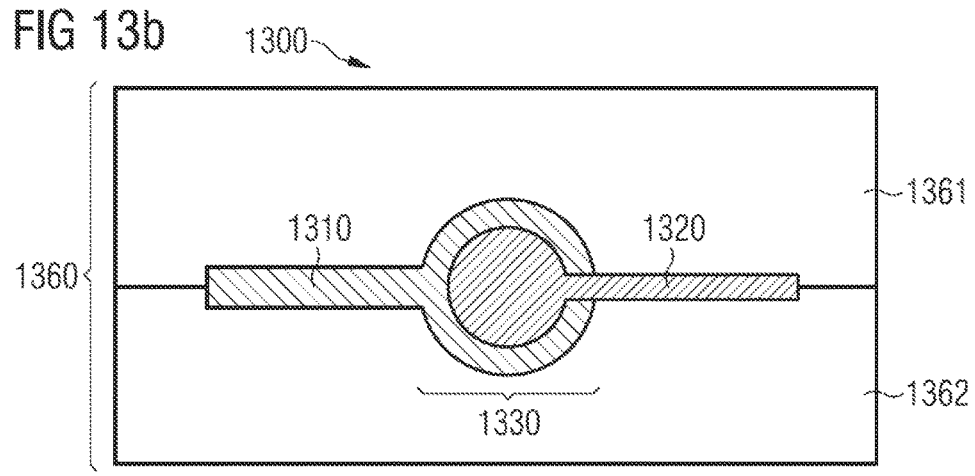
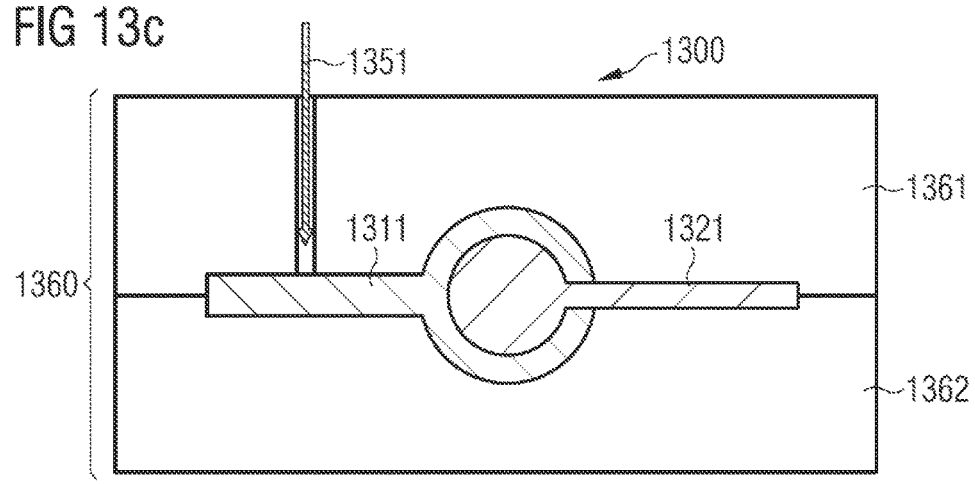

FIG 15a
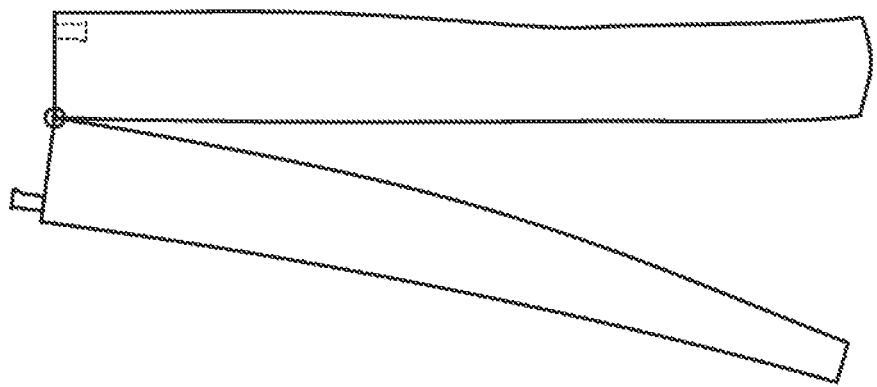
FIG 15b
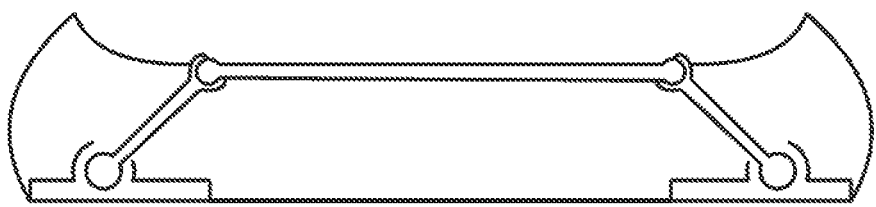
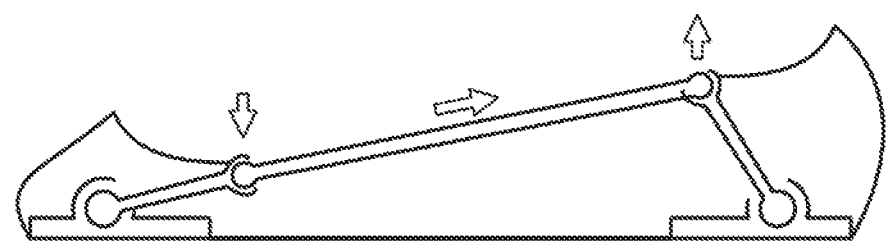

FIG 16m
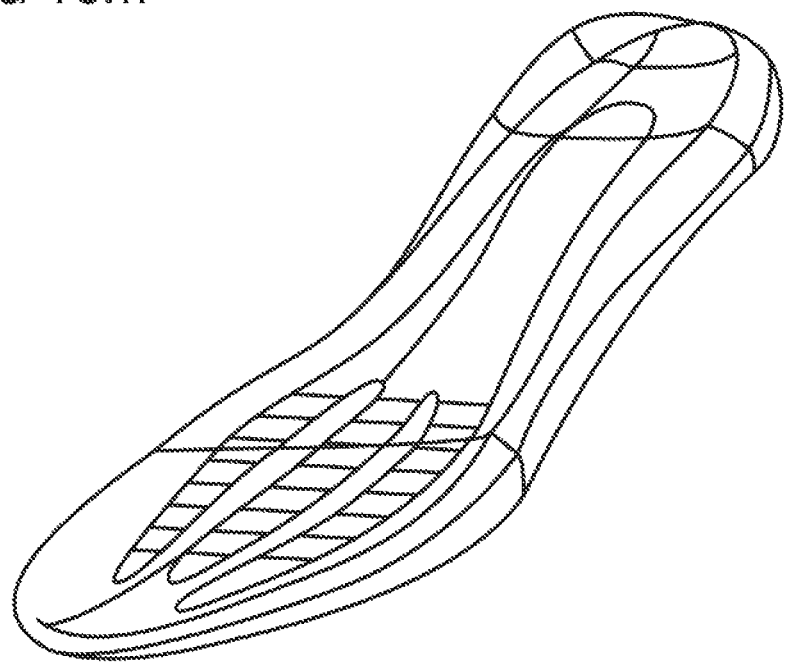
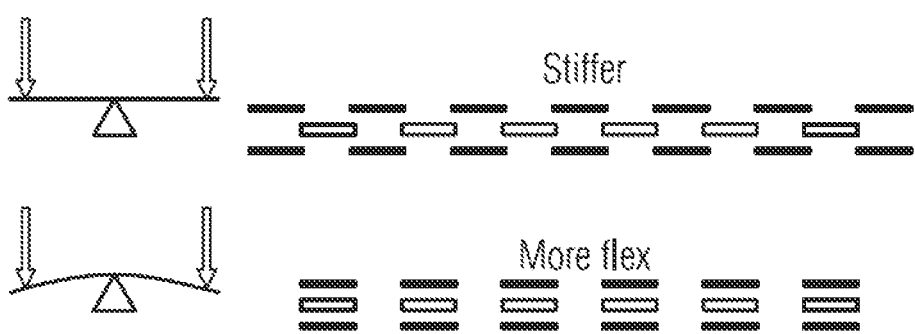

soft
stiff

FIG 16p
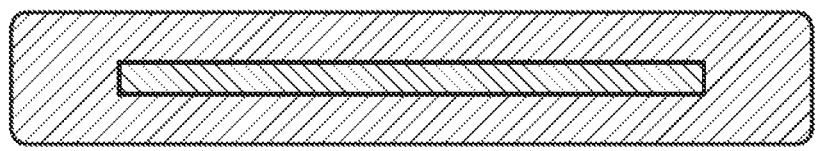
FIG 16q
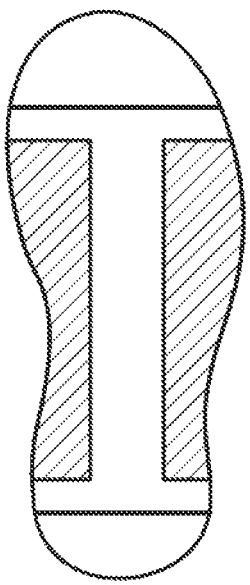

Tighten for stiffer
(vertical damping)

FIG 17e
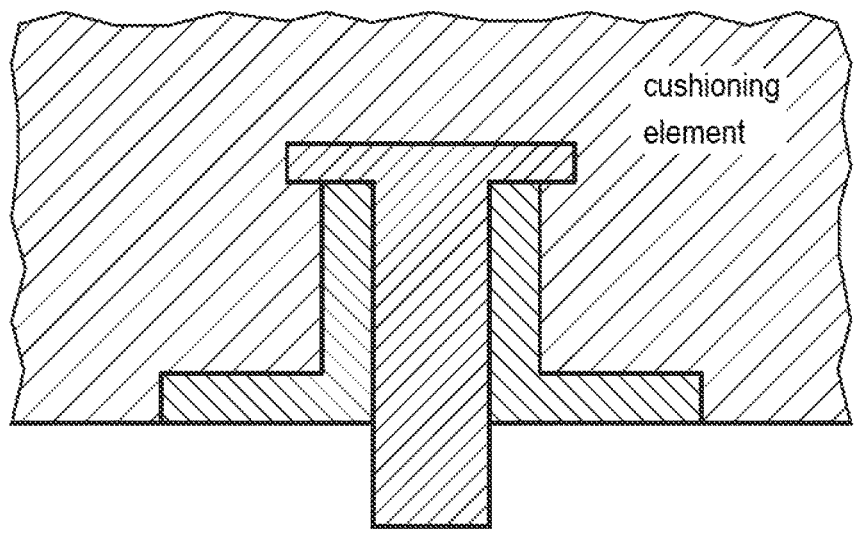
FIG 18a  Rotational range
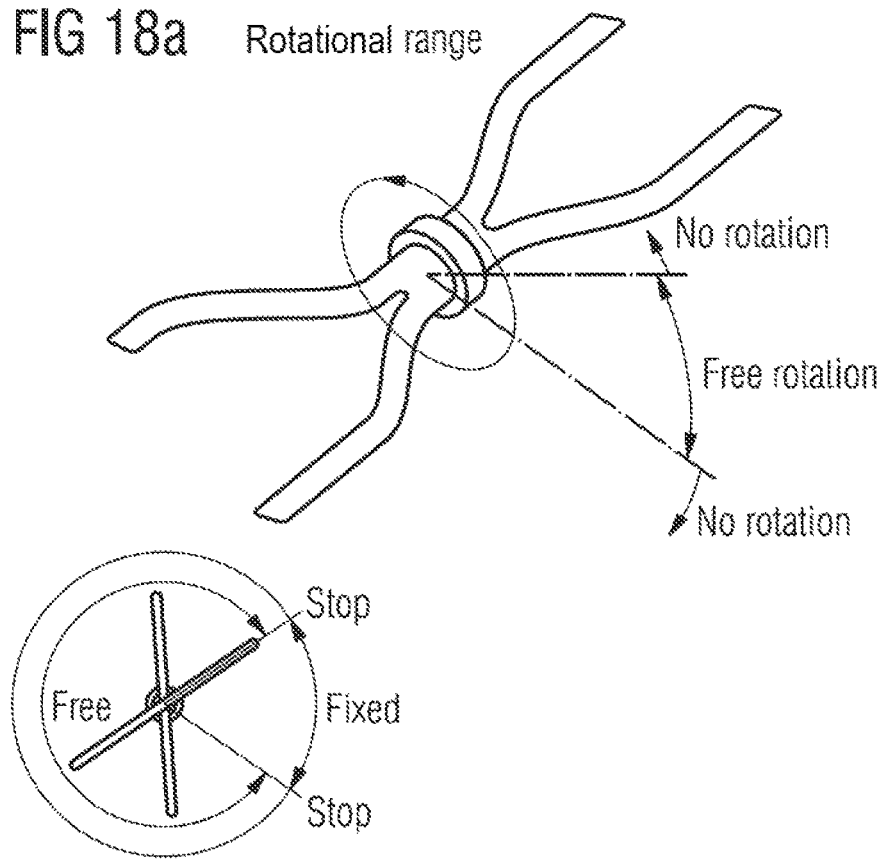

FIG 20a
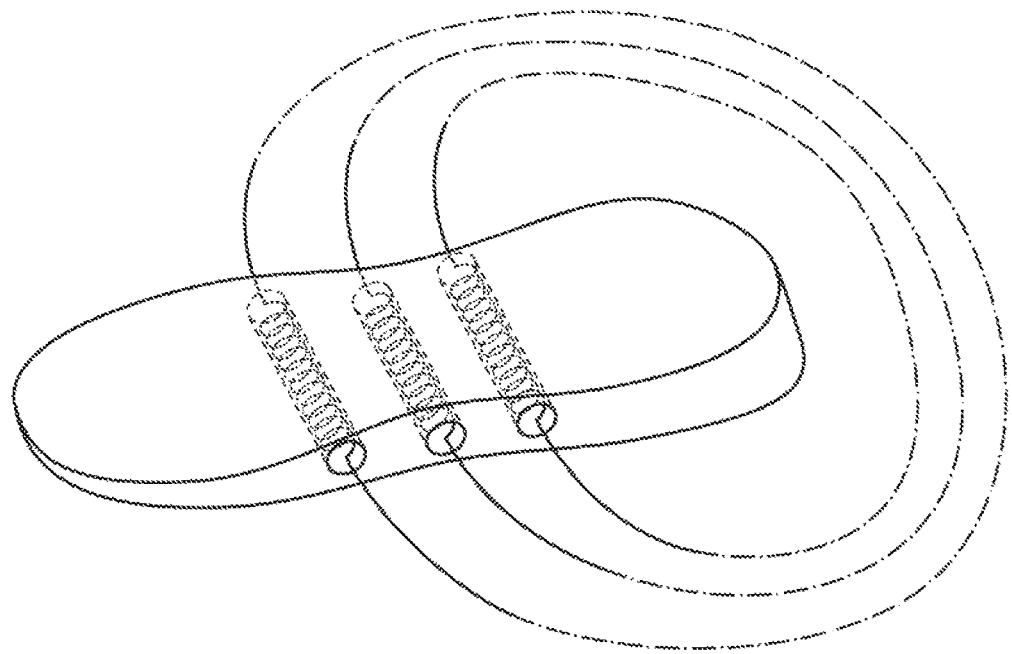
FIG 20b
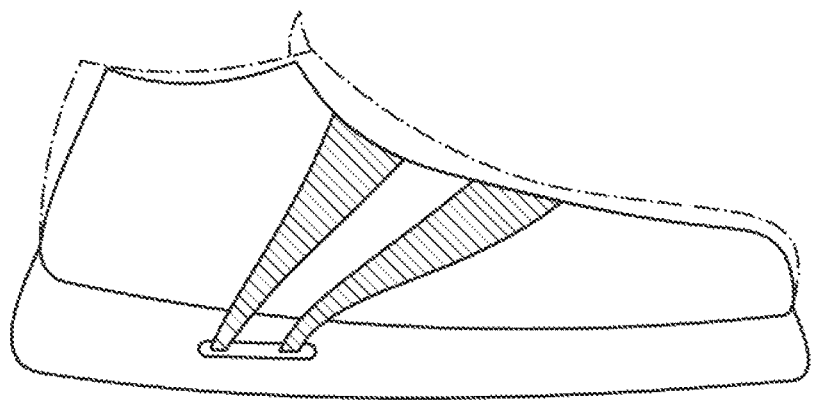
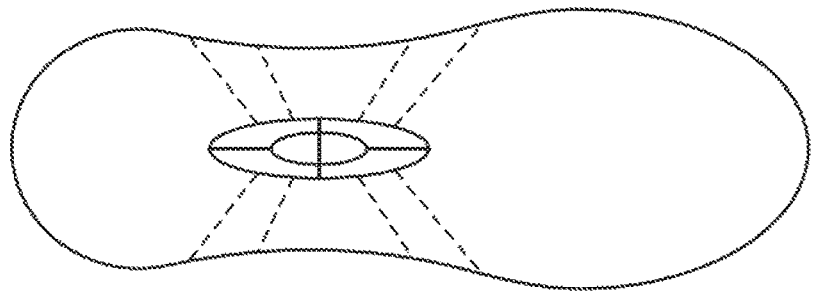

CO-MOLDED 3D ELEMENTS

CROSS REFERENCE TO RELATED APPLICATION

This application is related to and claims priority benefits from German Patent Application No. DE 10 2014 216 115.0, filed on Aug. 13, 2014, entitled CO-MOLDED 3D COMPONENTS ("the '115 application"). The '115 application is hereby incorporated herein in its entirety by this reference.

FIELD OF THE INVENTION

The present invention relates to a support element for the sole of a shoe, in particular a sports shoe, a sole as well as a shoe with such a support element and a method for the manufacture of a support element.

BACKGROUND

The design of a shoe sole renders it possible to provide a shoe with a plethora of different properties, which may be pronounced to different degrees depending on the kind of shoe. Primarily, shoe soles serve protective functions. They protect the foot from injury by their increased hardness compared to the shoe shaft, for example caused by pointed objects on which the wearer may tread. Furthermore, the shoe sole usually protects the shoe from excessive wear by an increased abrasion resistance. Shoe soles may also increase the grip of a shoe on the respective ground. Further functions of a shoe sole may be to provide a certain stability to the course of movements. In addition, a shoe sole may provide a damping action to cushion the forces occurring during contact of the shoe with the ground. Finally, a shoe sole may also protect the foot from dirt or spray water or provide a plurality of further functionalities.

To meet this plurality of requirements, which arise from the above mentioned exemplary functions, many different materials for the manufacture of shoe soles are known from the prior art. As examples for these different materials, ethylene-vinyl-acetate (EVA), thermoplastic polyurethane (TPU), rubber, polypropylene (PP) or polystyrene (PS) shall be mentioned here. Furthermore, the use of expanded materials, in particular expanded thermoplastic polyurethane (eTPU) or expanded polyether-block-amide (ePEBA), were considered for the manufacture of a shoe sole. Expanded TPU and expanded PEBA distinguish themselves by a low weight and good elasticity- and damping properties.

For example, the WO 2005/066250 A1 describes a sole made from expanded thermoplastic polyurethane, which may be connected with a shoe shaft without an additional bonding agent. The DE 10 2012 206 094 A1 and EP 2 649 896 A2 disclose shoes with soles with particles made from eTPU and methods for their manufacture.

To selectively influence the properties of the sole, the use of additional functional elements, as for example a reinforcing element or a support element, is known from the prior art. Such a reinforcing- or support element can increase the stability of the sole in chosen regions, like, for example, the medial region of the midfoot, and can serve to relief the musculoskeletal system, for example during running on uneven terrain or when over-pronating.

A disadvantage of the reinforcing- and support elements known from the prior art is, however, that they are typically integrally molded or formed from a single base material. Hence, the flexibility- and deformation properties of the reinforcing element are already determined throughout the entire reinforcing element to large degrees by the selection of the base material. Also, the number of possible functions that can be assumed by such a reinforcing element is limited.

It is therefore a problem underlying the present invention to provide support elements for soles of shoes and methods for their manufacture that further increase the possibilities to influence the properties of a sole. Herein, the manufacture shall involve as small a number of individual manufacturing steps as possible and as little manufacturing expenses as possible.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a sole comprises a support element at least partially enclosed by the sole, wherein the support element comprises a first partial member formed of a first material, and a second partial member formed of a second material, wherein the first partial member is mechanically joined to the second partial member in a connection region, wherein the connection region is configured to allow the first partial member to rotate or slide relative to the second partial member.

In certain embodiments, the first material and the second material are not the same material.

In some embodiments, the first partial member, the second partial member, and the connection region are co-molded and joined together in a single fabricating step.

According to some embodiments, the first material and the second material may be chemically incompatible. In further embodiments, the first material has a melting temperature that is higher than a melting temperature of the second material.

In some embodiments, the first material and the second material are plastic materials, wherein the two plastic materials are chosen such that the connection region does not comprise a chemical bond between the two plastic materials. The two plastic materials may not form the chemical bond due to an additive contained in at least one of the two plastic materials.

In these embodiments, the first material may comprise polyamide and/or polytetrafluoroethylene, and the polyamide may be polyamide-6.6. The second material may comprise polyamide, polyoxymethylene, and polytetrafluoroethylene, and the polyamide may be polyamide-12.

In certain embodiments, the connection region comprises at least one locking direction, wherein a movement of the first partial member relative to the second partial member in the at least one locking direction is more strongly restricted than in another direction. In further embodiments, the connection region comprises at least one locking axis, wherein a rotation of the first partial member relative to the second partial member about the at least one locking axis is more strongly restricted than a rotation around another axis.

In additional embodiments, the connection region is a ball joint and/or a piston arranged inside a cylinder. The connection region may be configured so that a movement of the first partial member relative to the second partial member creates a pumping action.

In some embodiments, the support element may be positioned within the sole such that the movement of the first partial member relative to the second partial member is created by a wearer treading on the sole.

At least one of the first partial member and the second partial member may be a planar member and/or may comprise a rod-shaped section, wherein the rod-shaped section is inserted into a cylinder in the connection region.

According to some embodiments, the first partial member is mechanically joined to a plurality of second partial members in a plurality of connection regions, wherein each of the plurality of connection regions is configured to allow each of the plurality of second partial members to rotate or slide relative to the first partial member. In further embodiments, the second partial member is mechanically joined to a plurality of first partial members in a plurality of connection regions, wherein each of the plurality of connection regions is configured to allow each of the plurality of first partial members to rotate or slide relative to the second partial member. In additional embodiments, a plurality of first partial members are mechanically joined to a plurality of second partial members in a plurality of connection regions, wherein the plurality of connection regions are configured to allow each of the plurality of first partial members to rotate or slide relative to each of the plurality of second partial members in an alternating pattern.

The sole may further comprise a cushioning element that at least partially encloses the support element. The cushioning element may comprise randomly arranged particles of an expanded material. In these embodiments, the particles of the expanded material are selected from a group consisting of expanded thermoplastic polyurethane particles and expanded polyether-block-amide particles.

According to some embodiments, a shoe may comprise a sole as described above.

According to certain embodiments of the present invention, a method of manufacturing a support element, wherein the support element comprises a first partial member, a second partial member, and a connection region, the method comprising injection molding at least one of the first partial member and the second partial member, and mechanically joining the first partial member and the second partial member in the connection region, wherein the connection region is configured to allow the first partial member to rotate or slide relative to the second partial member.

In some embodiments of the method, the first partial member and the second partial member are formed of plastic materials, wherein the two plastic materials are chosen such that the connection region does not comprise a chemical bond between the two plastic materials. The two plastic materials may not form the chemical bond due to an additive contained in at least one of two plastic materials.

The first partial member and the second partial member may be formed of chemically incompatible materials. In further embodiments, the first partial member is formed of a first material, and the second partial member is formed of a second material, wherein the first material has a melting temperature that is higher than a melting temperature of the second material.

In some embodiments, the injection molding step comprises injection molding the second partial member into a mold in which the first partial member is arranged. The method may further comprise injection molding the first partial member.

In additional embodiments, the injection molding step comprises injection molding the first partial member into a mold in which the second partial member is arranged. The method may further comprise injection molding the second partial member.

In further embodiments, the injection molding step and the mechanical joining step are simultaneously performed in a single manufacturing step.

BRIEF DESCRIPTION OF THE DRAWINGS

In the following detailed description, embodiments of the invention are described referring to the following figures:

FIGS. 6a-c are views of a support element, according to certain embodiments of the present invention.

FIGS. 7a-g are views of a piston/cylinder support element, according to certain embodiments of the present invention.

FIGS. 8a-b are views of a sole with the support element of FIGS. 7a-7g.

FIGS. 9a-c are views of a ball joint support element, according to certain embodiments of the present invention.

FIGS. 12a-b are views of a support element with multiple first and/or second partial members, according to certain embodiments of the present invention.

FIGS. 13a-c are views of a manufacturing method for forming support elements, according to certain embodiments of the present invention.

FIGS. 15a-k are sketches of support elements, according to certain embodiments of the present invention.

FIGS. 17a-e are sketches of support elements, according to certain embodiments of the present invention.

FIGS. 18a-h are sketches of support elements, according to certain embodiments of the present invention.

FIGS. 20a-b are sketches of support elements for use with a lacing system of a shoe, according to certain embodiments of the present invention.

BRIEF DESCRIPTION

Figure 1A:
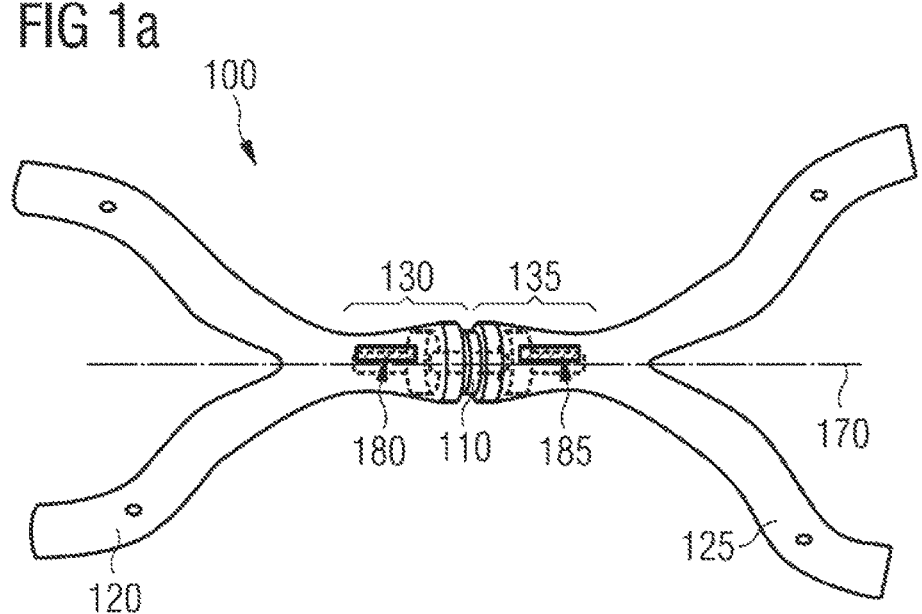
FIGS. 1a-b are views of a support element, according to certain embodiments of the present invention.

According to an aspect of the present invention, this problem is at least partially solved by a support element for a shoe sole or for a cushioning element, which comprises a first partial member and a second partial member, wherein the second partial member is rotatably and/or slidably connected with the first partial member in a connection region by an injection molding process.

The support element may, for example, allow locally influencing the elasticity-, flexibility- and deformation properties of the sole as desired. Due to the rotatable and/or slidable connection of the first partial member with the second partial member, the possibilities of influencing the properties of the sole by use of the support element may be significantly increased in comparison with an integrally molded support element. It is, for example, possible to influence the flexibility of the sole independently of the torsion stiffness of the sole in different regions of the sole. The rotatable and/or slidable connection may, in particular, be arranged in regions of the sole in which an increased movability of the sole shall be maintained. A rotatable and/or slidable connection may, for example, be arranged in the forefoot region, in which the sole shall comprise a sufficient degree of flexibility along its longitudinal direction in order to not impair roll-off of the foot over the toes. In the midfoot region or in the toe region, it may be beneficial if the sole is provided relatively stiff, to prevent injuries of the wearer. An inventive support element may thus allow providing relatively stiff and stable regions of the sole which may be separated from one another by a flexible part of the sole. With an integrally formed support element without a rotatable and/or slidable connection of two partial members, this may be hard to achieve, if at all possible.

In the following, further design possibilities and optional features of inventive support elements are described, which may be combined by the skilled person as desired to achieve the respective desired effect with regards to influencing the properties of the sole.

The first partial member may comprise a first plastic material and the second partial member may comprise a second plastic material, wherein the two plastic materials are chosen such that the connection region does not comprise a chemical bond of the two materials.

By such a choice of the first and second plastic material, the support element may be manufactured in a simple injection molding process in such a manner that the first and the second partial members comprise the rotatable and/or slidable connection, without subsequent method steps being necessary for this like, for example, a subsequent bonding, clipping together, e.g. in a snap-fit manner, or different kind of assembling of the first and second partial members. This may increase durability of the rotatable and/or slidable connection significantly and simplify the manufacture. This may also mean that the typical tolerances that might be needed with snap-fit pieces may not have to be observed. This can lead to more consistent pieces and "perfect fit and function".

Herein, the first plastic material and the second plastic material may be chemically incompatible. This will be referred to in the following as "Option I".

Due to the use of such incompatible plastic materials, no additional measures must be taken during the manufacture to avoid gluing, melting together or the creation of another kind of chemical bond between the two plastic materials. It is, for example, possible that the first plastic material comprises or consists of a polyamide and the second plastic material comprises or consists of polyoxymethylene (POM) (or vice versa). The POM may be overinjected over the polyamide, wherein due to the chemical incompatibility of the two materials, no chemical bond forms in the connection region.

It is also possible that the first plastic material has a first melting temperature that is significantly higher than a second melting temperature of the second plastic material (or vice versa). This will be referred to in the following as "Option II".

It is then possible that the first plastic material is overinjected with the second plastic material at a temperature lower than the first melting temperature. In this way, no chemical bond is created in the connection region as the first material does not melt during overinjection with the second material. It is, for example, possible that the first plastic material comprises or consists of a polyamide 6.6 (PA6.6) with a melting temperature of around 260° C., which is overinjected with the second plastic material that comprises or consists of a polyamide 12 (PA12) with a melting temperature of around 180° C. (or vice versa), wherein the overinjection is performed at a temperature below 260° C. but preferably higher than 180° C.

It is furthermore possible that the first and second plastic material do not form a chemical bond in the connection region due to an additive contained in either or both of the first and/or second plastic material. This will be referred to in the following as "Option III".

This may allow broadening the range of materials that may be used as first or second plastic material, respectively, while still guaranteeing the creation of the rotatable and/or slidable connection of the first and second partial members. The first plastic material could, e.g. comprise a polyamide that is modified with lubricant, for example a polyamide modified with polytetrafluoroethylene (PTFE), and the second plastic material could comprise or consist of an unmodified polyamide (or vice versa). The second plastic material could then e.g. be overinjected over the first plastic material, wherein due to the added lubricant in the first plastic material, no chemical bond forms in the connection region.

It is mentioned here, that Options I, II and III can also be combined with one another in certain embodiments of an inventive support element.

The first plastic material may, for example, comprise one or more of following materials: polyamide (PA), in particular polyamide-6.6 (PA6.6), polytetrafluoroethylene (PTFE).

The second plastic material may, for example, comprise one or more of the following materials: polyamide (PA), in particular polyamide-12 (PA12), polyoxymethylene (POM), polytetrafluoroethylene (PTFE).

These materials are well suited for the manufacture of a support element, because they are easily processed and cheap and can meet the typical requirements of such support elements with respect to their flexibility- and elasticity properties. Herein, the selection of the first plastic material and the second plastic material may be carried out in such a way that during the injection molding no chemical bond is formed between the first and second plastic material in the connection region, as mentioned above.

Moreover, when used in cushioning elements or soles for shoes (cf. below), in particular in midsoles or parts of midsoles, such support elements can have a complex structure without being locked into the cushioning element or sole. The material of the support element in contact with the material of the cushioning element or sole can be incompatible to the material of the cushioning element or sole, so that the support element is surrounded or partially surrounded by the cushioning element or sole, but does not stick or bond to it. In particular, no chemical bond is created. This may be beneficial, for example to allow the support element to move with the material of the cushioning element or sole. The interaction of the support element and the cushioning element or sole may thus be optimized. The support element can react to stretch, twist and compression movements of the cushioning element or sole. Therefore, the support element can control and optimize the movement of the cushioning element or sole.

In some embodiments, the cushioning element can be changed in its position within the sole. It can e.g. be moved sideways or flipped in its horizontal or vertical direction to change the properties of the sole comprising the cushioning element.

A support element might also be embedded within a cushioning element or sole and have an adjustment device facing to one surface of the cushioning element or sole. Hence, the element may be adjusted individually by a wearer.

In this regard, in particular cushioning elements and soles made of particle foams (cf. below) provide another benefit for such embedded support elements. The support elements can be placed in a mold for creating the cushioning element or sole, which at least partially surrounds the support element (cf. also below). The particles used in this process may be inserted as solid expanded particles into the mold. Only the surface of the particles may then be melted for creating the particle foam and hence the cushioning element or sole. Therefore, there will be no liquid material present within the mold during the manufacture which could flow into the support element and lock it its position or prevent or limit the movement in certain positions by blocking the movable connections or the like. It is therefore possible to embed support elements with very complex structures.

It is furthermore envisioned that the support element comprises at least one locking direction, in which locking direction a translation of the first partial member relative to the second partial member is more strongly restricted than in another direction. This other direction will be designated as free direction in the following.

In this way, it is, for example, possible to influence the properties of the sole to the effect that material compressions, material elongations or shearing movements in the locking direction are decreased in comparison to the free direction and that the sole therefore appears stiffer or more stable, respectively, in the locking direction than in the free direction. Herein, this free direction may, for example, be perpendicular to the locking direction or it may be aslant to it. It is, in particular, envisioned that the shearing ability or compressibility under translations in the locking direction initially comprises a first, smaller value and only for translations above a certain threshold value comprises a second, larger value. In this manner, excessive shearing of the sole may be avoided or limited, for example to avoid injuries caused by an excessive destabilization of the foot.

It is also possible that the support element comprises at least one locking axis, around which locking axis a rotation of the first partial member is more strongly restricted than a rotation around another axis. This other axis will be designated as free axis in the following.

This may have the effect that the torsion stiffness of the sole around the locking axis is larger than the torsion stiffness around the free axis. Also here, it is possible that for twisting around the locking axis, the torsion stiffness initially comprises a first, smaller value and only for a twist above a certain threshold angle comprises a second, larger value. In this manner, excessive twisting of the sole around the locking axis may be avoided or limited, which may otherwise lead to injuries.

In this case, too, the free axis may, for example, be perpendicular to the locking axis or it may be aslant to it. In particular, the locking axis may be oriented in a direction from the heel of the sole to the tip of the foot, such that the torsion stiffness of the sole with respect to this longitudinal axis is higher than a torsion stiffness of the sole with respect to a free transversal axis from the medial to the lateral side of the sole. Or the reverse situation may be the case, i. e. the locking axis runs in medial-lateral direction.

The free (transversal) axis may, in particular, run beneath the toe joints from the medial side of the sole to the lateral side of the sole, whereas the locking axis runs from the heel to the tip of the foot. This may allow providing a sole which is sufficiently flexible in the region of the toe joints to enable a natural roll-off of the foot and at the same time comprises a sufficiently high torsion stiffness around its longitudinal axis to prevent a twisting of ones ankle or a breaking out of the foot of a wearer.

In this regard, a support element that is provided hinge-like may, for example, also be envisioned, whose free hinge axis runs beneath the toe joints from the medial to the lateral side. Around this hinge axis, rotational motions of the hinge are easily possible, that is the sole facilitates roll-off of the foot. Rotations of the first and second wing of the hinge around another axis, for example around a locking axis arranged perpendicular to the hinge axis (for example, around the longitudinal axis of the sole) are essentially not possible.

The connection region may, for example, be provided as a ball joint.

A ball joint allows providing a connection region which allows a large degree of mobility and, in particular, rotational movements between the first and second partial members. Hence, such a ball joint may be employed in regions in which the sole shall be "movable". In combination with the locking axis it is, however, also possible with a connection region provided as a ball joint to control or influence the torsion stiffness of the sole around different axes independently from one another, for example.

The connection region may also comprise a piston and cylinder, in which cylinder the piston is arranged.

Connection regions provided in this manner may, for example, have the effect that the bending capabilities of a sole with such a support element can be reduced along the piston- and cylinder axis, i. e. the sole becomes stiffer along this axis, whereas the torsion stiffness around this axis is essentially left unaffected. Such a cylinder construction may also allow leaving shearing- or compression movements of the sole material along the cylinder axis initially unaffected, until a situation arises in which the piston hits an edge of the cylinder.

It is furthermore envisioned that the connection region is provided such that a movement of the first partial member relative to the second partial member creates a pumping action. Herein, the support element may be provided such that the movement of the first partial member relative to the second partial member is created by walking with the shoe sole.

Such a pumping action, in particular if this action is created by walking with the shoe sole, may be employed to transport air into the inner part of the shoe or out of it and therefore increase the ventilation of the inner part of the shoe and therefore of the foot. This may increase wearing comfort, in particular during longer wear of the shoe. It is, however, also possible that by means of the pumping action, a liquid is moved between different regions of the inner parts of the sole. The action may, for example, serve to transport a liquid from a first liquid bladder in a first region of the sole into a second liquid bladder in another region of the sole.

Instead of being provided to actively conduct such a pumping action, the support element may, in principle, also be provided in such a manner, that it acts as a valve to regulate such a liquid- or airstream.

It is also possible that the first partial member and/or the second partial member are provided as planar members.

A support element provided in a hinge-like manner and the possibilities for using such a support element have already been indicated. In general, partial members provided as planar members may allow influencing the properties of the sole and, in particular, its bendability/flexibility in (large) planar regions, to obtain a sole whose properties may be relatively constant across these planar regions. It can, for example, be desirable that the flexibility- and elasticity properties of the sole are uniformly influenced in the region of the toes, in the midfoot region, or in the heel region, to achieve a pleasant wearing sensation. Partial members provided in such planar manner may also act as a push-through protection, for example beneath the forefoot or the heel, to prevent injuries caused by pointed objects, etc., during treading down or push-off of the foot and to facilitate a secure wearing sensation.

Herein, the first planar member and the second planar member may be provided slidably with respect to each other.

It is, in particular, possible that the first planar member and the second planar member are facing each other with their planar surfaces, with it also being possible that there is some interspace between the first and the second planar member that may be filled with a material like a gel or a liquid, and that the planar members may be slid relative to each other along the planar surfaces. Such a construction may, for example, be used in the heel region, to alleviate shearing forces acting on the musculoskeletal system of the wearer when treading down, as for example described in the documents DE 102 44 433 B4 and DE 102 44 435 B4.

The first partial member and/or the second partial member may also comprise a rod-shaped section, which runs into the connection region.

Such rod-shaped sections may have an advantage that they take up a relatively small volume of the sole and therefore do not markedly influence the damping properties and damping capabilities of the sole. This may also mean saving weight compared to partial members provided in a different manner. At the same time, the rod-shaped sections may serve to increase the bending stiffness of the sole along an axis of the rod-shaped section, for example.

It is furthermore possible that the first partial member is connected rotatably and/or slidably with a plurality of second partial members in a plurality of connection regions by an injection molding process.

Here, the first partial member may act as a central partial member that is, for example, arranged in the middle of the sole, to provide the midfoot region and, in particular, the region of the arch of the foot with the desired stability. The second partial members connected rotatably and/or slidably with the first partial member may, for example, extend from this central first partial member in the direction of the edges of the sole, the tip of the foot, or the heel, in order to influence the stability- and elasticity properties of the sole in these regions as desired.

It is, in particular, possible that the first partial member and the plurality of second partial members form a skeleton-like structure within the sole, which allows influencing the properties of the sole in all or at least predominant parts of the sole. If the first and the plurality of second partial members are in addition (at least partially) provided rod-shaped, this may happen without significantly compromising the weight or the damping properties of the sole.

The opposite situation, in which the second partial member is connected rotatably and/or slidably with a plurality of first partial members in a plurality of connection regions by an injection molding process, is also envisioned.

It is, in particular, envisioned that a plurality of first partial members and a plurality of second partial members are alternatingly connected to each other rotatably and/or slidably in a plurality of connection regions.

It is hence possible to provide support elements that comprise a chain-like, skeleton-like or mesh-like structure and hence to influence the properties of the sole in numerous ways, selectively in specific parts of the sole or throughout the entire sole area.

Another aspect of the present invention relates to a cushioning element, in particular a midsole or part of a midsole, with an inventive support element. Herein, the cushioning element may comprise randomly arranged particles of an expanded material, for example of expanded thermoplastic polyurethane (eTPU) and/or expanded polyether-block-amide (ePEBA). The randomly arranged particles may be fused at their surfaces, for example by subjecting the particles to a heat, steam and/or pressure treatment within a mold, or the like.

Further aspects of the present invention relate to a sole with an inventive support element as well as a shoe, in particular a running shoe, with such a sole or cushioning element.

An inventive sole may, for example, comprise or be formed by a cushioning element, in particular a midsole, with a support element as discussed above. The support element could, however, also be part of a sole that does not comprise such a cushioning element.

For the sake of conciseness, reference is always made to a shoe sole in the following. However, if applicable, the case of an individual cushioning element is always also implied.

For such a sole or shoe, it is possible within the scope of the invention to combine the discussed design possibilities and optional features of an inventive support element in any order, and it is also possible to leave out certain aspects, if these should appear dispensable for the respective shoe or the respective sole.

Explicit reference is furthermore made to the fact that embodiments of an inventive sole or an inventive shoe may comprise further elements, in particular three-dimensionally formed elements, in addition to an inventive support element, like for example: stabilizing elements, support elements, in particular elements providing a banking support to the foot during lateral side-cut movements, elements to improve breathability, elements to improve the grip of the sole/shoe on the ground, further cushioning or damping elements, elements for decorative purposes, e.g. LEDs, elements facilitating a connection of a shoe upper with the sole, elements controlling the stiffness, shearing motions and deformation of the sole material, fluid or gas bladders or a system thereof, elements providing a spring-like effect to the sole, or nay further sole elements known from the prior art.

In addition, a further aspect of the present invention relates to a method for the manufacture of a support element for a shoe sole (or for a cushioning element, cf. the comment above) with a first and a second partial member, wherein the first and the second partial member are rotatably and/or slidably connected to each other in a connection region by injection molding.

As already mentioned, it may be beneficial in this regard that the rotatable and/or slidable connection in the connection region is created during the injection molding. It is therefore not necessary to mechanically join together the first and the second partial member in additional processing steps, for example by means of snapping or clipping together or other ways of assembling. In this manner, a rotatable and/or slidable connection may be achieved that is particularly lasting and durable and shows little material fatigue and also the usual tolerances that must be observed for snap-fit pieces can be decreased or completely omitted.

In particular, for the inventive method as described herein, the material for the manufacture of the first and second partial member, respectively, may be chosen and the method be adapted as described as Options I, II and III above.

For example, in the method, the second partial member may be manufactured and simultaneously connected rotatably and/or slidably with the first partial member in the connection region by the injection molding in a mold, in which the first partial member is arranged. Herein, the first partial member may also be manufactured by injection molding, in certain embodiments within the same mold, and in other embodiments in a different position of the mold. In case the materials are chosen according to Option II, for example, the molding temperature for the manufacture of the first and second partial member, respectively, may be suitably adjusted.

The second partial member may, for example, be molded around or into the first partial member in the connection region, such that connection regions may be manufactured that comprise undercuts and so forth. As the second partial member is manufactured simultaneously to the creation of the connection in the connection region, the durability and resistance of the support element may be further improved. This may in particular apply, if the first partial member is also created by injection molding, e.g. at a higher temperature if the materials are chosen according to Option II.

The opposite case, in which the first partial member is manufactured and simultaneously connected rotatably and/or slidably with the second partial member in the connection region by the injection molding in a mold, in which the second partial member is arranged, is also possible. Herein, the second partial member may also be manufactured by injection molding, in some embodiments within the same mold but in other embodiments in a different position of the mold.

It is furthermore possible that the first and the second partial member are manufactured and simultaneously connected rotatably and/or slidably to each other in the connection region in a single manufacturing step by the injection molding. This may, in particular, be the case if the materials are chosen according to Option I and/or Option III.

By use of incompatible plastic materials, e.g. according to Options I, II and/or III, the inventive method may therefore allow providing a particularly durable and resistant support element with one or more movable connection regions in a particularly easy manner and with very little manufacturing effort.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain embodiments of the invention are described in the following detailed description with reference to support elements for the soles of running shoes. It is, however, emphasized that the present invention is not limited to these embodiments. Rather, the present invention may also be employed in soles for other kinds of shoes, in particular soles for sports shoes, hiking shoes, leisure shoes, street shoes, working shoes and so forth.

It is also mentioned that in the following, only individual embodiments of the invention can be described in more detail. The skilled person will realize, however, that the features and design options described in relation to these specific embodiments may also be modified or combined in a different manner within the scope of the invention, and individual features may also be omitted, if these seem dispensable.

Figure 1B:
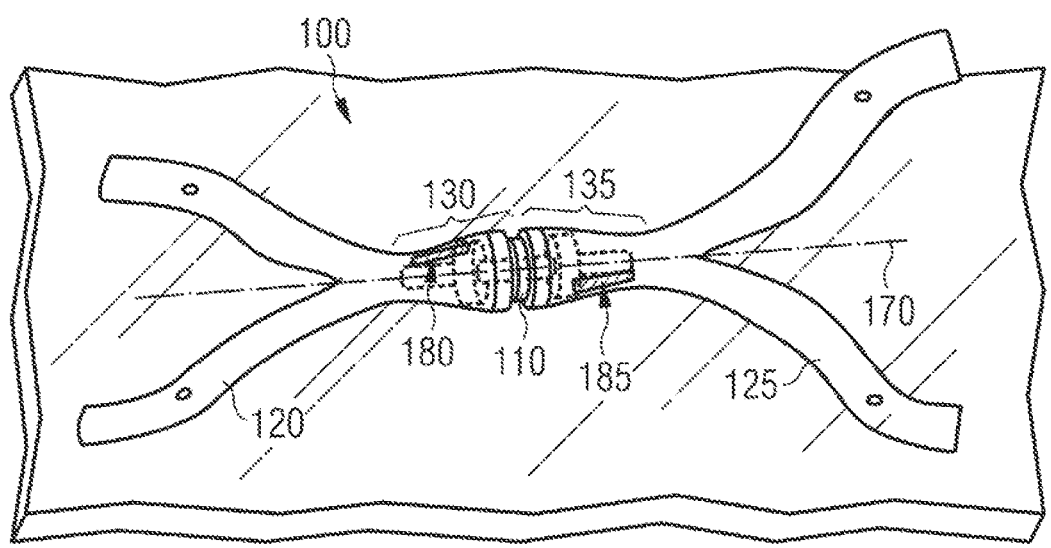

FIGS. 1a-b show embodiments of an inventive support element 100. The support element 100 comprises a first partial member 110 and two second partial members 120 and 125. The second partial member 120 is connected rotatably around the rotation axis 170 with the first partial member 110 in an injection molding process in the connection region 130. Also, the other second partial member 125 is connected rotatably around the rotation axis 170 with the first partial member 110 in an injection molding process in a further connection region 135.

The two second partial members 120 and 125 each comprise a Y-shape, formed by two flattened arms, respectively.

FIG. 1a shows the support element 100 in a neutral position, in which the two second partial members 120, 125 are arranged in a plane. FIG. 1b, on the other side, shows a position of the support element 100, in which the two second partial members 120 and 125 are rotated with respect to each other, which is made possible by their respective rotatable connection to the first partial member 110. The different orientations of the two second partial members 120 and 125 are shown in FIGS. 1a-b, in particular, with the help of two notches 180 and 185 in the two second partial members 120 and 125, which are highlighted in FIGS. 1a-b to facilitate perception.

The first partial member 110 and both second partial members 120 and 125 may be provided such that in the neutral position as shown in FIG. 1a the support element 100 snaps into place such that an increased force, e. g. compared to the position shown in FIG. 1b, is necessary to rotate the second partial members 120 and 125 with respect to the first partial member 110 and therefore also with respect to each other.

A translation of the second partial members 120 and 125 in relation to the first partial member 110 is not possible for the present support element 100. The support element 100 can therefore serve, for example, to control the flexibility and bending properties of the sole, without adversely influencing the torsion capabilities around the axis 170.

In the present case, the first partial member 110 was manufactured from polyamide 6.6 with a lubricant added in a first position of the mold used, whereas the second partial members 120 and 125 were manufactured from polyamide 12 at a lower temperature and in a second position of the mold. A rotational mold was used, but other kinds of molds are also possible.

In principle, it is also possible to use other materials, wherein the first partial member 110 may comprise a first plastic material and the second partial members 120 and 125 may comprise a second plastic material. Herein, it may be beneficial to choose the two plastic materials in such a manner, that the two materials do not form a chemical bond during the injection molding in the connection regions 130 and 135. The first plastic material may, for example, be chosen from the following materials: polyamide (PA), in particular polyamide-6.6 (PA6.6), polytetrafluoroethylene (PTFE).

The second plastic material may, for example, be chosen from the following materials: polyamide (PA), in particular polyamide-12 (PA12), polyoxymethylene (POM), polytetrafluoroethylene (PTFE).

In general, any combination of Options I, II and III as discussed above may be used for the manufacture of the support element 100.

Figure 2A:
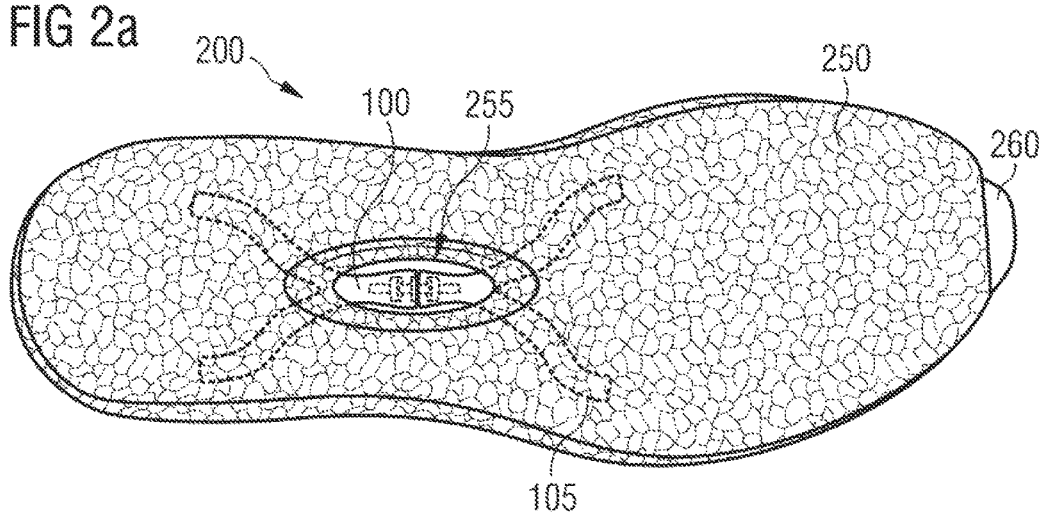
FIGS. 2a-g are views of a sole with the support element of FIGS. 1a-1b.
Figure 2B:
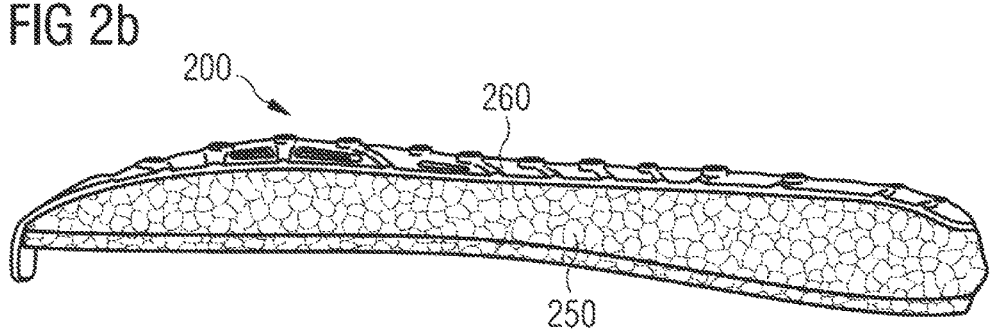
Figure 2C:
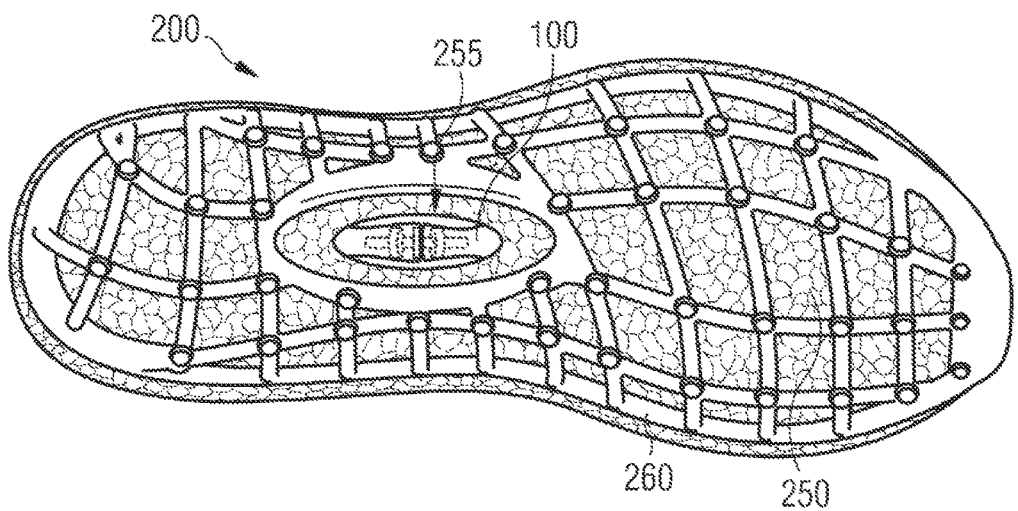
Figure 2D:
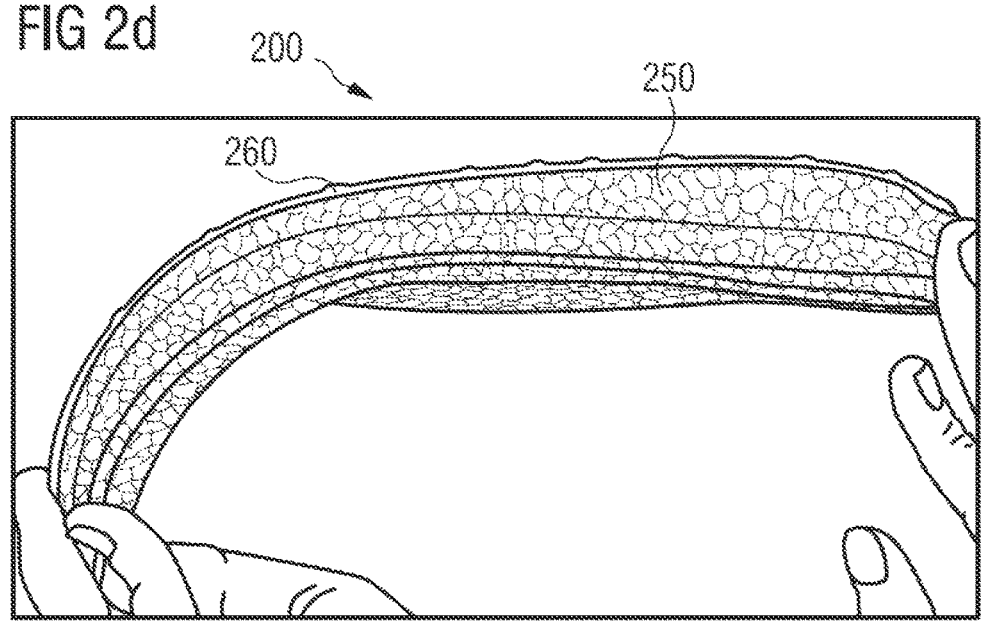
Figure 2E:
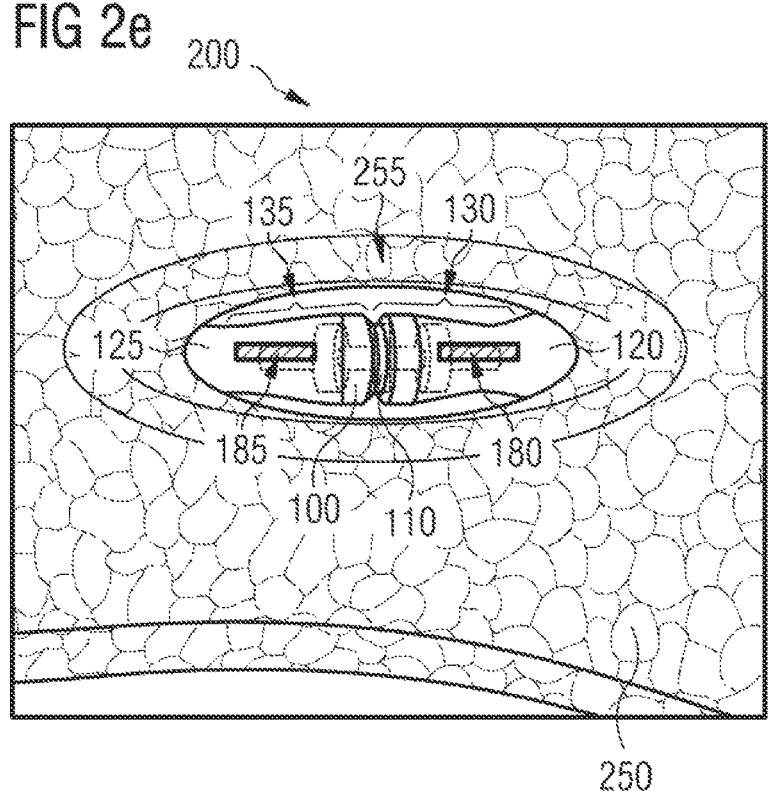
Figure 2F:
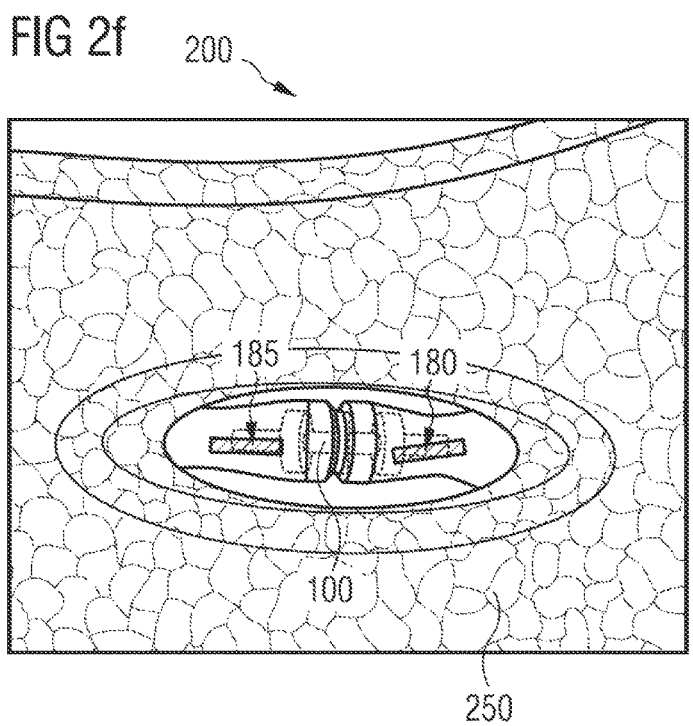

FIGS. 2*a-g* show embodiments of an inventive sole 200. FIG. 2*a* shows the top side of the sole 200, FIG. 2*b* shows the lateral sidewall of the sole 200 and FIG. 2*c* the bottom side of the sole 200. FIG. 2*d* shows the sole 200 under a bending load. FIGS. 2*e* and 2*f* show close-up views of the sole 200 from its top side, wherein FIG. 2*f* corresponds to the state of the sole 200 shown in FIG. 2*g*, wherein a torsion force is applied to the sole 200.

The sole 200 comprises a cushioning element in form of a midsole 250. The midsole 250 comprises randomly arranged particles of an expanded material, in the present case of expanded thermoplastic polyurethane (eTPU), that are fused at their surfaces. Alternatively, the midsole 250 may also comprise randomly arranged particles from expanded polyether-block-amide (ePEBA) that are fused at their surfaces. The sole 200 furthermore comprises an outsold 260, which, in the present case, is provided grid- or net-like.

The midsole 250 further comprises a support element 100. This is the support element 100 as it is shown in FIGS. 1*a* and 1*b*. Only the coloring of the first partial member 110 of the support element 100 is chosen differently to what is shown in FIGS. 1*a* and 1*b*. The first partial member 110 as well as the two connection regions 130 and 135, in which the two second partial members 120 and 125 are rotatably connected to the first partial member 110, are arranged in a window 255 of the midsole, such that this region of the support element 100 is visible from the outside and the movability of the support element 100 is not compromised in the region of the connection regions 130 and 135.

The support element is arranged within the midsole 250 such that the flattened arms of both Y-shaped second partial members 120 and 125 extend approximately through the middle (with respect to a direction from the top side of the sole to the bottom side of the sole) of the midsole 250. Different arrangements are, however, also conceivable.

As can be gathered from FIG. 2*a*, the dimensions of the support element 100, which are indicated in FIG. 2*a* by a dashed line 105, are chosen such that the support element extends from the window 255 in the midsole to a certain degree into the heel region as well as into the midfoot region. The present support element 100 does not extend, or at least not to a large degree, into the forefoot region.

This can have the effect that the sole 200 is comparatively stiff with regard to bendings in the regions into which the support element 100 extends, whereas in the forefoot region, into which the support element 100 does not extend, the sole 200 is more flexible, in order to facilitate roll-off over the forefoot, as shown in FIG. 2*d*.

Figure 2G:
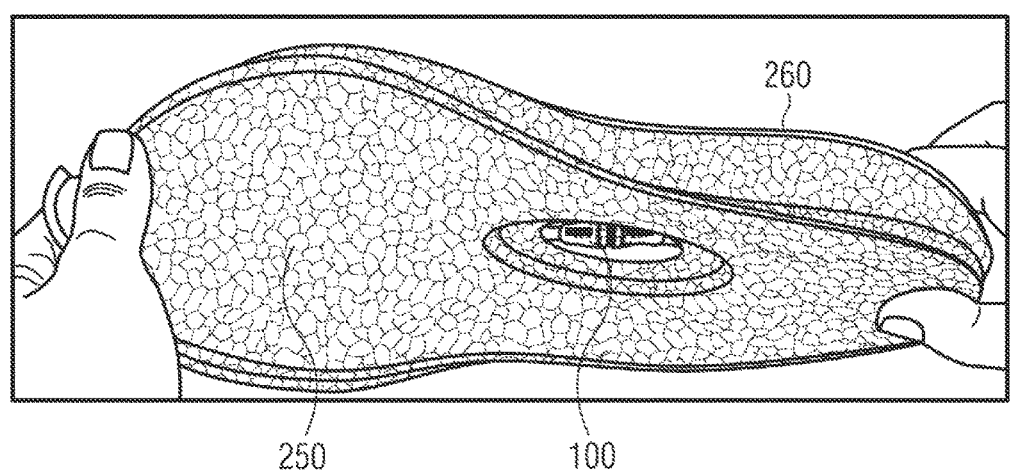

In FIGS. 2*e* and 2*f*, close-up views of the window 255 of the midsole 250 and the parts of the support element 100 arranged therein are shown. As already mentioned, in FIG. 2*e* the sole 200 was photographed in a neutral, force-free state, whereas the close-up view of FIG. 2*f* shows the sole 200 in the state which is depicted in FIG. 2*g* and in which a torsion force is applied to the sole 200. By looking at the two notches 180 and 185 in the two second partial members 120 and 125 of the support element 100, it is clearly envisioned that the two second partial members 120 and 125 follow the twisting of the sole 200 by a rotation relative to each other. This rotation relative to one another is made possible by the fact that each of the two second partial members 120 and 125 is rotatably connected to the first partial member 110. In combination with the representation of FIG. 2*d*, it becomes apparent for the skilled person that the support element 100 may, for example, be used to increase the bending stiffness of the sole 200, for example, in the midfoot region and in the heel region, wherein at the same time the torsion capabilities of the sole 200 shall essentially be maintained. By a suitable design of the connection regions 130 and 135, the torsion capabilities of the sole 200 may, however, be further influenced. For example, the larger the friction during rotations of the second partial members 120 and 125 relative to the first partial member 110, the larger the torsion stiffness of the sole 200 may be. Further possibilities of exerting influence on the properties of the sole 200 are apparent to the skilled person.

Figure 3:
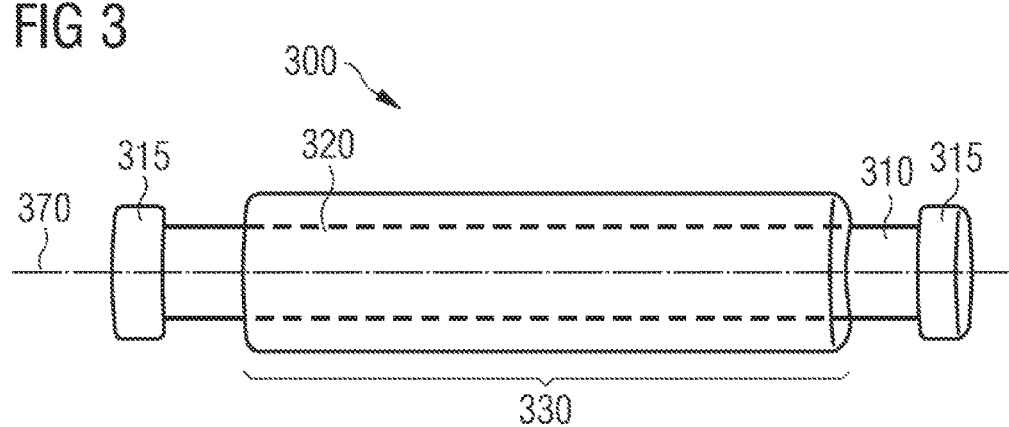
FIG. 3 is a view of a support element, according to certain embodiments of the present invention.

FIG. 3 shows further embodiments of an inventive support element 300. The support element 300 comprises a first partial member 310. The first partial member 310 is provided bone-shaped or double-T-shaped and comprises a circular cross-section. The first partial member 310 was manufactured in an injection molding process from polyamide 6.6 with a lubricant added in a first position of the mold. Around the first partial member 310, a second cylindrically formed partial member 320 was manufactured in a further injection molding step at a lower temperature and in a second position of the mold and simultaneously rotatably and slidably connected with the first partial member 310 in a connection region 330, which, in the present case, extends along the entire length of the second partial member 320. The second partial member 320 was manufactured from polyamide 12. However, other material combinations as described herein and, in particular, any combination of Options I, II and III discussed above might also be used.

The second partial member 320 is freely rotatable with respect to the first partial member 310 around the symmetry axis 370 of the support element 300. Moreover, the second partial member 320 is slidable along this symmetry axis 370 to a certain degree, more precisely until the second partial member 320 hits one of the two end regions 315 of the bone-shaped first partial member 310. A rotation or translation around or along another axis is essentially not possible for the present support element 300. The symmetry axis 370 hence forms a "free" axis, along or around which translations and rotations—at least in a certain range—are possible. On the other hand, all other axes or directions are locking directions or locking axes, respectively, which do not allow translations or rotations.

Figure 4A:
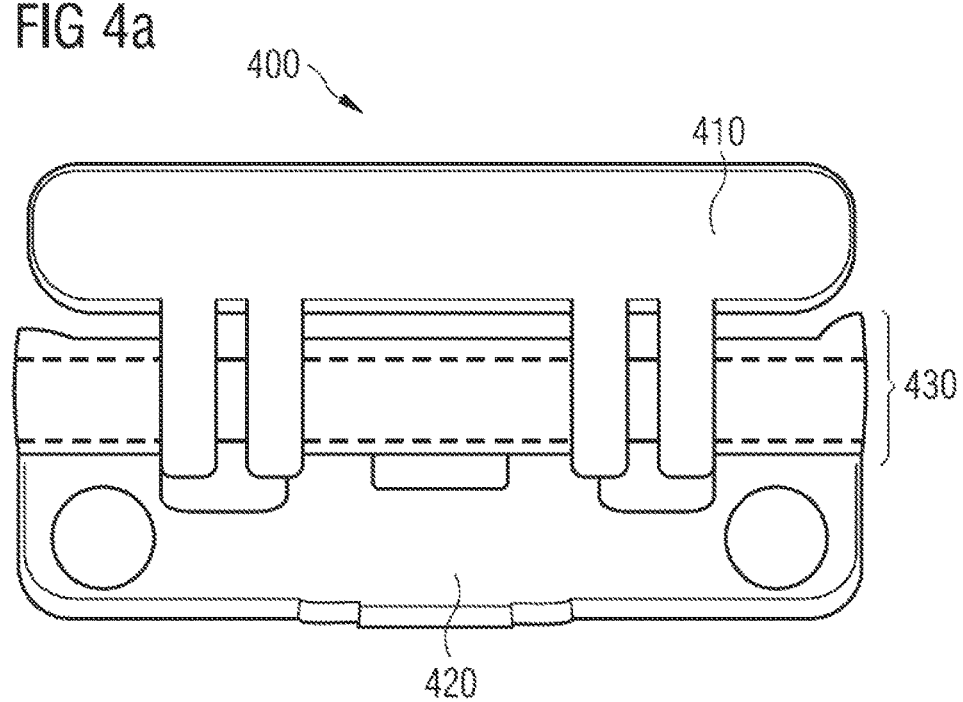
FIGS. 4a-c are views of a hinge-like support element, according to certain embodiments of the present invention.
Figure 4B:
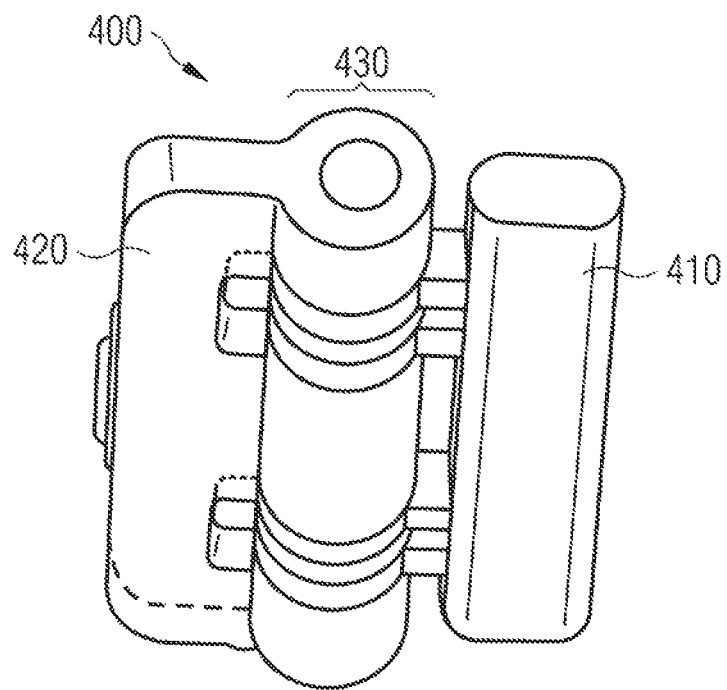
Figure 4C:
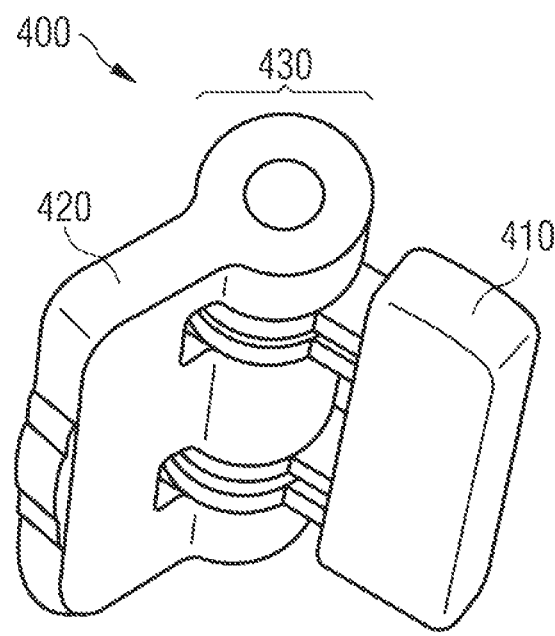

FIGS. 4*a* to 4*c* show further embodiments of an inventive support element 400. The support element 400 is provided hinge-like. FIGS. 4*a* and 4*b* show the support element 400 in a neutral position, in which the two hinge wings are arranged in a plane, whereas FIG. 4c shows the support element 400 in an angled position.

The support element 400 comprises a first partial member 410 and a second partial member 420, which are connected rotatably with each other in a connection region 430 in an injection molding process, and each partial member 410, 420 comprises a wing of the hinge. The first partial member 410 was manufactured from polyamide 6.6 with a lubricant added and the second partial member 420 from polyamide 12. The two partial members 410 and 420 may be manufactured and connected in a single injection molding process or multiple injection molding processes may be used to this end. In the present case, the first partial member 410 was first molded in a first position of the mold, and then the second partial member 420 was molded in a second position of the mold and at a lower temperature. However, other material combinations as described herein and, in particular, any combination of Options I, II and III discussed above might also be used.

Figure 5A:
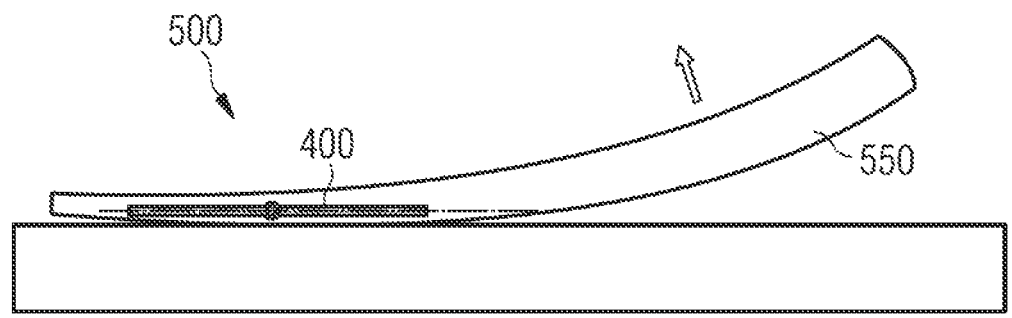
FIGS. 5a-b are views of a sole with the support element of FIGS. 4a-4c.
Figure 5B:
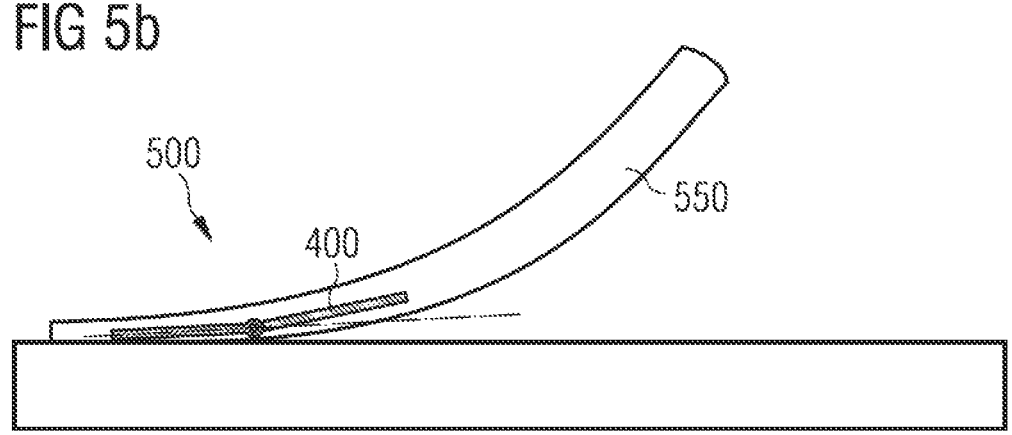

FIGS. 5a and 5b show a potential application of such a hinge-like support element 400 in embodiments of an inventive sole 500. Only a midsole 550 is schematically shown in whose forefoot region such a hinge-like support element 400 is arranged. The hinge axis of the support element 400 may, in particular, be arranged in the region below the toe joints, running from the medial side to the lateral side.

FIG. 5a shows the sole 500 during initiation of the final phase of the step cycle and FIG. 5b shows the sole 500 during push-off over the toe region at the end of the step cycle. Because of the chosen arrangement of the support element 400, in particular the arrangement of the hinge axis in the region below the toe joints, this push-off or rolling over the forefoot- and toe region is not inhibited. At the same time, the wings of the hinge of the support element 400 can stabilize the forefoot region and thus prevent twisting ones ankle and function as a push-through protection, e. g. to protect the foot of the wearer from pointed objects, etc., during treading down or push-off.

FIGS. 15a-k show schematic sketches of possible embodiments of inventive support elements, which may, for example, be provided hinge-like. These sketches are primarily intended to provide the skilled person with an idea about the scope of application of the present invention and do not necessarily represent the proportions and dimensions encountered in an actual embodiment. The same applies to the sketches in FIGS. 16a-q, 17a-e, 18a-h, 19a-d and 20a-b.

A support element may e.g. be used to provide a collapsible shoe structure to minimize the required package space, cf. FIG. 15a. For example, the support element may have a hinge and snap for easy packing.

Figure 15C:
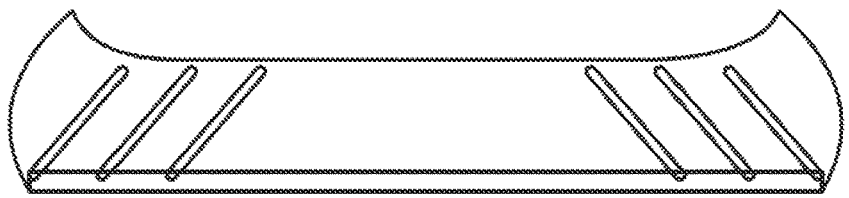

A support element may also be utilized, e.g. in a basketball shoe to equalizing dynamic movements and to avoid spraining or ankle twist, cf. FIGS. 15b and 15c. FIG. 15c illustrates banking without relative movement.

Figure 15D:
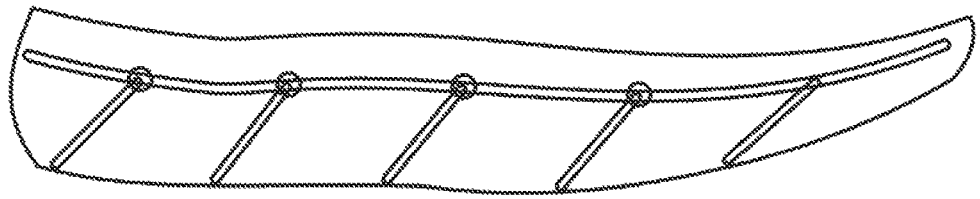

Support elements may also be used to control shear movements of the sole material, cf. FIG. 15d.

Figure 15E:
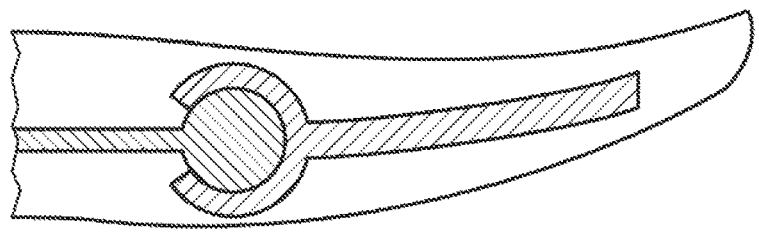

FIG. 15e shows how a support element may be used to restrict or support bending in a certain direction or define flex areas (here flexing in the area of the joint).

Figure 15F:
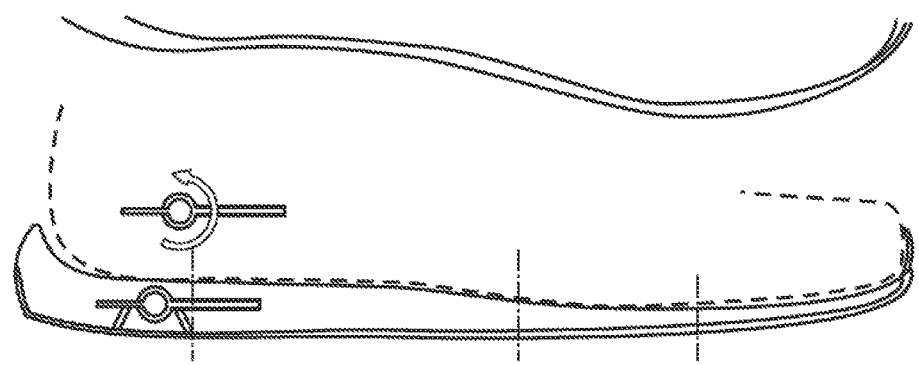

FIG. 15f shows further embodiments of a hinge-like support element arranged in the heel region of a sole. The hinge may help to shorten the lever arm and depending on its position to decrease the angular velocity in the frontal (pronation or supination velocity) or sagittal plane (sole angle velocity). The hinge can be constructed to limit the amount of rotation and it may help providing better heel lockdown, i.e. the heel may move with the bottom unit of the sole and hence the sole does not try to pull off the foot. For example, the locking mechanism may be dorsiflexion only.

Figure 15G:
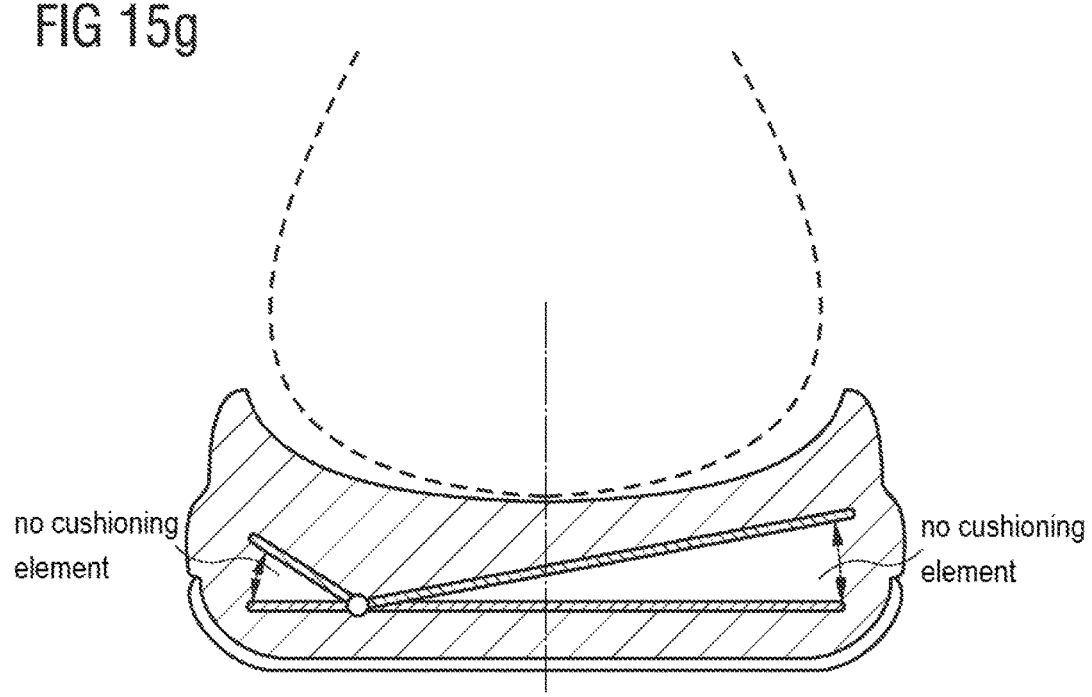

FIG. 15g shows how a hinge-like support element comprising two plates connected via a hinge, which is embedded within the midsole may provide a banking support to a foot e.g. during lateral side-cut movements. In these embodiments, there may be no cushioning element located between the two plates.

The support element could have a more flexible arm and a stiffer arm to guide the foot into a preferred position.

Figure 15H:
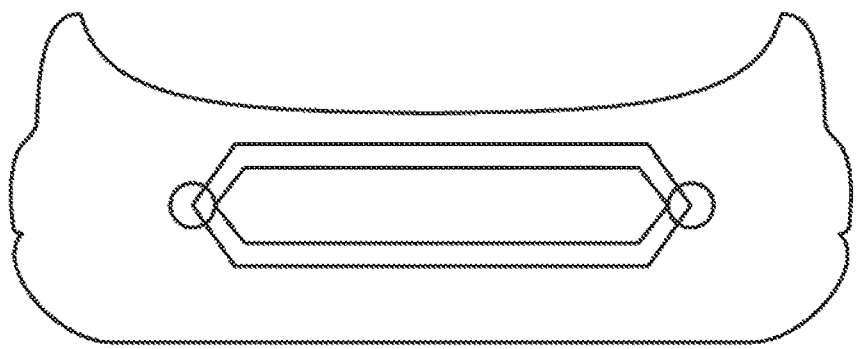
Figure 15I:
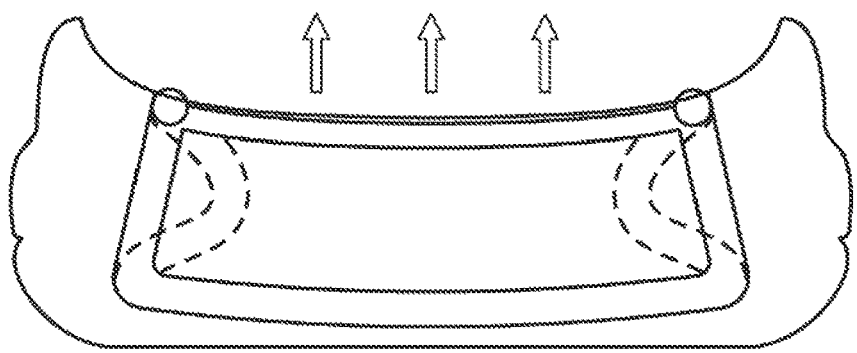
Figure 15J:
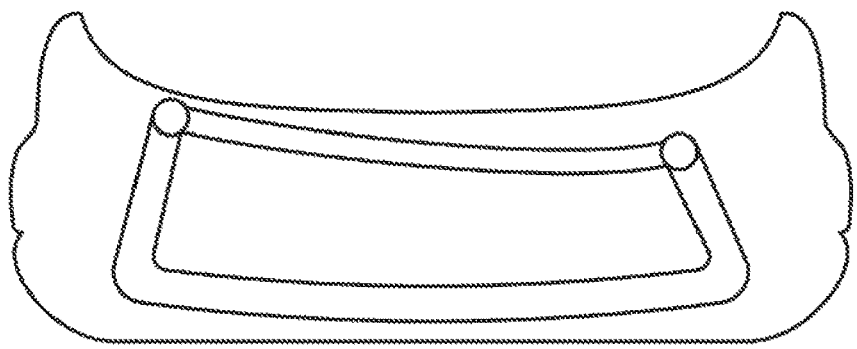

FIGS. 15h-j illustrate how a support element may be used to provide shock absorption and/or improved energy return to the wearer. In particular, the embodiments shown in FIG. 15i may provide extra energy return due to the additive mechanical construction. This construction may also work for a banking support as discussed above. The support element shown in FIG. 15j comprises a predefined angle to support the foot in lateral sports in side movements.

Figure 15K:
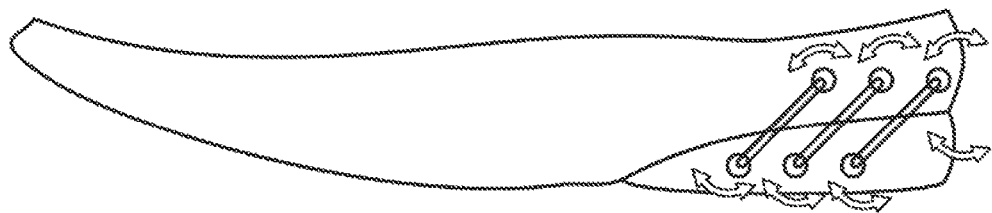

Finally, FIG. 15k shows how a support element may be used to vary the height of the heel portion of a sole or shoe, e.g. to provide an embedded claiming aid.

FIGS. 6a to 6c show further embodiments of an inventive support element 600. The support element 600 is provided slider-like. It comprises a first partial member 610, which is provided as a slider, and a second partial member 620, which is provided as a frame in which the first partial member 610 can be slid along. The first partial member 610 was injection molded from polyamide 6.6 with a lubricant added and the second partial member 620 was injection molded from polyamide 12 in two injection molding steps as already described above. Furthermore, the first partial member 610 was slidably connected in two connection regions 630 and 635 with the second partial member 620 in the second injection molding step. However, other material combinations as described herein and, in particular, any combination of Options I, II and III discussed above might also be used.

In the present case, the connection regions 630 and 635 are provided such that the first partial member 610 comprises a respective groove on two opposite sides, in which corresponding protrusions or ridges of the second partial member 620 are arranged, such that the first partial member 610 may be slid along these protrusions or ridges. In another direction different from the direction along the protrusions or ridges, essentially (i. e. apart from tolerances due to the manufacturing process) no translations are possible. FIG. 6a shows the slider 610 in a first position at the top edge of the support element 600 and FIG. 6b shows the slider 610 in a second position at the bottom edge of the support element 600. FIG. 6c shows a side view of the support element 600.

The first partial member 610 further comprises a cylindrically formed protruding element 640, which may, for example, facilitate anchoring of the first partial member 610 in the midsole.

Figure 16A:
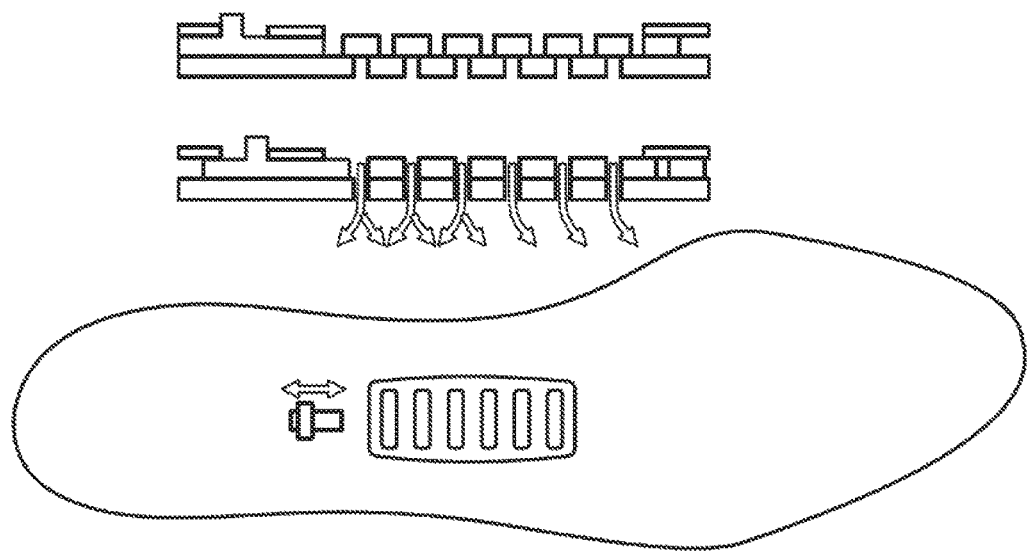
FIGS. 16a-q are sketches of support elements, according to certain embodiments of the present invention.

FIGS. 16a-q show schematic sketches of possible embodiments of inventive support elements, in particular of possible slider-like embodiments.

A slider-like support element may, e.g. be used as a clima-switch, FIG. 16a. By moving a slider left to right, openings are opened or closed, thus allowing ventilation when opened.

Figure 16B:
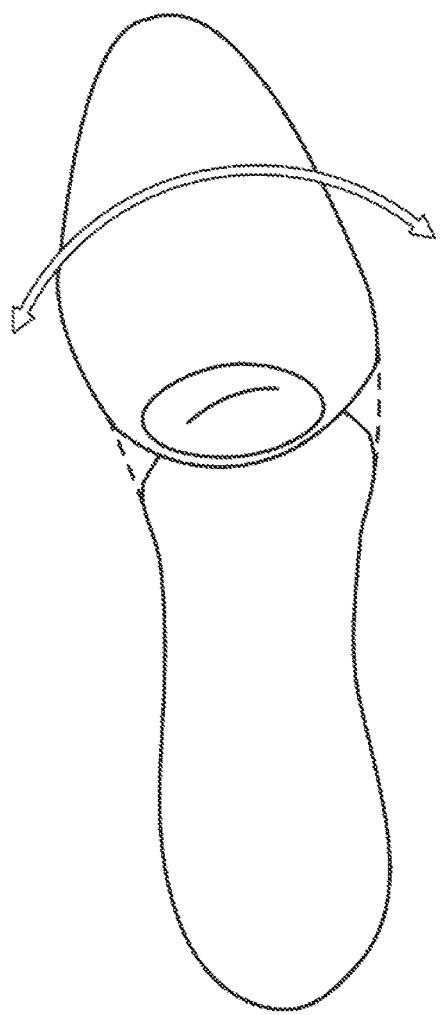

A slider-like support element may also be used to adjust the forefoot or heel in a certain angle to customize the shoe to the foot or the preferred movement (specific sport or terrain), cf. FIG. 16b. Such a support element could be movable during walking or be fixable in different positions.

Figure 16C:
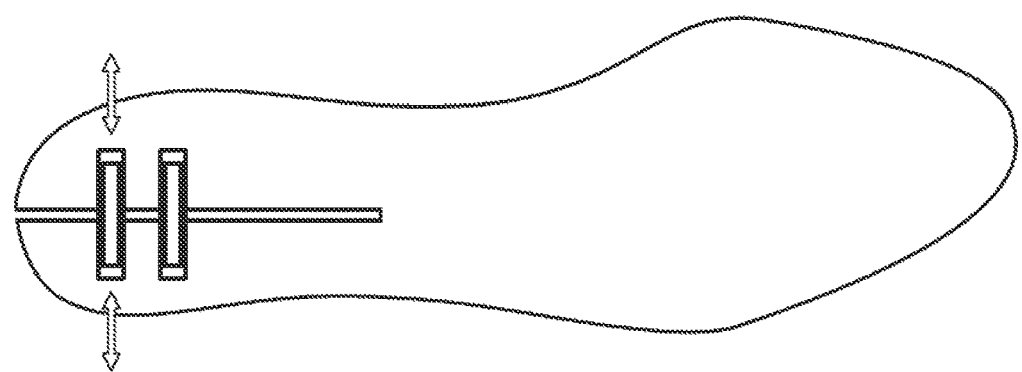

The flexibility of the shoe may also be adjusted, e.g. by changing the flex groove length by a slider-like support element, cf. FIG. 16c.

Figure 16D:
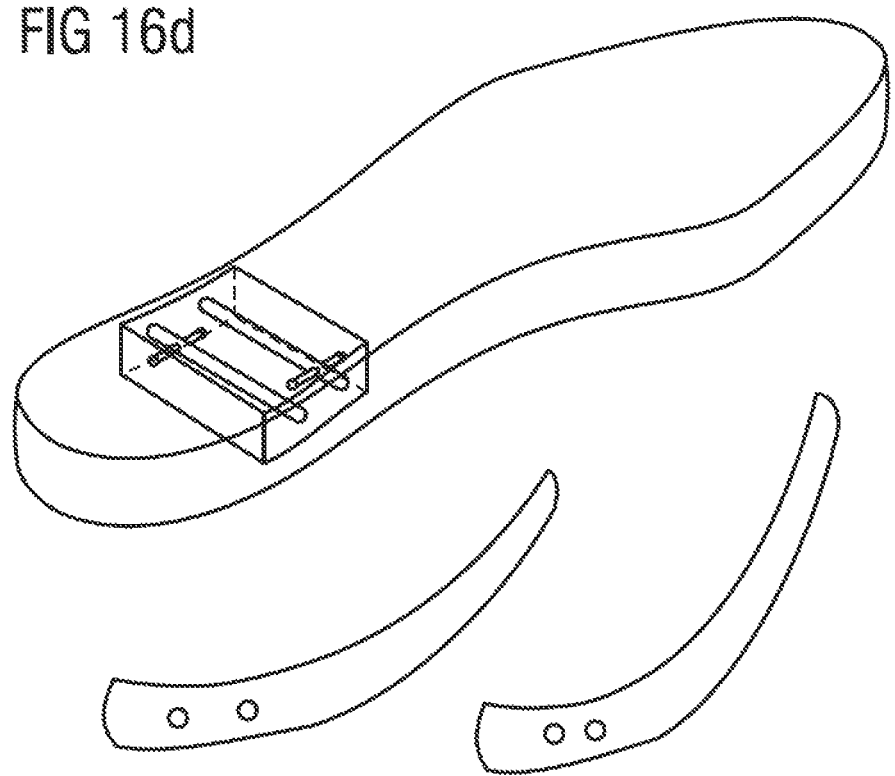

Multiple slider-like support elements could be moved toward or apart from each other in certain angles to define flex zone(s), cf. FIG. 16d.

Figure 16E:
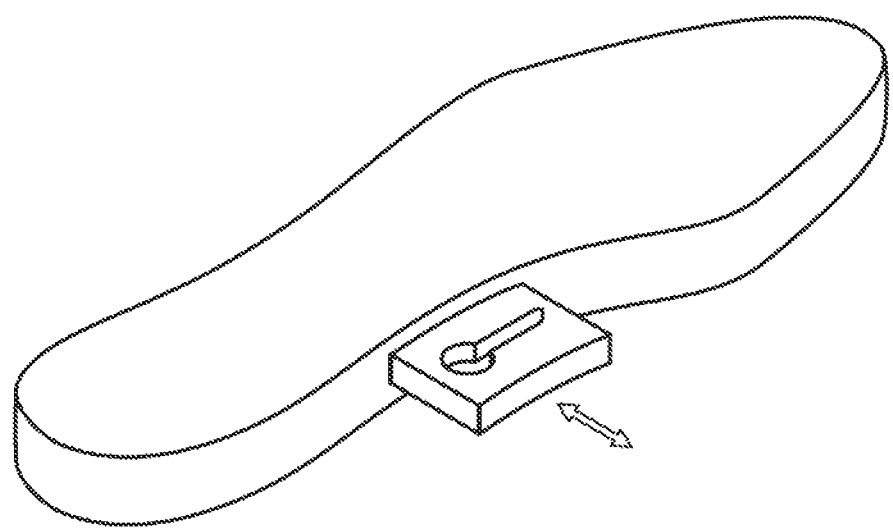

Also, a slider-like support element could be used for storing valuable things like keys e.g. during running or could provide housing for an electronic device, cf. FIG. 16e.

Figure 16F:
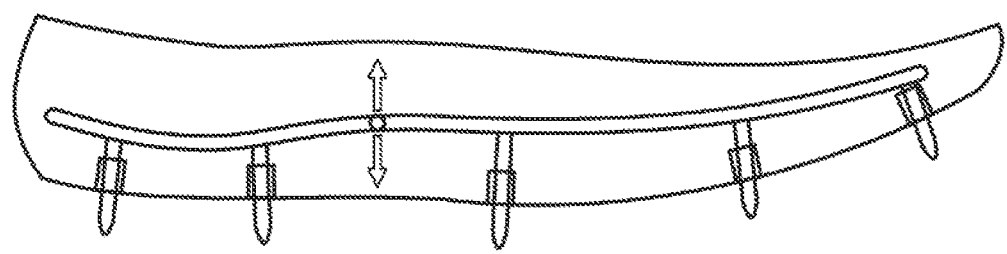

Traction elements could be allowed or restricted from coming out the bottom surface during walking by a slider-like support element, cf. FIG. 16f.

Figure 16G:

The height of the heel of a shoe could be adjusted with the simple adjustment of two elements, one of which may be wedge-shaped, which could be slid towards or apart from each other, cf. FIG. 16g.

Figure 16H:
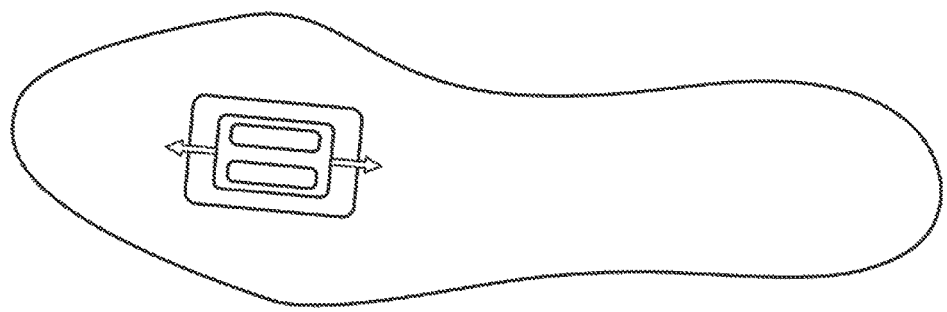

Also, a cleat for cycling could be embedded and be slidable in its position, preferable in the direction from the heel to forefoot but also in a direction from the medial side to the lateral side or also regarding its depth within the midsole, cf. FIG. 16h.

Figure 16I:
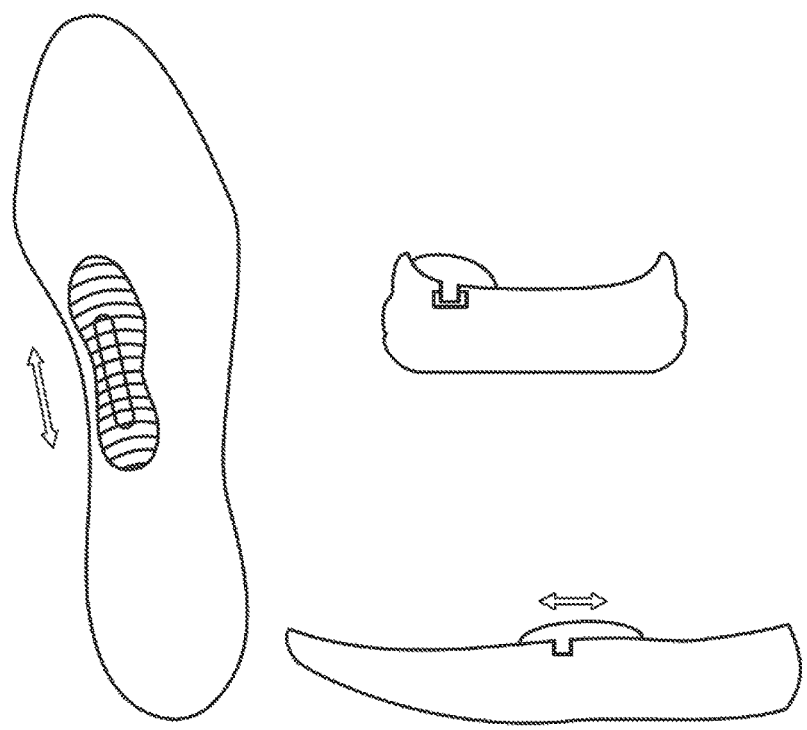

An arch support could be placed as preferred or move with the foot during walking or running as shown in FIG. 16i.

Figure 16J:
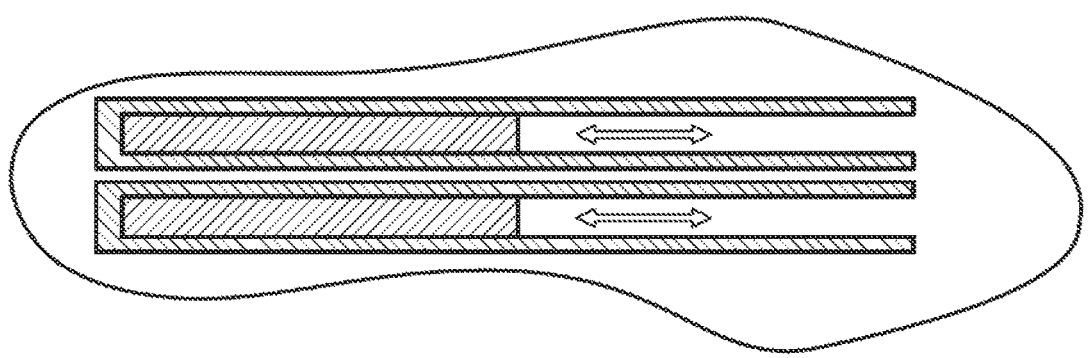

The stiffness of the midsole could be adjusted by sliding elements, similar to a bedframe or by sliding the elements to the side which should be the stiffest, cf. FIG. 16j.

Figure 16K:
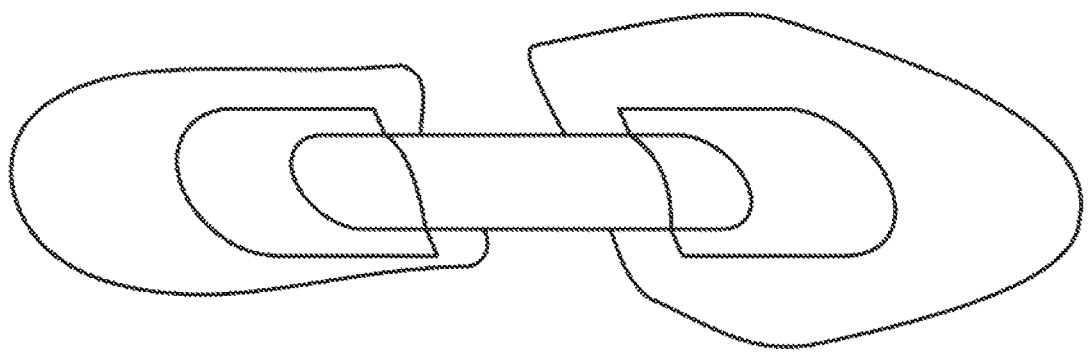

By a slider-like support element, the size of a shoe may be shifted between a range of e.g. UK 40-43 or tolerances in the size may be allowed to allow relative movement between the forefoot and heel, cf. FIG. 16k.

Figure 16L:
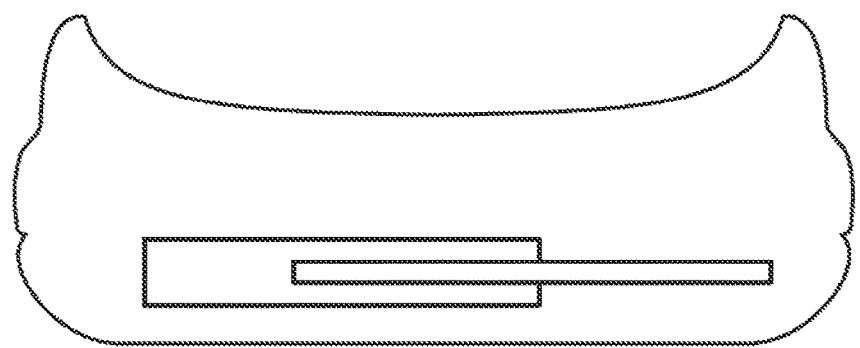

A slider-like support element may also serve to alleviate contact forces in the heel region during impact of the foot with the ground, cf. FIG. 16l (this concept is further discussed in relation to FIGS. 11a-b below).

FIG. 16m illustrates a further possibility how a slider-like support element may be used to control the stiffness of a sole.

Figure 16N:
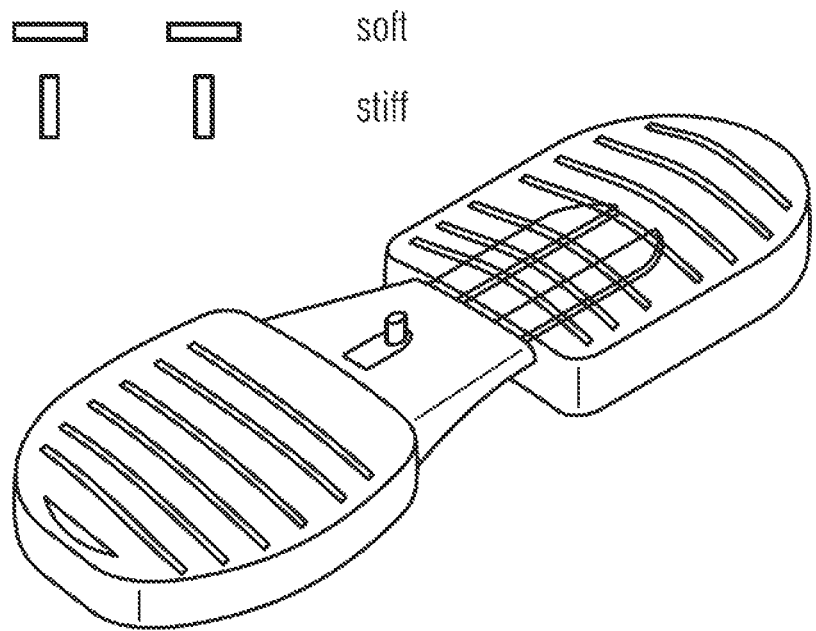

FIG. 16n illustrates yet a further possibility how a slider-like support element may be used to control the stiffness of a sole by use of a pair of adjustable prongs that may be positioned parallel or vertical to the surface of the sole.

Figure 16O:
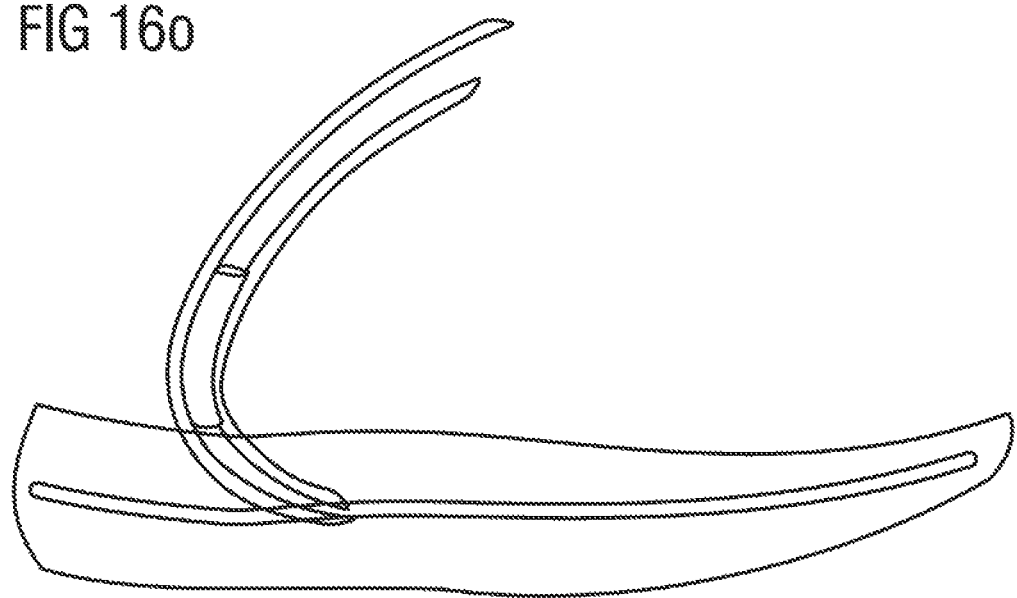

FIG. 16o shows how having a sliding element within an embedded element, the stiffness, orientation or shape of the embedded element could be adjusted.

FIG. 16p illustrates the concept of having a rigid bar which could be covered by an softer part and be able to move relative to the bar, in order to have more durable elements, e.g. elements that could bend more and be thinner.

Finally, FIG. 16q shows how stretch of the sole material in medial to lateral direction could be restricted in defined areas by a bar movable within a housing in the longitudinal direction from the heel to the toes.

FIGS. 7a-7g show embodiments of an inventive support element 700 which comprises a connection region 730. In this connection region 730, a first partial member 710 was slidably connected to a second partial member 720 in an injection molding process. In the present case, the connection region 730 is provided by the first partial member 710 comprising a cylinder and the second partial member 720 comprising a piston, which is arranged in the cylinder of the first partial member 710. The opposite case is also possible, however. The first partial member 710 and the second partial member 720 may further each comprise a rod-shaped section which runs into the cylinder or the piston, respectively.

The first partial member 710 may, for example, be injection molded from a first plastic material, whereas the second partial member 720 may be injection molded from a second plastic material, e.g. according to Options I, II and/or III as discussed above.

Figure 7B:
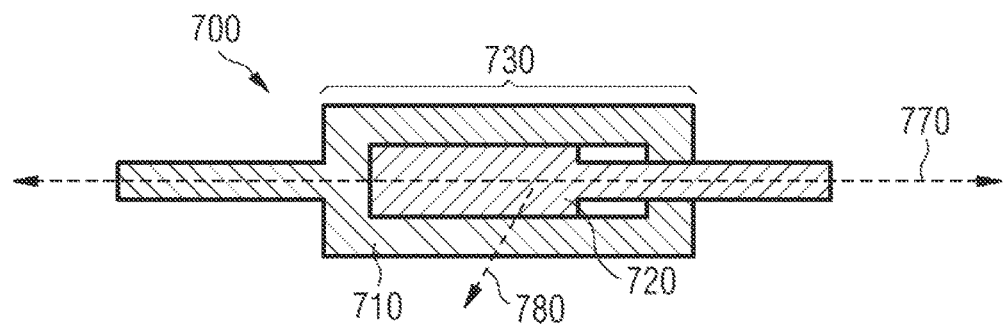

The second partial member 720, and in particular its piston, may be slid along the free direction 770 within the cylinder of the first partial member 710 a certain distance, that is until the piston hits one of the respective ends of the cylinder of the first partial member 710, as e. g. illustrated in FIGS. 7a and 7b. The free direction 770 is, as depicted in FIGS. 7a and 7b, the cylinder-/piston axis. Along a locking direction 780, which runs perpendicular to the free direction 770, essentially (i. e. apart from tolerances due to the manufacturing process) no translations of the piston with respect to the cylinder and therefore of the second partial member 720 with respect to the first partial member 710 are possible (they are, in any case, more strongly restricted than in the free direction 770).

If the cylinder and the piston are further provided with a circular cross-section, rotations of the piston with respect to the cylinder around the free axis 770 are also possible. In case the cylinder and the piston are, for example, provided with a rectangular cross-section, such rotations are not possible. In any case, rotations of the first partial member 710 with respect to the second partial member 720 around the locking axis 780, which is perpendicular to the free axis 770, are essentially not possible.

Figure 7C:
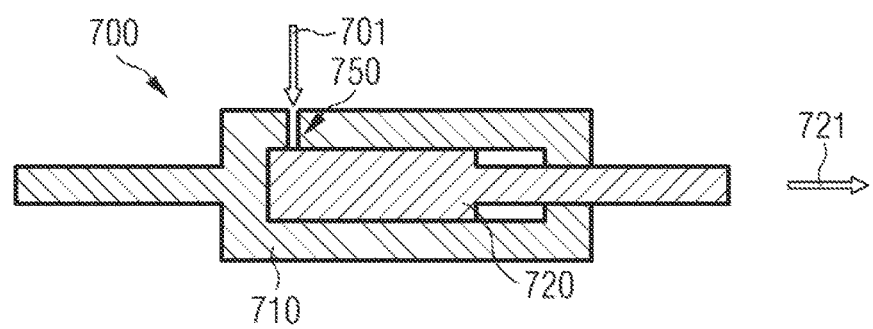
Figure 7D:
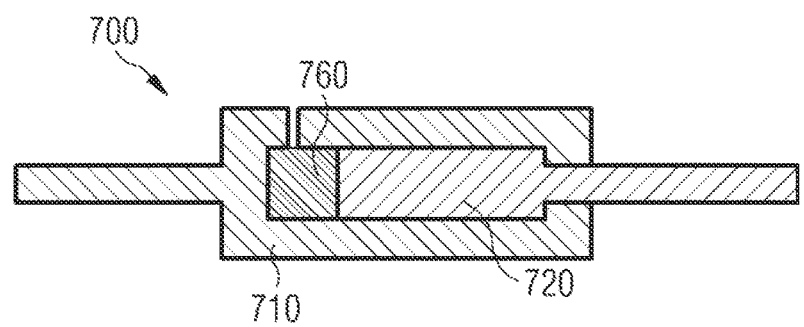
Figure 7E:
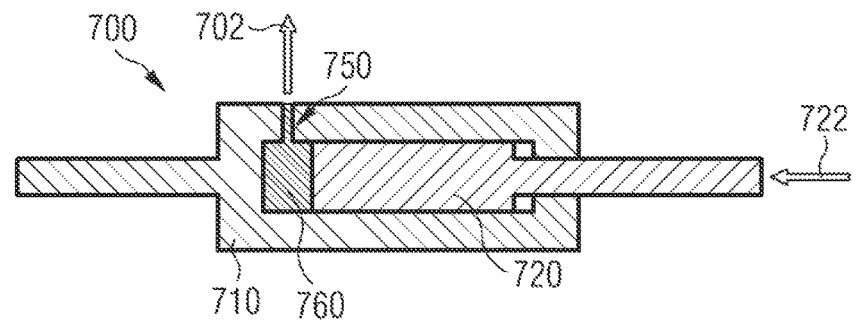

As shown in FIGS. 7c, 7d and 7e, such a translation of the piston of the second partial member 720 (indicated by the arrows 721 and 722) in the cylinder of the first partial member 710 can, for example, be used to create a pumping action. To this end, the cylinder of the first partial member 710 may, for example, comprise an inlet 750, through which a liquid and/or a gas 760 may be sucked into the cylinder (indicated by the arrow 701) and be pushed out of the cylinder again (indicated by the arrow 702). It is clear to the skilled person that the illustrations in FIGS. 7c to 7e are merely schematic illustrations, which do not serve the purpose to represent the pumping mechanism in all details. This pumping mechanism will be suitably chosen by the skilled person, for example taking into consideration the manufacturing expenses.

Figure 7F:
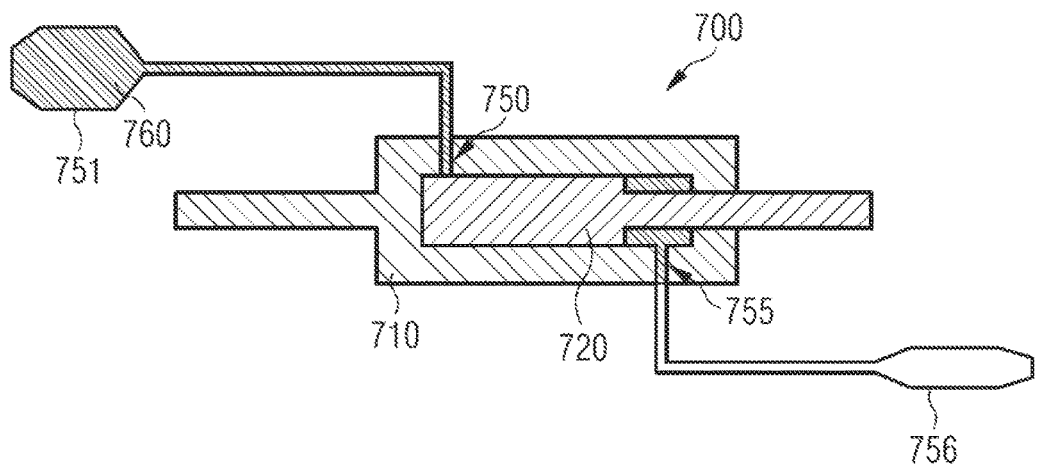
Figure 7G:
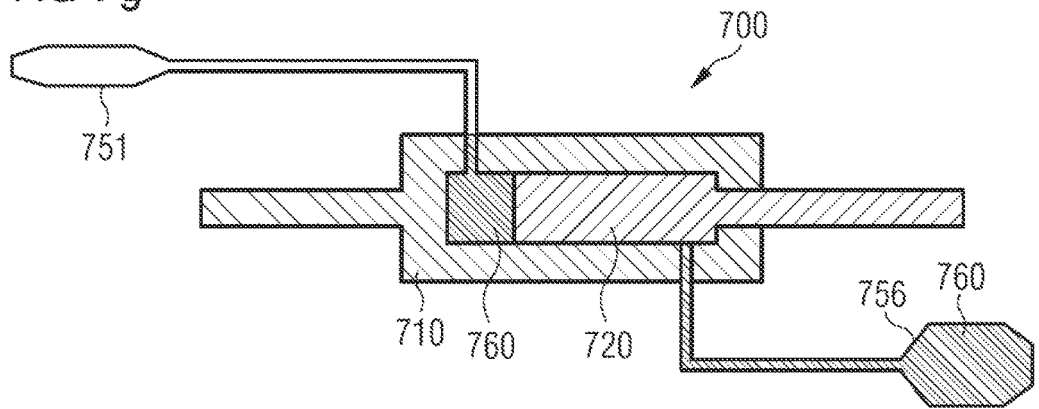

FIGS. 7f and 7g show, for example, how such a pumping mechanism might be used to move back and forth a liquid and/or a gas 760 in a system of bladders 751 and 756 connected to each other. For this, the bladders 751 and 756 may be connected by means of feeding lines with corresponding in- and outlets 750 and 755 in the cylinder of the first partial member 710, such that by a movement of the piston of the second partial member 720 the liquid or the gas 760, respectively, may be pumped from one bladder to the other. Also here, reference is made to the fact that the illustrations of FIGS. 7f and 7g are merely schematic illustrations, which cannot show all details of such a system of connected bladders. It is furthermore mentioned that a support element like the support element 700 shown here may also act as a "passive" element, for example as some kind of valve, which directs and controls a liquid or gas stream in such a system of connected bladders, instead of actively pumping the liquid and/or gas 760 through the system.

Herein, it may be beneficial, if, as shown in FIGS. 8a and 8b, such a support element 700 is arranged in a midsole 850 of embodiments of an inventive sole 800 in such a way, that the pumping action is created during walking with the sole 800. For example, the lifting of the heel (cf. arrow 801) during push-off over the tip of the foot at the end of a step cycle may have the effect that the cylinder of the first partial member 710 moves (cf. arrow 802) with respect to the piston of the second partial member 720 in comparison to the "neutral" position of the sole 800 as shown in FIG. 8a, and hence creates the pumping action. A system of connected bladders 751 and 756 may also be arranged in the midsole 850, for example, as discussed in relation to FIGS. 7f and 7g.

FIGS. 17a-e show further schematic sketches of possible embodiments of inventive support elements, e.g. embodiments comprising a piston and cylinder or a grommet and rivet.

Figure 17A:
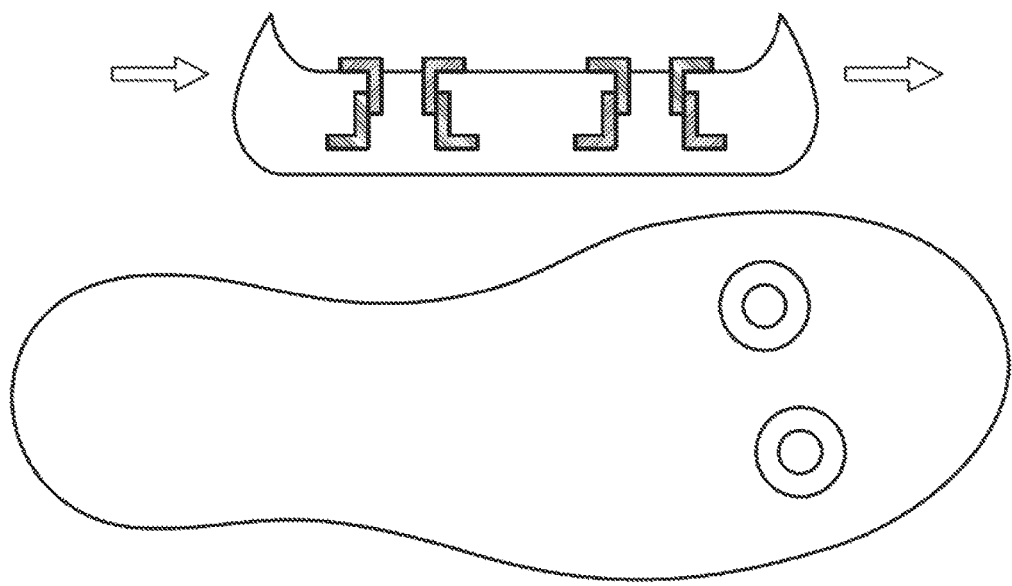

FIG. 17a shows how shear pots may be used to prevent excessive shearing of the sole.

Figure 17B:
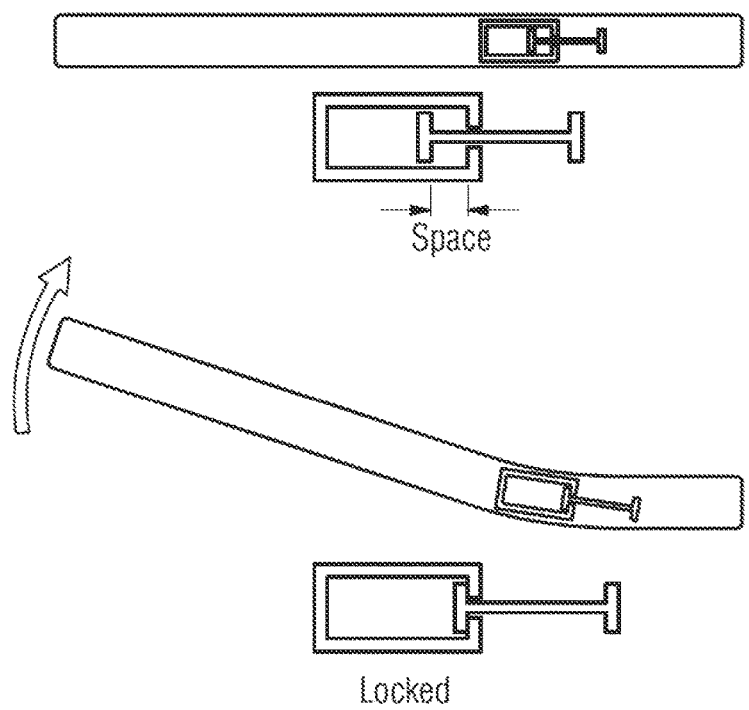

FIG. 17b shows how a piston and cylinder construction may be used to prevent an overstretching of the sole.

Figure 17C:
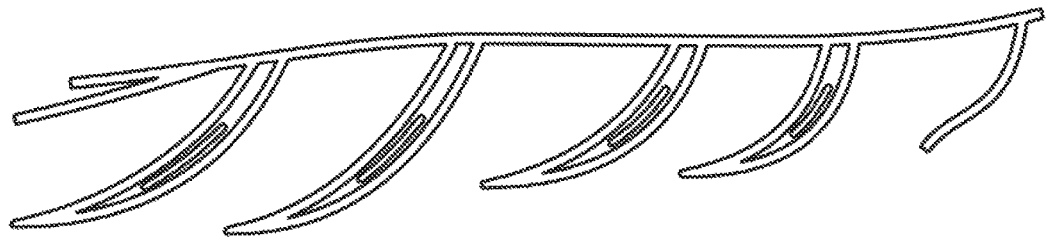

FIG. 17c illustrates the possibility of having several cylinder/piston units arranged in series along a common connection member.

Figure 17D:
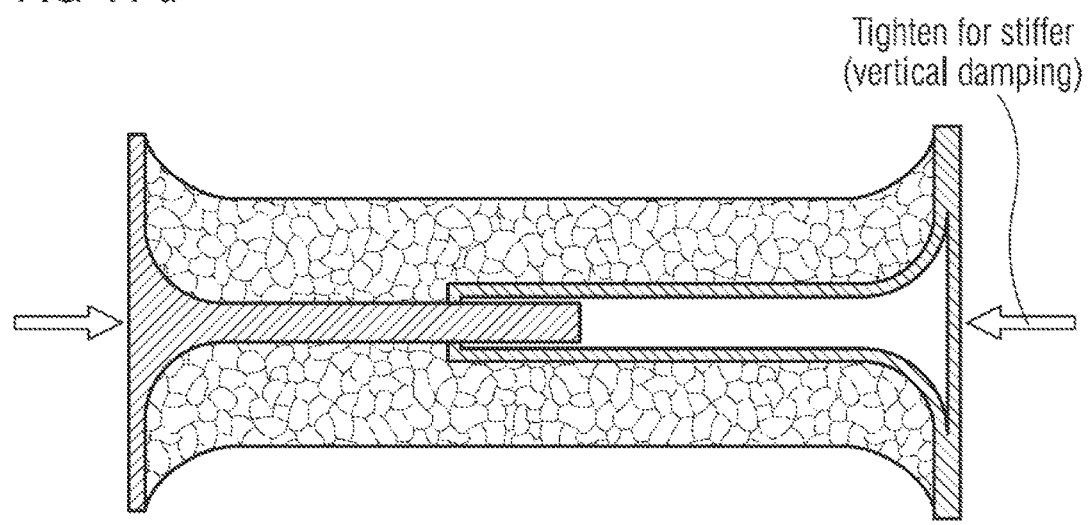

FIG. 17d illustrates how two screwable sleeves may be tightened or loosened to increase or decrease the stiffness of the sole material.

Finally, FIG. 17e shows how a grommet and rivet construction may be used to provide a traction element which extends through the bottom surface of the sole, and which is surrounded by a cushioning element.

FIGS. 9a to 9c show further embodiments of an inventive support element 900 with a first partial member 910 and a second partial member 920 which were rotatably connected to each other in a connection region 930 in an injection molding process. The connection region 930 is provided as a ball joint. Regarding the possibilities for the manufacture of such a support element 900 and potential materials for this, reference is made to the corresponding explanations in other parts of this document.

It is, in particular, envisioned that the first partial member 910 and the second partial member 920 each comprise a rod-shaped section which runs into the connection region 930.

Around the free axis 970, which may, for example, as depicted in FIGS. 9a to 9c, be given by a longitudinal axis through the support element 900 and, in particular, the rod-shaped sections of the first partial member 910 and the second partial member 920, rotations of the second partial member 920 with respect to the first partial member 910 with arbitrary rotation angles may be possible. By means of corresponding stoppers or other elements suitable for this on the first partial member 910 and/or the second partial member 920, rotations around the axis 970 may, in principle, also be limited.

With regard to the locking axis 980 on the other hand, which is perpendicular to the free axis 970, rotations of the second partial member 920 with respect to the first partial member 910 may be more strongly restricted or be completely excluded. This may depend on the way in which the first partial member 910 is designed in the connection region 930.

If, for example, as shown in FIG. 9a, the first partial member 910 encompasses the second partial member 920 in the connection region 930 to such a degree, that essentially no backlash is present in the connection region 930, a rotation of the second partial member 920 with respect to the first partial member 910 around the locking axis 980 is essentially not possible. If, on the other hand, as shown in FIGS. 9b and 9c, the connection region 930 comprises a mouth 935, rotations of the second partial member 920 around the locking axis 980 are possible until the second partial member 920 hits an edge of the mouth 935. Herein, the mouth 935 may be provided symmetrically, for example circular, such that rotations of the second partial member 920 with respect to the first partial member 910 around a second locking axis (not shown), which is perpendicular to the first locking axis 980 and the free axis 970, are possible to the same degree as rotations around the first locking axis 980. The mouth 935 may, however, also be designed asymmetrically, such that rotations around the first locking axis 980 and around the second locking axis are possible or restricted to different degrees.

Figure 10A:
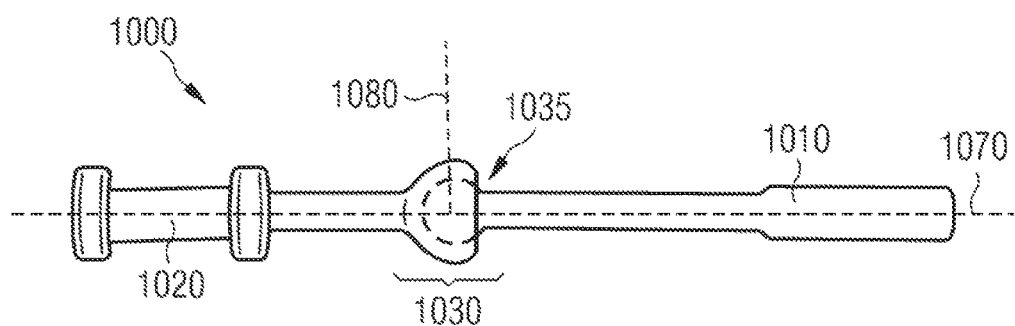
FIGS. 10a-b are views of further embodiments of a ball joint support element, according to certain embodiments of the present invention.
Figure 10B:
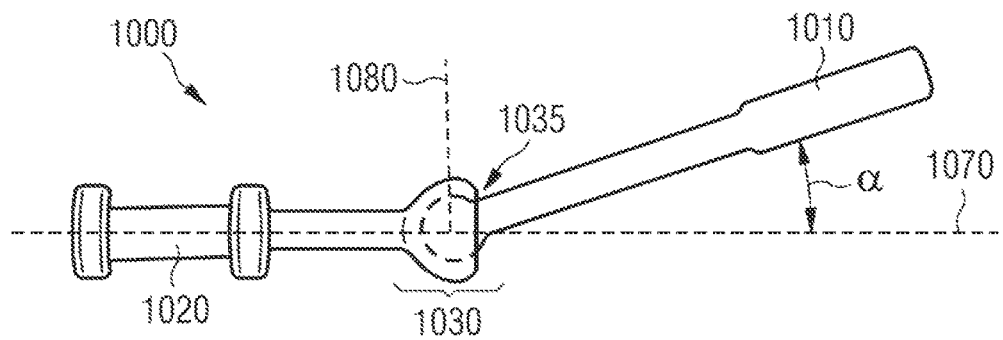

FIGS. 10a and 10b show a further embodiments of an inventive support element 1000, wherein a first partial member 1010 was rotatably connected to a second partial member 1020 in an injection molding process in a connection region 1030. Herein, the connection region 1030 is provided as a ball joint.

The first partial member 1010 was manufactured from polyamide 6.6 with a lubricant added and the second partial member 1020 from polyamide 12 in two injection molding steps as already discussed. However, other material combinations as described herein and, in particular, any combination of Options I, II and III discussed above might also be used.

Around the longitudinal axis 1070 of the support element 1000, rotations of the first partial member 1010 with respect to the second partial member 1020 (or vice versa, depending on the perspective) are possible with arbitrary rotation angles. As already mentioned, by means of corresponding elements on the first partial member 1010 and/or the second partial member 1020, rotations around this free axis 1070 may also be limited. Around a locking axis 1080 that is perpendicular to the free axis 1070, rotations of the first partial member 1010 with respect to the second partial member 1020 are only possible up to a threshold angle α, as shown in FIG. 10b. The value of this threshold angle α is determined by the size and design of the mouth 1035 of the ball joint 1030.

FIGS. 18a-h show further schematic sketches of possible embodiments of inventive support elements.

FIG. 18a, which shows embodiments similar to the support element 100, illustrates how the rotational range of such a support element may be controlled.

Figure 18B:
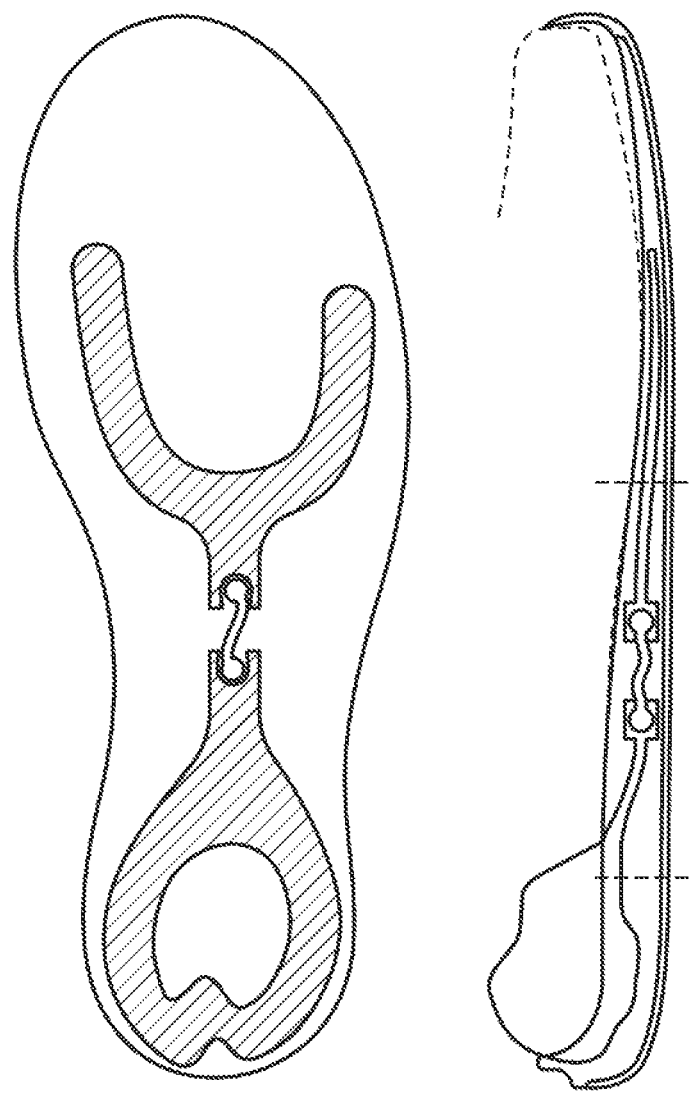

FIG. 18b shows embodiments comprising two ball joints that may comprise a limiter, respectively, which limits the rotational range in the two connection regions. The joint connecting the two ball joints may be convoluted. The rear plate of the support element may also extend as an external heel counter.

Figure 18C:
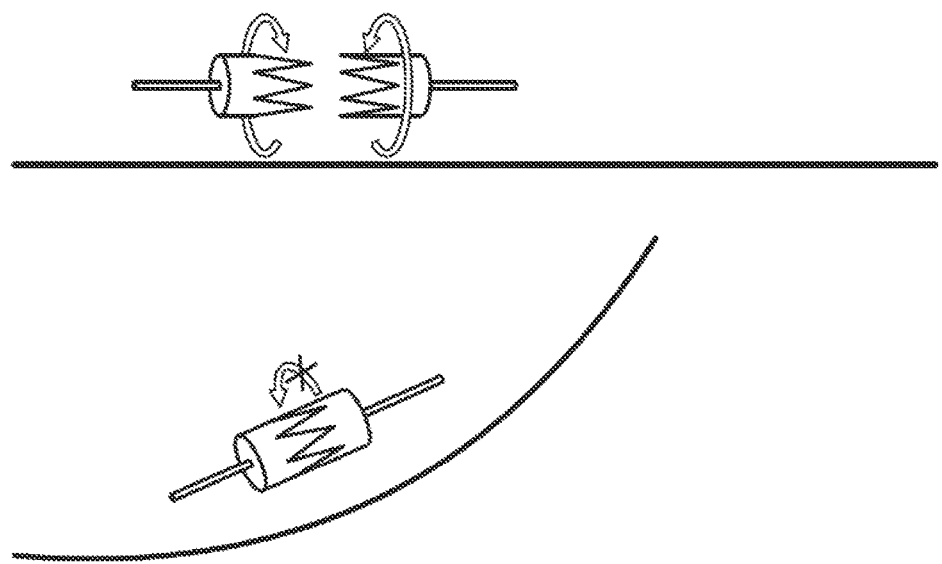

FIG. 18c shows how a translational movement in a support element may be used to allow or restrict rotational movements within the support element by two sets of engaging teeth. This construction might be used to increase the torsion stiffness during dynamic movements when the teeth engage due to the translational movement within the support element, whereas, when the sole lies flat on the ground, the teeth disengage and allow twisting of the sole and the support element.

Figure 18D:
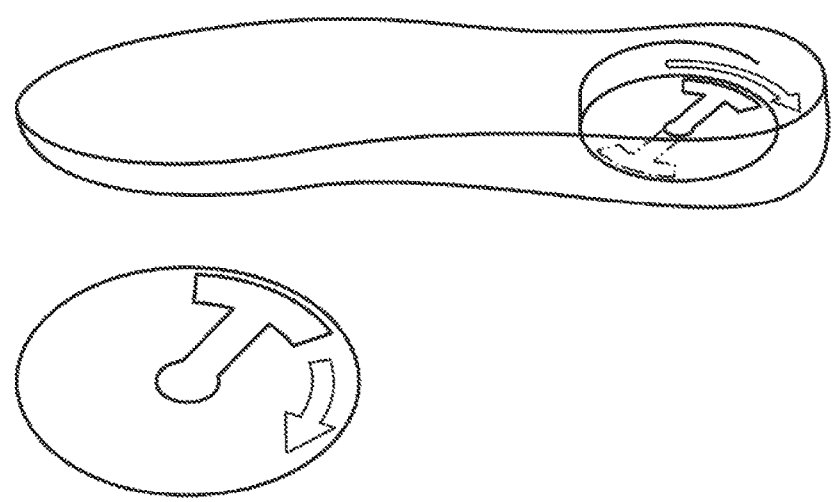

FIG. 18d illustrates the idea of having an imbedded momentum generated within the sole. The timing may be configured to aid with foot lift.

Figure 18E:
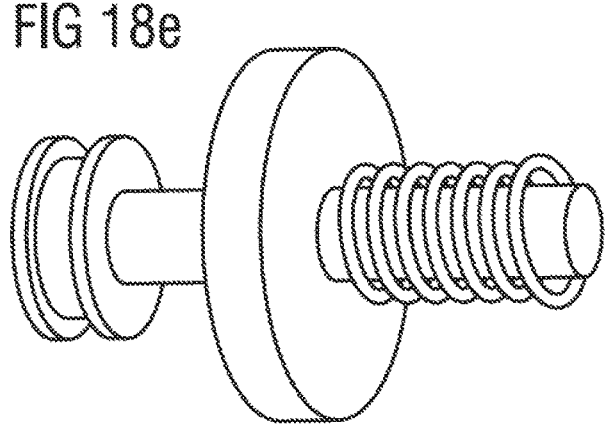

FIG. 18e illustrates how a support element could be adjusted, e.g. in height, from a bottom or top surface of the midsole by different interaction elements, like locks, screws or hinges.

Figure 18F:
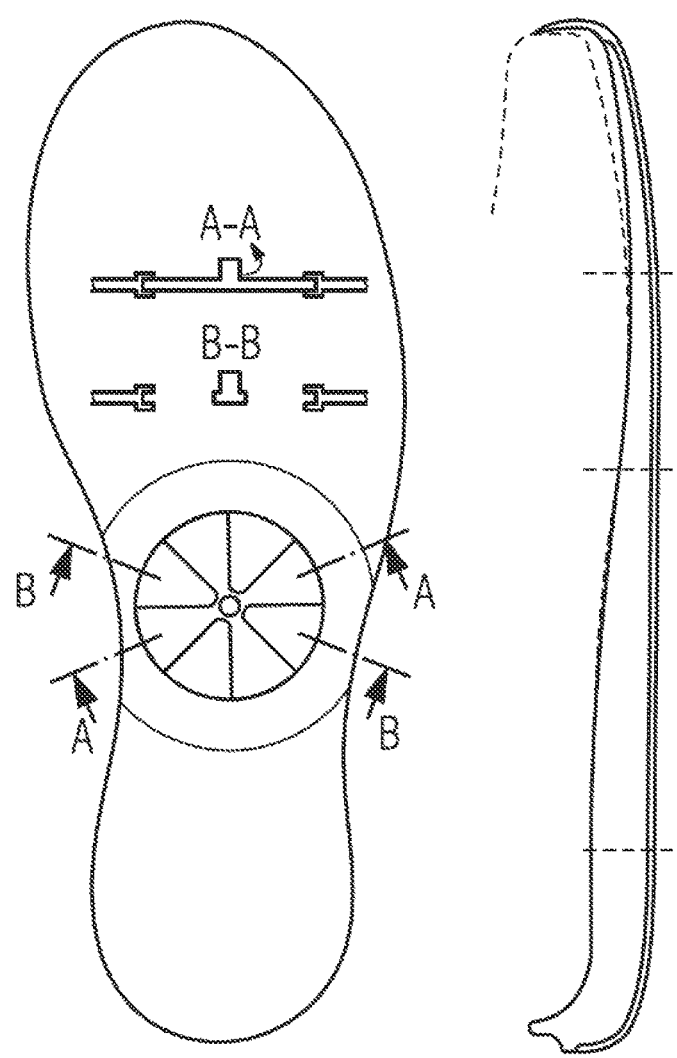

FIG. 18f shoes how a rotating internal disc may be used to open and close claim vents within the shoe sole.

Figure 18G:
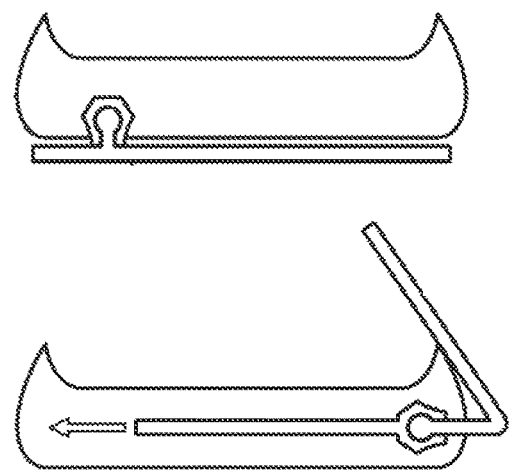

FIG. 18g illustrates how a support element may comprise a snap-fit connection that was overmolded in an injection molding process.

Figure 18H:
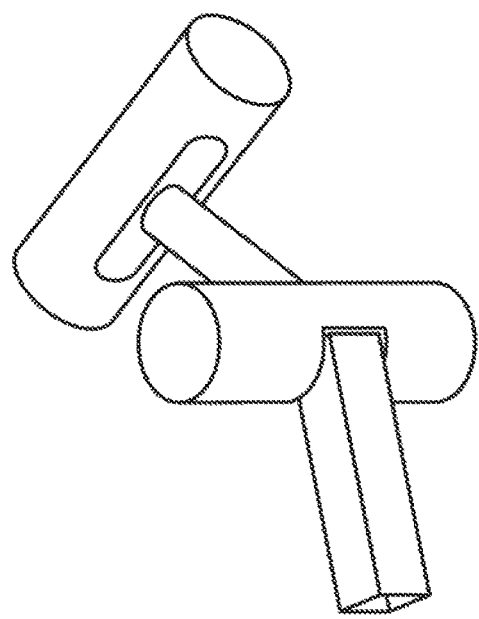

Finally, FIG. 18h shows embodiments that may allow or restrict rotation only in a certain flex angle of the foot.

Figure 11A:
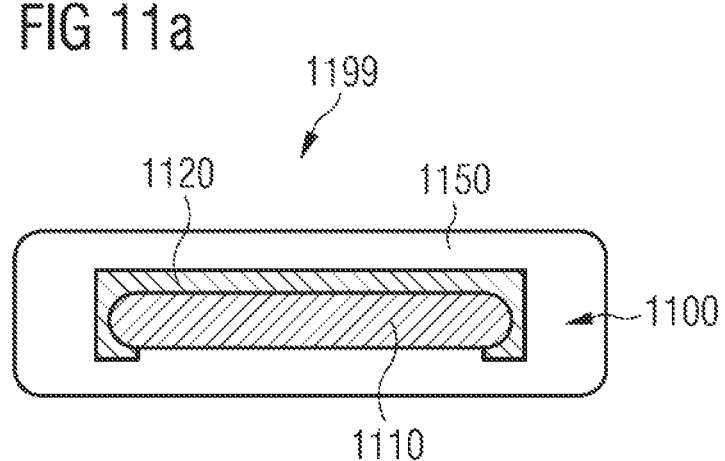
FIGS. 11a-b are views of a support element with planar partial members and a sole with such a support element, according to certain embodiments of the present invention.
Figure 11B:
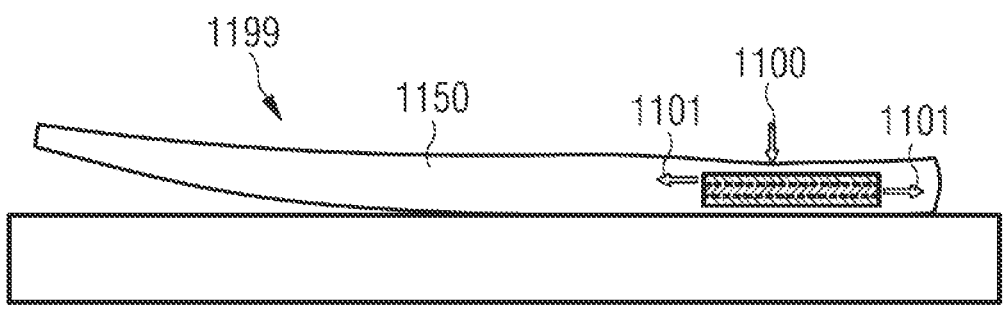

FIGS. 11a and 11b show further embodiments of an inventive support element 1100 as well as embodiments of an inventive sole 1199 which comprises such a support element 1100.

The support element 1100 comprises a first partial member 1110 and a second partial member 1120, which are slidably connected with one another in an injection molding process in a connection region. The first partial member 1110 and the second partial member 1120 are provided as planar members. Herein, the first partial member 1110 and the second partial member 1120 are arranged with respect to each other such that their respective planar surfaces face each other. Hence, both partial members 1110, 1120 may be slid along their planar surfaces with respect to each other. The second partial member 1120 may, for example, as shown in FIG. 11a, be provided as some kind of carriage, which encompasses the first partial member 1110 which is provided as a plate along its longitudinal sides in such a way, that it can slide along the planar surface of the first partial member 1110 in a longitudinal direction.

As shown in FIG. 11b, such a support element 1100 may, for example, be arranged in the heel region of a midsole 1150 in such a way, that translations of the first planar partial member 1110 relative to the second planar partial member 1120 may proceed in a plane of the sole 1199 and essentially in longitudinal direction of the sole 1199, as indicated by the arrows 1101, and may thus at least partially absorb or alleviate shear forces that may act on the musculoskeletal system of the wearer when treading down with the heel.

FIGS. 12a and 12b show further embodiments of inventive support elements 1200a and 1200b, each comprising a plurality of first partial members and/or second partial members that are movably connected to each other in respective connection regions.

The support element 1200a comprises two first partial members 1210a and 1211a as well as two second partial members 1220a and 1221a. The first and second partial members 1210a, 1220a, 1211a, 1221a are alternatingly movably connected to each other in connection regions 1230a, 1231a, 1232a, wherein these connections were created in an injection molding process, e.g. according to Options I, II and/or III as discussed above. In the case shown here, the connection regions 1230a, 1231a and 1232a are provided as ball joints, such that rotations of the first partial members 1210a, 1211a with respect to the second partial members 1220a, 1221a are possible.

The support element 1200b, on the other hand, comprises a central second partial member 1220b, with whom a plurality of first partial members 1210b, 1211b, 1212b, 1213b, 1214b and 1215b were rotatably and/or slidably connected in a plurality of connection regions 1230b, 1231b, 1232b, 1233b, 1234b and 1235b in an injection molding process, e.g. according to Options I, II and/or III as discussed above. The connection regions 1230b, 1231b, 1234b and 1235b are provided as ball joints in the case shown here, whereas the connection regions 1232b and 1233b comprise a piston and cylinder.

The opposite case, in which a first partial member is connected rotatably and/or slidably with a plurality of second partial members in an injection molding process in a plurality of connection regions, is, of course, also possible.

At this point, explicit reference is further made to the fact that the embodiments 1200a and 1200b shown in FIGS. 12a and 12b only serve to illustrate the possibilities provided to the skilled person within the scope of the invention with regard to influencing the properties of an inventive sole with an inventive support element as desired, and do therefore not necessarily represent the proportions and dimensions as encountered in an actual embodiment.

FIGS. 19a-d show further schematic sketches of possible embodiments of skeleton-like inventive support elements.

Figure 19A:
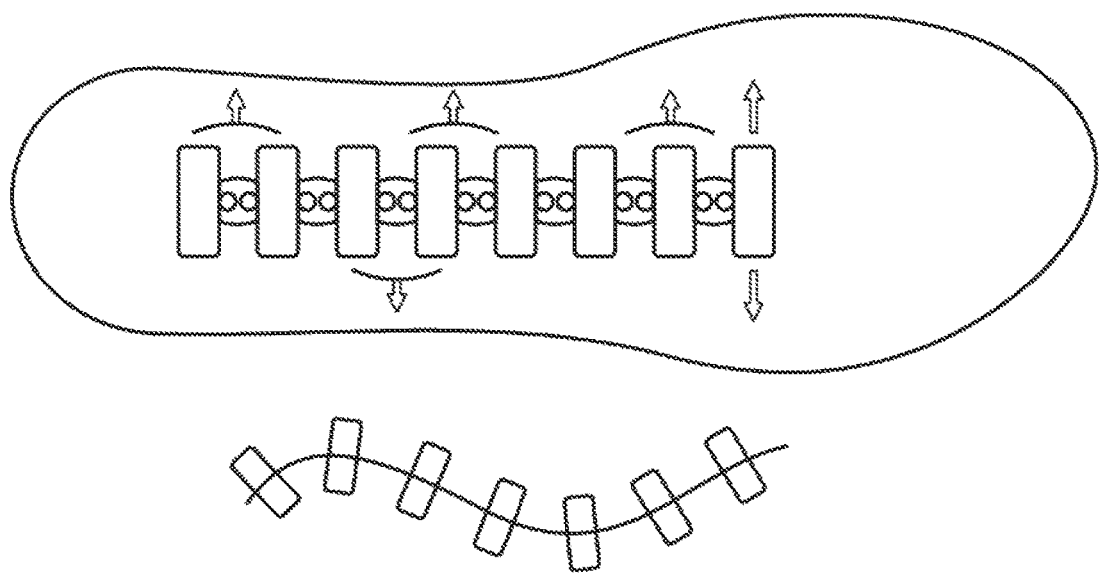
FIGS. 19a-d are sketches of support elements, according to certain embodiments of the present invention.

In such a skeleton-like support element, cf. FIG. 19a, the central element could be rigid or flexible. The articulated elements connected to the central element can rotate or move sideways to give the sole movement stability/flexibility in certain directions.

Figure 19B:
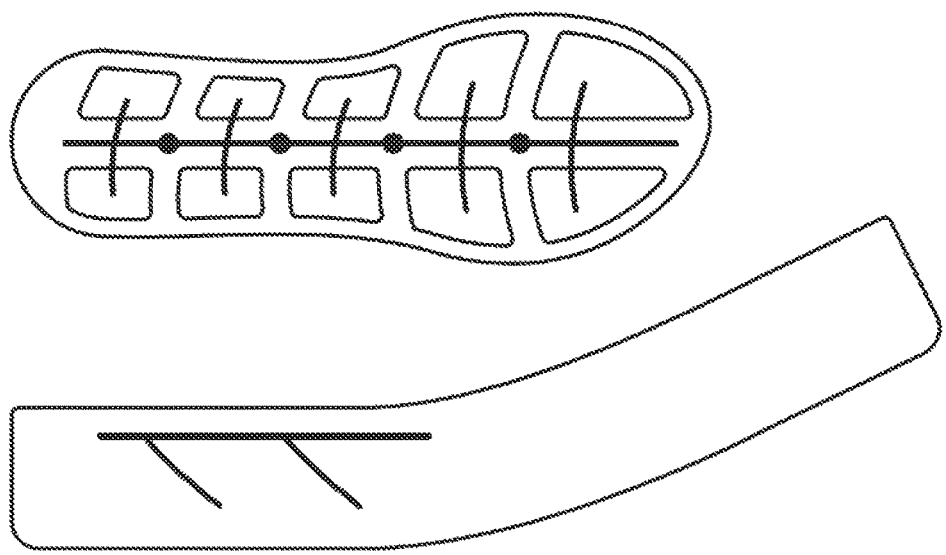

A skeleton-like support element can be provided as an internal skeleton element with articulated elements within a midsole, cf. FIG. 19b.

Figure 19C:
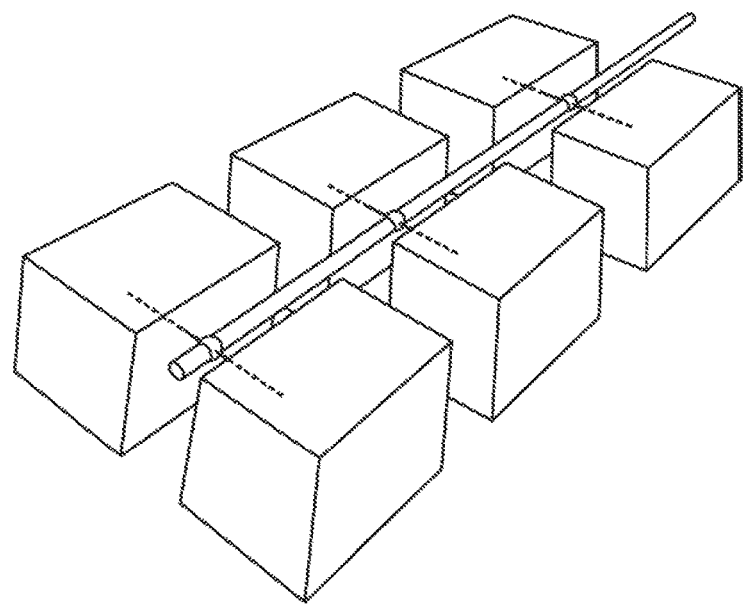

Or the skeleton-like support element comprises blocks of midsole material arranged at the ends of the articulated elements of the support element, cf. FIG. 19c.

Figure 19D:
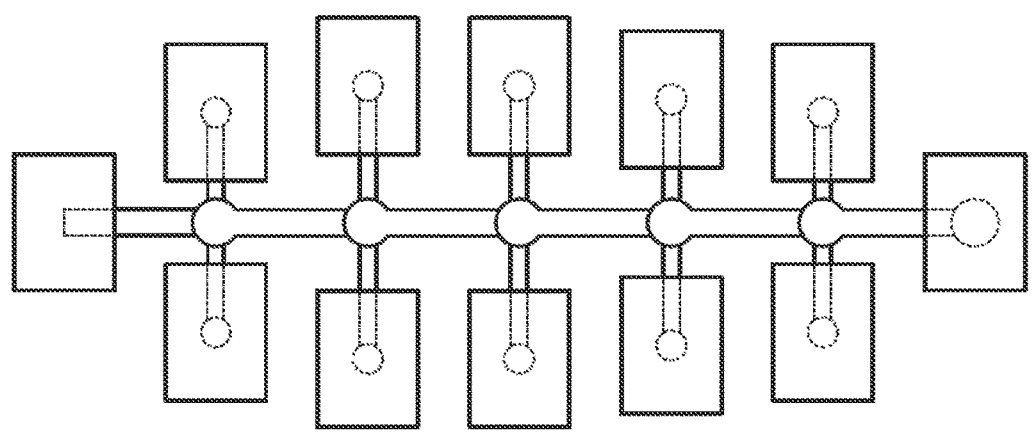

FIG. 19d shows a further possible arrangement of the connection regions of such a skeleton-like support element.

In FIGS. 13a to 13c, embodiments of an inventive manufacturing method 1300 are outlined.

For the manufacture of an inventive support element, for example one of the support elements 100, 300, 400, 600, 700, 900, 1000, 1100, 1200a or 1200b explicitly discussed herein, a first partial member 1310 may, e. g. as shown in FIGS. 13a and 13b, be connected movably, in particular rotatably and/or slidably, with a second partial member 1320 by injection molding, indicated by the arrow 1350, in a connection region 1330.

To this end, the first partial member 1310 may, for example, be positioned in a mold 1360, which may, for example, be comprised of two mold parts 1361 and 1362 movable with respect to each other. Subsequently, the mold 1360 may be closed, and the second partial member 1320 may be manufactured by the injection molding process 1350 in the closed mold 1360, wherein the mold 1360 or the two mold parts 1361 and 1362, respectively, may be provided to comprise a cavity 1321 in the closed state that corresponds to the shape of the second partial member 1320 to be manufactured and that is filled during the injection molding process 1350 by the material used for the manufacture, hence creating the second partial member 1320 and simultaneously connecting it in the connection region 1330 movably, in particular rotatably and/or slidably, with the first partial member 1310.

In this regard, it is in particular envisioned that, prior to the injection molding 1350 of the second partial member 1320, the first partial member 1310 is also injection molded in an injection molding process in the mold 1360 as shown in FIG. 13c and indicated by the arrow 1351. Herein, the mold 1360 or the mold parts 1361 and 1362, respectively, may comprise a further cavity 1311 in a second closed state of the mold 1360 that may differ from the closed state of the mold 1360 in which the second partial member 1320 is molded, wherein the cavity 1311 corresponds to the shape of the first partial member 1310 to be manufactured and which is filled by the material used for the manufacture during the injection molding process 1351.

Depending on the specific choice of materials used for the manufacture of the first and second partial member, respectively, the processing parameters and in particular the molding temperature and the different mold positions may have to be adjusted when injection molding the first and second partial member, respectively. This may in particular be the case, if the materials for the first and second partial member are chosen according to Option II as discussed above.

Alternatively, the first partial member 1310 may also be injection molded in a different mold and then be inserted into the mold 1360.

It is furthermore possible that instead of the first partial member 1310, the second partial member 1320 is initially positioned in the mold 1360 or injection molded in this mold, and in a further injection molding process the first partial member 1310 is subsequently manufactured in the mold and connected movably, in particular rotatably and/or slidably, in the connection region 1330 with the second partial member 1320. The statements made above regarding the adjustment of the processing parameters and mold positions apply analogously here.

The mold 1350 may, for example, be a rotational mold, but different kinds of molds are also possible.

Figure 14A:
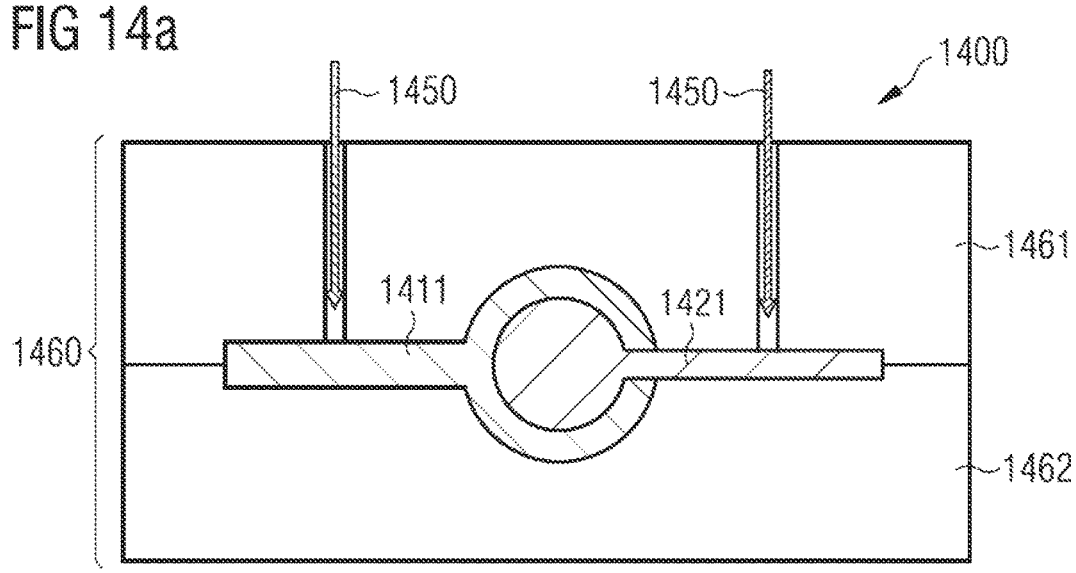
FIGS. 14a-b are views of a manufacturing method for forming support elements, according to certain embodiments of the present invention.
Figure 14B:
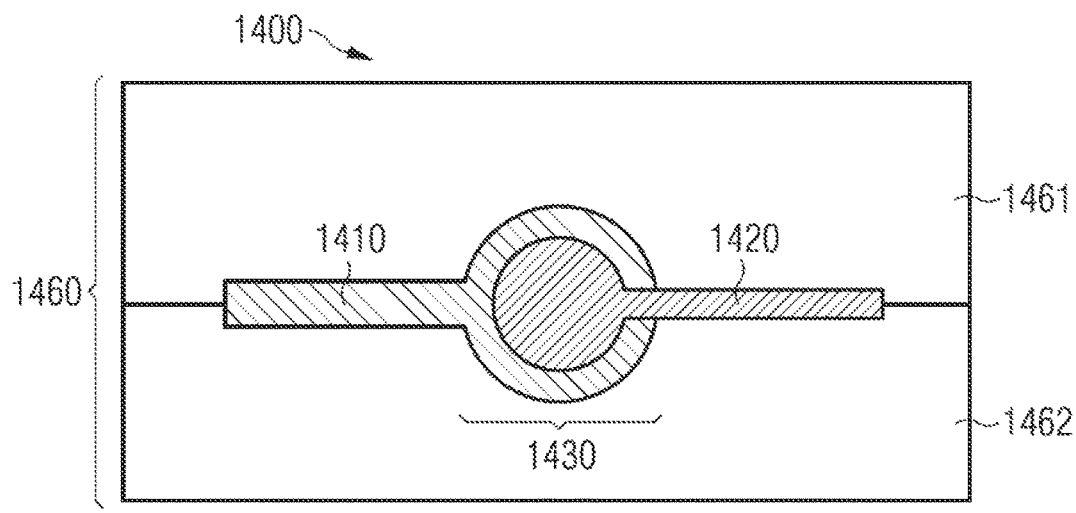

FIGS. 14*a* and 14*b* illustrate further embodiments of an inventive manufacturing method 1400 for the manufacture of an inventive support element.

In the embodiments of method 1400, the first partial member 1410 and the second partial member 1420 are manufactured in a mold 1460 and connected movably, in particular rotatably and/or slidably, in a connection region 1430 by a simultaneous injection molding, indicated by the two arrows 1450. For this, the mold 1460 may comprise two mold parts 1461 and 1462 movable with respect to each other, which may be provided such that in the closed state of the mold 1460 they comprise cavities 1411 and 1421 that correspond to the shape of the first partial member 1410 and the second partial member 1420, respectively, to be manufactured and that are filled with the material used for the manufacture during the injection molding process 1450, thereby creating the first partial member 1410 and the second partial member 1420 and simultaneously connecting them movably, in particular rotatably and/or slidably, in the connection region 1430. These embodiments of an inventive method may in particular be applied if the materials for the manufacture of the first and second partial member, respectively, are chosen in accordance to Option I and/or Option III discussed above.

Finally, reference is made to the fact that FIGS. 13*a*, 13*b* and 13*c* as well as 14*a* and 14*b* are merely sketches and that, in particular, the specific design of the support elements shown there may not be construed as limitations to the methods 1300, 1400 being described, which may be used for the manufacture of any kind of inventive support element.

FIGS. 20*a-b* show schematic sketches of possible embodiments of inventive support elements for use with a lacing system of a shoe.

FIG. 20*a* shows how a support element may be used to provide an embedded lace locking system. Slidable lace attachment members may be connected with an elastic connection or a spring connection to provide a good fit of the laced shoe.

FIG. 20*b* illustrates the concept of bundling the lace force in one point for getting a comfort and compressed fit around the midfoot by a lace closure system, e.g. at the bottom or the side of the midsole.

In the following, further examples are described to facilitate the understanding of the invention:

1. Support element (100; 300; 400; 600; 700; 900; 1000; 1100; 1200*a*; 1200*b*) for a shoe sole (200; 500; 800; 1199) or for a cushioning element (250; 550; 850; 1150), comprising:
    a. a first partial member (110; 310; 410; 610; 710; 910; 1010; 1110; 1210*a*; 1211*a*; 1210*b*; 1211*b*; 1212*b*; 1213*b*; 1214*b*; 1215*b*; 1310; 1410); and
    b. a second partial member (120; 125; 320; 420; 620; 720; 920; 1020; 1120; 1220*a*; 1221*a*; 1220*b*; 1320; 1420),
    c. wherein the second partial member (120; 125; 320; 420; 620; 720; 920; 1020; 1120; 1220*a*; 1221*a*; 1220*b*; 1320; 1420) is connected rotatably and/or slidably with the first partial member (110; 310; 410; 610; 710; 910; 1010; 1110; 1210*a*; 1211*a*; 1210*b*; 1211*b*; 1212*b*; 1213*b*; 1214*b*; 1215*b*; 1310; 1410) in a connection region (130; 135; 330; 430; 630; 635; 730; 930; 1030; 1230*a*; 1231*a*; 1232*a*; 1230*b*; 1231*b*; 1232*b*; 1233*b*; 1234*b*; 1235*b*; 1330; 1430) by an injection molding process (1350; 1351; 1450).
2. Support element (100; 300; 400; 600; 700; 900; 1000; 1100; 1200*a*; 1200*b*) according to example 1, wherein the first partial member (110; 310; 410; 610; 710; 910; 1010; 1110; 1210*a*; 1211*a*; 1210*b*; 1211*b*; 1212*b*; 1213*b*; 1214*b*; 1215*b*; 1310; 1410) comprises a first plastic material and the second partial member (120; 125; 320; 420; 620; 720; 920; 1020; 1120; 1220*a*; 1221*a*; 1220*b*; 1320; 1420) comprises a second plastic material and wherein the two plastic materials are chosen such that the connection region (130; 135; 330; 430; 630; 635; 730; 930; 1030; 1230*a*; 1231*a*; 1232*a*; 1230*b*; 1231*b*; 1232*b*; 1233*b*; 1234*b*; 1235*b*; 1330; 1430) does not comprise a chemical bond between the two materials.
3. Support element (100; 300; 400; 600; 700; 900; 1000; 1100; 1200*a*; 1200*b*) according to the preceding example, wherein the first plastic material and the second plastic material are chemically incompatible.
4. Support element (100; 300; 400; 600; 700; 900; 1000; 1100; 1200*a*; 1200*b*) according to one of the preceding examples 2-3, wherein the first plastic material has a first melting temperature that is significantly higher than a second melting temperature of the second plastic material.
5. Support element (100; 300; 400; 600; 700; 900; 1000; 1100; 1200*a*; 1200*b*) according to one of the preceding examples 2-4, wherein the first plastic material and the second plastic material do not form a chemical bond due to an additive contained in either or both of the first and/or second plastic material.
6. Support element (100; 300; 400; 600; 700; 900; 1000; 1100; 1200*a*; 1200*b*) according to one of the preceding examples 2-5, wherein the first plastic material comprises one or more of the following materials: polyamide, PA; in particular polyamide-6.6, PA6.6; polytetrafluoroethylene, PTFE.
7. Support element (100; 300; 400; 600; 700; 900; 1000; 1100; 1200*a*; 1200*b*) according to one of the preceding examples 2-6, wherein the second plastic material comprises one or more of the following materials: polyamide, PA; in particular polyamide-12, PA12; polyoxymethylene, POM; polytetrafluoroethylene, PTFE.
8. Support element (300; 600; 700; 1100; 1200*b*) according to one of the preceding examples, wherein the support element (300; 600; 700; 1100; 1200*b*) comprises at least on locking direction (780), in which locking direction a translation of the first partial member (310; 610; 710; 1110; 1212*b*; 1213*b*) relative to the second partial member (320; 620; 720; 1120; 1220*b*) is more strongly restricted than in another direction (370; 770).

9. Support element (100; 300; 400; 700; 900; 1000; 1200*a*; 1200*b*) according to one of the preceding examples, wherein the support element (100; 300; 400; 700; 900; 1000; 1200*a*; 1200*b*) comprises at least one locking axis (780; 980; 1080), around which locking axis a rotation of the first partial member (110; 310; 410; 710; 910; 1010; 1210*a*; 1211*a*; 1210*b*; 1211*b*; 1212*b*; 1213*b*; 1214*b*; 1215*b*; 1310; 1410) is more strongly restricted than a rotation around another axis (170; 370; 770; 970; 1070).

10. Support element (900; 1000; 1200*a*; 1200*b*) according to one of the preceding examples, wherein the connection region (930; 1030; 1230*a*; 1231*a*; 1232*a*; 1230*b*; 1231*b*; 1234*b*; 1235*b*; 1330; 1430) is provided as a ball joint.

11. Support element (700; 1200*b*) according to one of the examples 1-9, wherein the connection region (730; 1232*b*; 1233*b*) comprises a piston and a cylinder, in which cylinder the piston is arranged.

12. Support element (700) according to one of the preceding examples, wherein the connection region (730) is provided such that a movement of the first partial member (710) relative to the second partial member (720) creates a pumping action.

13. Support element (700) according to example 12, wherein the support element (700) is provided such that the movement can be created by walking with the shoe sole (800).

14. Support element (1100) according to one of the preceding examples, wherein the first partial member (1110) and/or the second partial member (1120) are provided as planar members.

15. Support element (1100) according to example 14, wherein the first planar member (1110) and the second planar member (1120) are provided slidably with respect to each other.

16. Support element (700; 900; 1000; 1200*a*; 1200*b*) according to one of the examples 1-13, wherein the first partial member (710; 910; 1010; 1210*a*; 1211*a*; 1210*b*; 1211*b*; 1212*b*; 1213*b*; 1214*b*; 1215*b*; 1310; 1410) and/or the second partial member (720; 920; 1020; 1220*a*; 1221*a*; 1220*b*; 1320; 1420) comprise a rod-shaped section, which runs into the connection region (730; 930; 1030; 1230*a*; 1231*a*; 1232*a*; 1230*b*; 1231*b*; 1232*b*; 1233*b*; 1234*b*; 1235*b*; 1330; 1430).

17. Support element (100; 1200*a*) according to one of the preceding examples, wherein the first partial member (110; 1211*a*) is connected rotatably and/or slidably with a plurality of second partial members (120; 125; 1220*a*; 1221*a*) in a plurality of connection regions (130; 135; 1231*a*; 1232*a*) by an injection molding process.

18. Support element (1200*a*; 1200*b*) according to one of the preceding examples, wherein the second partial member (1220*a*; 1220*b*) is connected rotatably and/or slidably with a plurality of first partial members (1210*a*; 1211*a*; 1210*b*; 1211*b*; 1212*b*; 1213*b*; 1214*b*; 1215*b*) in a plurality of connection regions (1230*a*; 1231*a*; 1230*b*; 1231*b*; 1232*b*; 1233*b*; 1234*b*; 1235*b*) by an injection molding process.

19. Support element (1200*a*) according to one of the preceding examples, wherein a plurality of first partial members (1210*a*; 1211*a*) and a plurality of second partial members (1220*a*; 1221*a*) are alternatingly connected to each other rotatably and/or slidably in a plurality of connection regions (1230*a*; 1231*a*; 1232*a*).

20. Cushioning element (250; 550; 850; 1150), in particular midsole (250; 550; 850; 1150) or part of a midsole (250; 550; 850; 1150), comprising a support element (100; 300; 400; 600; 700; 900; 1000; 1100; 1200*a*; 1200*b*) according to one of the preceding examples 1-19.

21. Cushioning element (250; 550; 850; 1150) according to the preceding example, wherein the cushioning element (250; 550; 850; 1150) comprises randomly arranged particles of an expanded material, in particular of expanded thermoplastic polyurethane and/or expanded polyether-block-amide.

22. Sole (200; 500; 800; 1199), with a support element (100; 300; 400; 600; 700; 900; 1000; 1100; 1200*a*; 1200*b*) according to one of the examples 1-19.

23. Sole (200; 500; 800; 1199) according to the preceding example, wherein the sole (200; 500; 800; 1199) comprises a cushioning element (250; 550; 850; 1150) according to one of the claims 20-21.

24. Shoe, in particular running shoe, with a sole (200; 500; 800; 1199) according to one of the examples 22-23.

25. Method (1300; 1400) for the manufacture of a support element for a shoe sole (200; 500; 800; 1199) or for a cushioning element (250; 550; 850; 1150) with a first (1310; 1410) and a second (1320; 1420) partial member, wherein the first (1310; 1410) and the second (1320; 1420) partial member are connected rotatably and/or slidably in a connection region (1330; 1430) by injection molding (1350; 1450).

26. Method (1300) according to example 25, wherein the second partial member (1320) is manufactured and simultaneously connected rotatably and/or slidably with the first partial member (1310) in the connection region (1330) by the injection molding (1350) in a mold (1360), in which the first partial member (1310) is arranged.

27. Method (1300) according to example 26, wherein the first partial member (1310) is also manufactured by injection molding (1351).

28. Method according to example 25, wherein the first partial member is manufactured and simultaneously connected rotatably and/or slidably with the second partial member in the connection region by the injection molding in a mold, in which the second partial member is arranged.

29. Method according to example 28, wherein the second partial member is also manufactured by injection molding.

30. Method (1400) according to example 25, wherein the first (1410) and the second (1420) partial member are manufactured and simultaneously connected rotatably and/or slidably to each other in the connection region (1430) in a single manufacturing step by the injection molding (1450).

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A sole comprising:
a cushioning element in the form of a midsole, wherein the midsole comprises randomly arranged particles of an expanded material;
a support element at least partially enclosed by the midsole, wherein the support element comprises
a first partial member formed of a first material; and
two second partial members each formed of a second material;
wherein the first material is different from the second material;
wherein the first partial member is integrally formed with the second partial members in two connection regions, wherein the connection regions are configured to allow the first partial member to rotate or slide relative to the second partial members,
wherein the first partial member and the second partial members contact each other in the connection regions.

2. The sole according to claim 1, wherein the first material and the second material do not form a chemical bond in the connective regions.

3. The sole according to claim 1, wherein the first material has a melting temperature that is higher than a melting temperature of the second material.

4. The sole according to claim 1, wherein the first material and the second material are plastic materials, wherein the plastic materials are chosen such that the connection region does not comprise a chemical bond between the two plastic materials.

5. The sole according to claim 4, wherein the plastic materials do not form the chemical bond due to an additive contained in at least one of the two plastic materials.

6. The sole according to claim 4, wherein the first material comprises one or more of the following materials: polyamide and polytetrafluoroethylene.

7. The sole according to claim 6, wherein the polyamide is polyamide-6.6.

8. The sole according to claim 4, wherein the second material comprises one or more of the following materials: polyamide, polyoxymethylene, and polytetrafluoroethylene.

9. The sole according to claim 8, wherein the polyamide is polyamide-12.

10. The sole according to claim 1, wherein the connection regions comprise at least one locking direction, wherein a movement of the first partial member relative to the second partial members in the at least one locking direction is more strongly restricted than in another direction.

11. The sole according to claim 1, wherein at least one of the two connection regions is a ball joint.

12. The sole according to claim 1, wherein at least one of the two connection regions is a piston arranged inside a cylinder.

13. The sole according to claim 1, wherein at least one of the connection regions is configured so that a movement of the first partial member relative to at least one of the second partial members creates a pumping action.

14. The sole according to claim 13, wherein the support element is positioned within the midsole such that the movement of the first partial member relative to the second partial members is created by a wearer treading on the sole.

15. The sole according to claim 1, wherein at least one of the first partial member and the second partial members is a planar member.

16. The sole according to claim 1, wherein at least one of the first partial member and the second partial members comprises a rod-shaped section, wherein the rod-shaped section is inserted into a cylinder in at least one of the connection regions.

17. The sole according to claim 1, wherein the particles of the expanded material are selected from a group consisting of expanded thermoplastic polyurethane particles and expanded polyether-block-amide particles.

18. A shoe comprising the sole of claim 1.

* * * * *